(12) United States Patent
Coimbra De Andrade

(10) Patent No.: US 11,827,247 B2
(45) Date of Patent: Nov. 28, 2023

(54) SYSTEMS AND METHODS FOR EXTERNALLY ASSISTED SELF-DRIVING

(71) Applicant: Verizon Connect Development Limited, Dublin (IE)

(72) Inventor: Douglas Coimbra De Andrade, Florence (IT)

(73) Assignee: Verizon Connect Development Limited, Dublin (IE)

( * ) Notice: Subject to any disclaimer, the term of this patent is extended or adjusted under 35 U.S.C. 154(b) by 338 days.

(21) Appl. No.: 16/794,825

(22) Filed: Feb. 19, 2020

(65) Prior Publication Data
US 2021/0253132 A1 Aug. 19, 2021

(51) Int. Cl.
*B60W 60/00* (2020.01)
*G05D 1/02* (2020.01)

(52) U.S. Cl.
CPC .... *B60W 60/0051* (2020.02); *B60W 60/0059* (2020.02); *G05D 1/0214* (2013.01); *G05D 1/0278* (2013.01); *G05D 1/0289* (2013.01)

(58) Field of Classification Search
CPC ......... G05D 2201/0213; G05D 1/0027; G05D 1/0289; G05D 1/0287; G05D 1/0212; G05D 1/0229; G05D 1/0011; G05D 1/0227; G05D 1/0274; G05D 1/0231; G05D 1/0295; G05D 1/0234; G05D 1/0214; G05D 1/0278; G01S 2201/02; G08G 1/205; G08G 1/146; G08G 1/14; G08G 1/141; B60W 60/0051
See application file for complete search history.

(56) References Cited

U.S. PATENT DOCUMENTS

| | | | |
|---|---|---|---|
| 9,646,356 B1 | 5/2017 | Schwie et al. | |
| 2013/0204525 A1* | 8/2013 | Pfeifle | G01C 21/3469 701/400 |
| 2015/0241226 A1 | 8/2015 | Engelman et al. | |
| 2017/0242435 A1* | 8/2017 | Nilsson | G05D 1/0214 |
| 2017/0351267 A1* | 12/2017 | Mielenz | G06T 7/70 |

(Continued)

OTHER PUBLICATIONS

El-Sherbeny, Nasser A., "Vehicle routing with time windows: An overview of exact, heuristic and metaheuristic methods," Journal of King Saud University, Mar. 27, 2010, 123 pages, King Saud University.

(Continued)

*Primary Examiner* — Kenneth J Malkowski
*Assistant Examiner* — Ibrahim Abdoalatif Alsomairy

(57) ABSTRACT

A device may include one or more processors configured to receive sensor data from an external sensor associated with an autonomous driving zone; generate a map of the autonomous driving zone based on the sensor data; determine that a vehicle is entering the autonomous driving zone; and transmit a signal to the vehicle based on the vehicle entering the autonomous driving zone. The signal may cause the vehicle to begin operating in a full autonomous mode. The one or more processors may be configured further to determine an objective associated with the vehicle; receive first data obtained by one or more first sensors associated with the vehicle and second data obtained by the external sensor; determine a route based on the objective, the first data, and the second data; and transmit information identifying the route to the vehicle. The route may allow the vehicle to satisfy the objective.

20 Claims, 33 Drawing Sheets

(56) References Cited

U.S. PATENT DOCUMENTS

2018/0188037 A1* 7/2018 Wheeler ............ G01C 21/3635
2020/0334985 A1* 10/2020 Zhou .................... G05D 1/0088

OTHER PUBLICATIONS

Boudette, Neal E., "Despite High Hopes, Self-Driving Cars Are 'Way in the Future'," The New York Times, Jul. 17, 2019, 8 pages.
Badue, Claudine, "Self-Driving Cars: A Survey," Federal University of Espírito Santo, Oct. 3, 2019, 34 pages.
Kallehauge, Brian, "Vehicle Routing Problem With Time Windows," 32 pages.

* cited by examiner

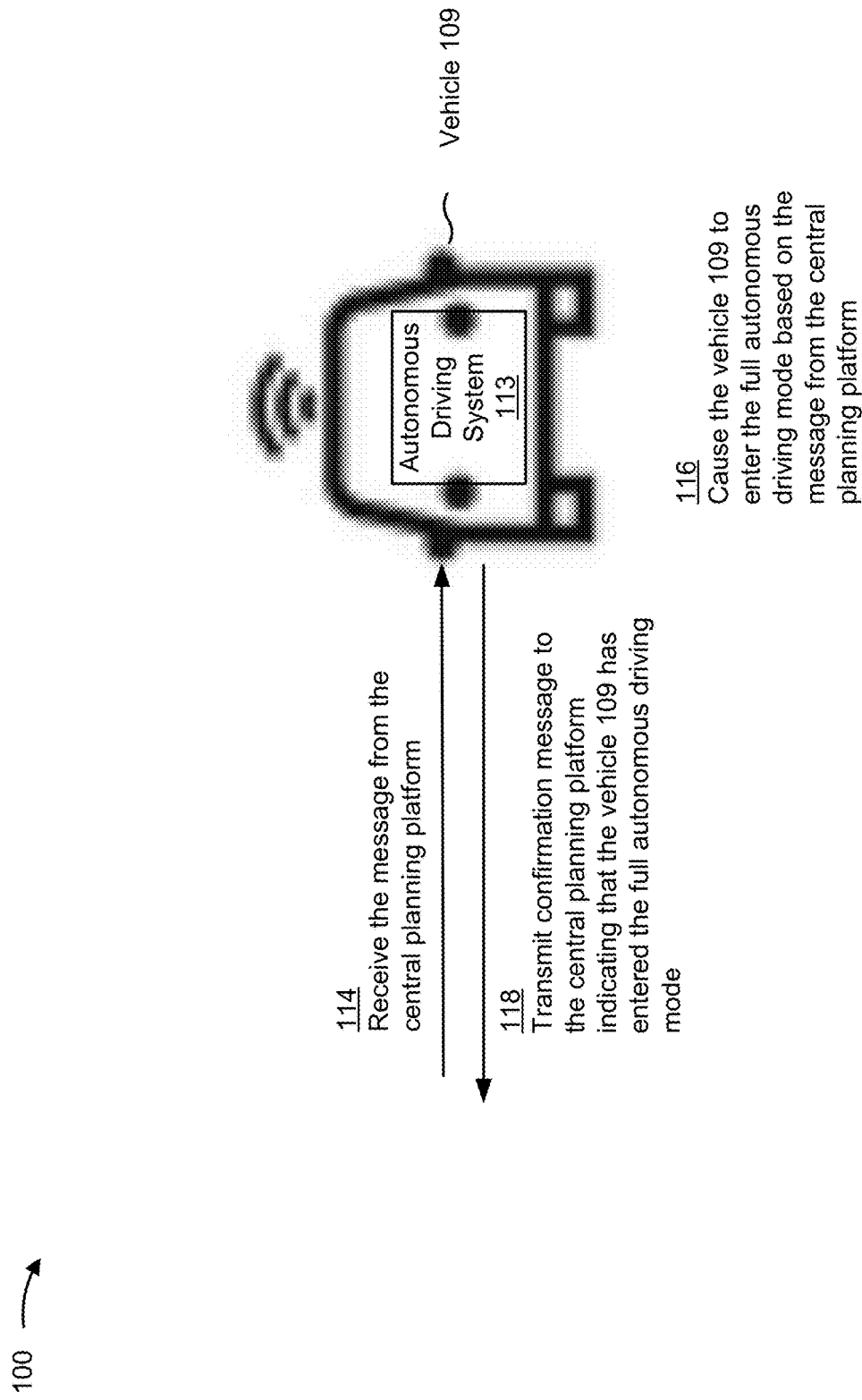

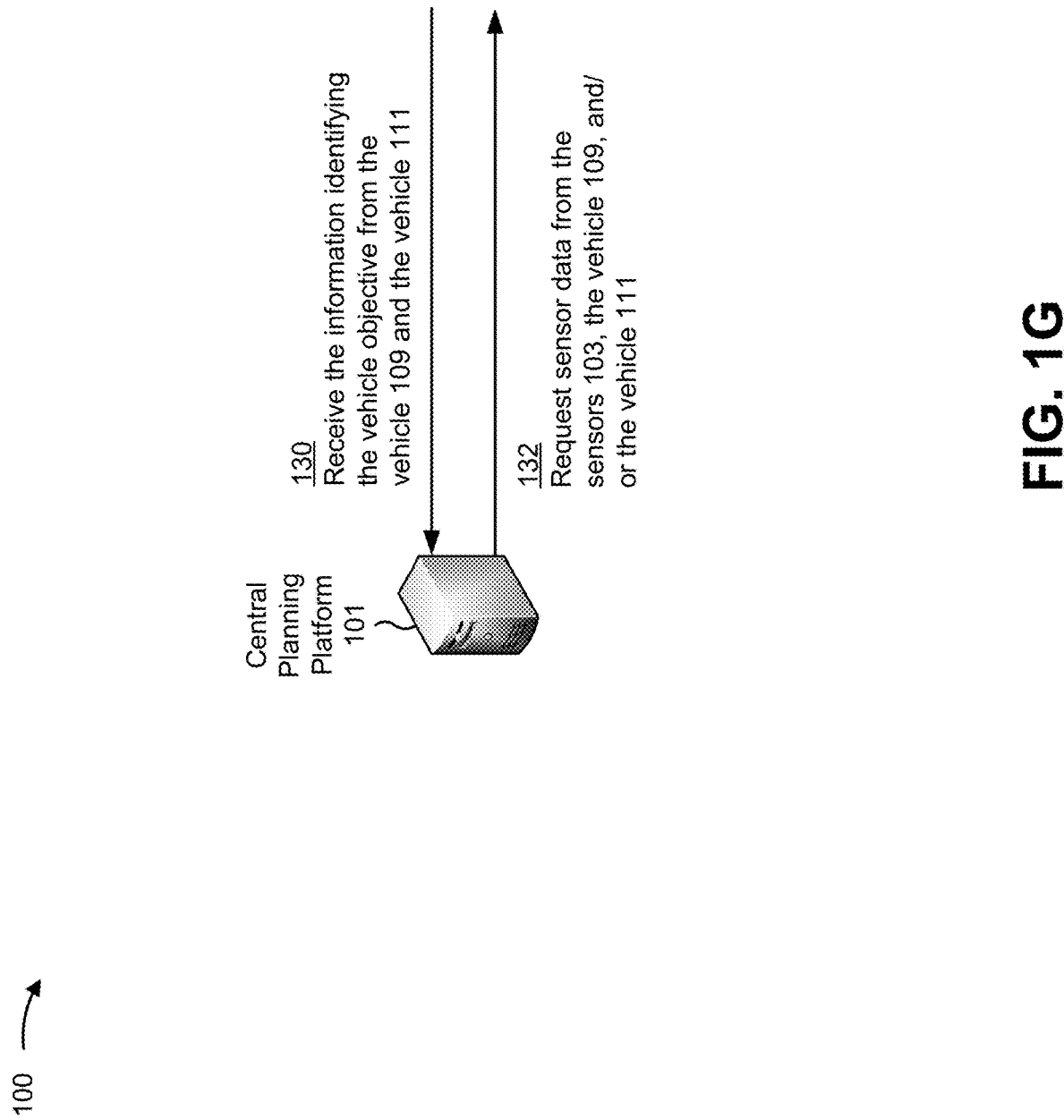

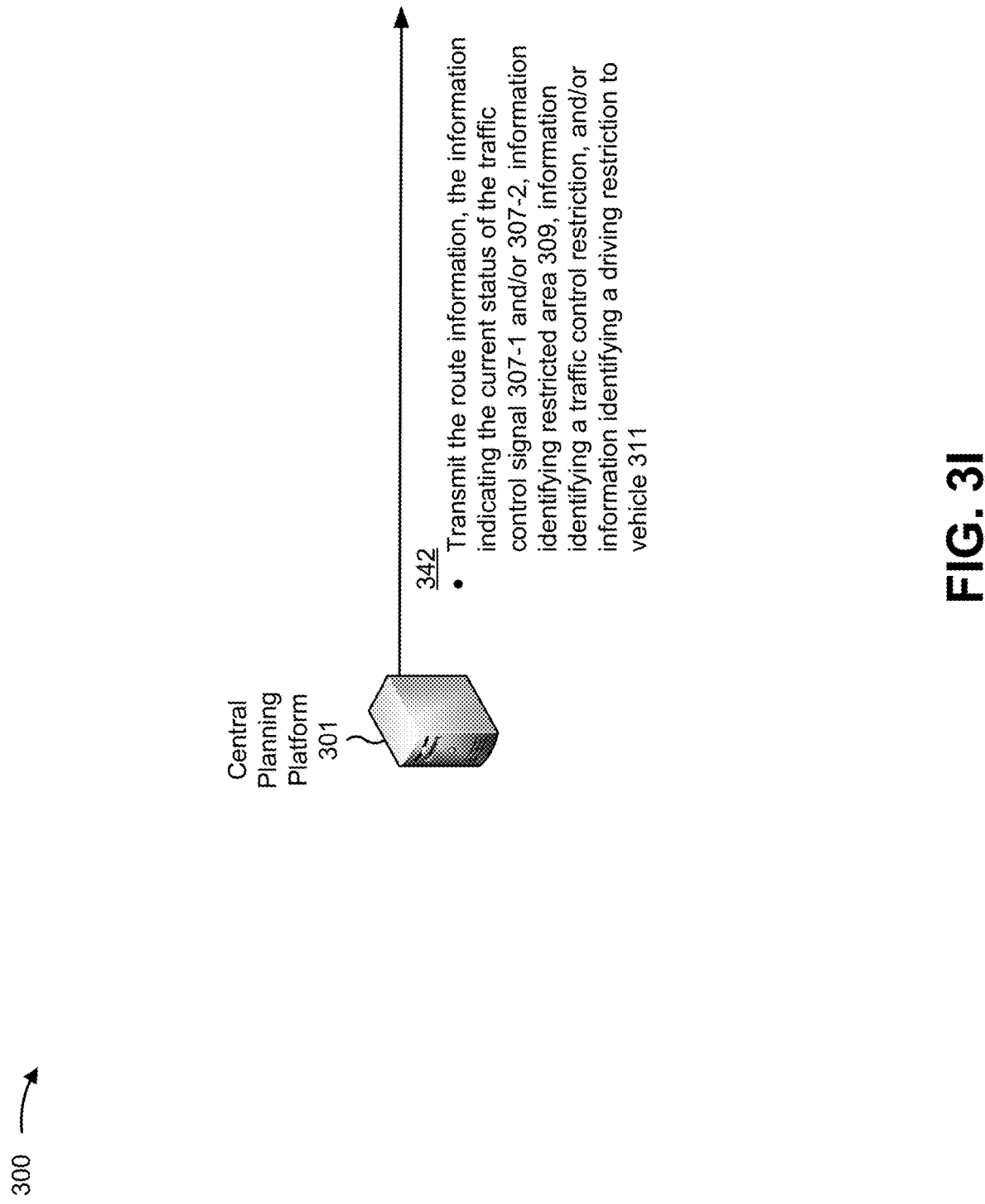

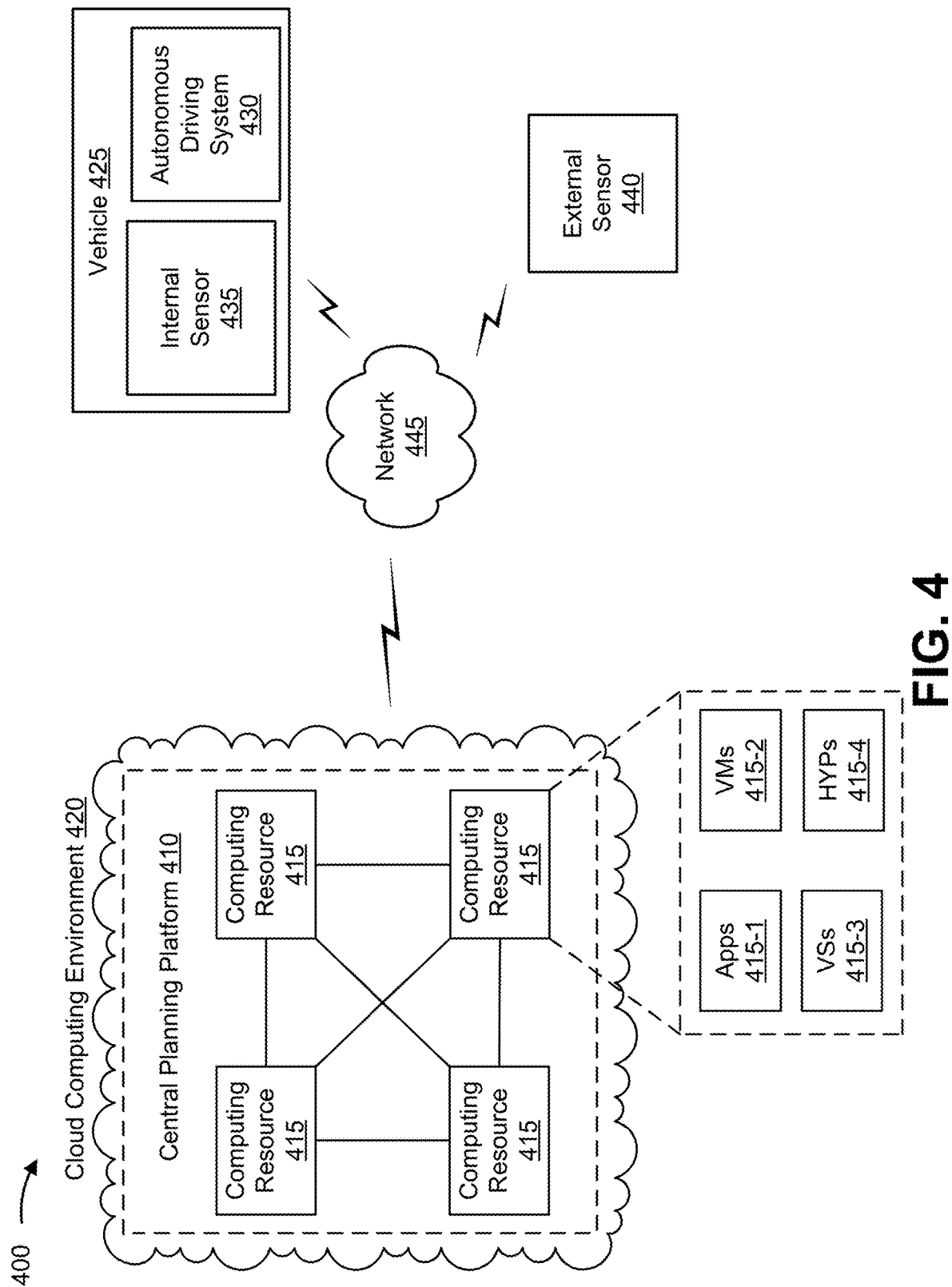

SYSTEMS AND METHODS FOR EXTERNALLY ASSISTED SELF-DRIVING

BACKGROUND

A vehicle can include an autonomous driving system that can control an operation of the vehicle independent of a driver.

BRIEF DESCRIPTION OF THE DRAWINGS

FIGS. 1A-1J are diagrams of an overview of an example implementation described herein;

FIGS. 3A-3J are diagrams of an overview of an example implementation described herein;

FIG. 4 is a diagram of an example environment in which systems and/or methods, described herein, may be implemented;

DETAILED DESCRIPTION

Figure 1A:
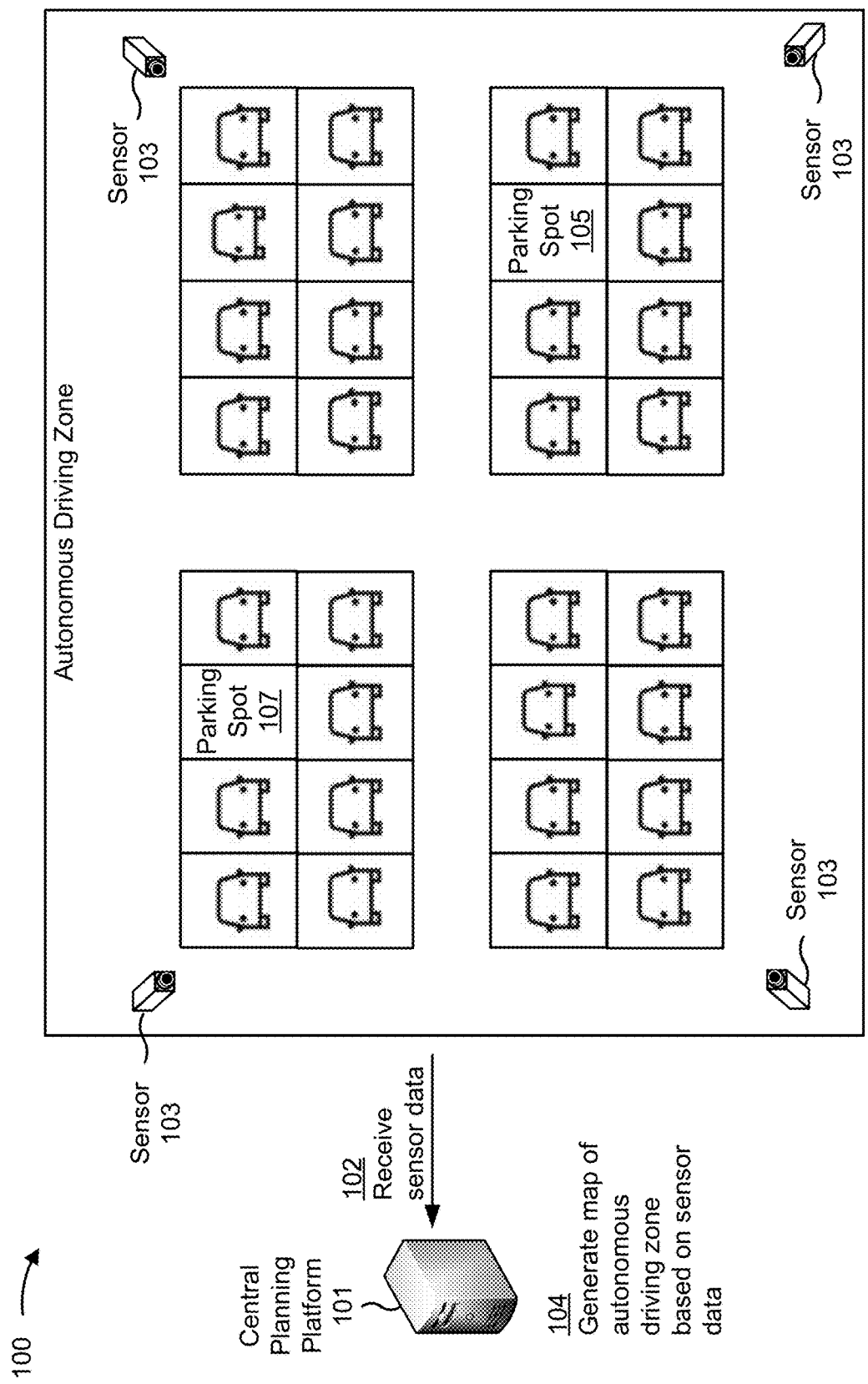

The following detailed description of example implementations refers to the accompanying drawings. The same reference numbers in different drawings may identify the same or similar elements.

In some instances, an autonomous vehicle may be a vehicle that is capable of operating in a manual driving mode and an autonomous driving mode. When operating in the manual driving mode, a person (e.g., a driver) may control (e.g., drive) the autonomous vehicle. When operating in the autonomous driving mode, an autonomous driving system may control (e.g., drive) the autonomous vehicle without requiring input from a person. The autonomous driving system may include one or more sensors positioned in and/or on the vehicle to obtain data useful for controlling the operation of the vehicle such as, for example, data indicating an environmental condition (e.g., rain, snow, temperature, and/or the like), an edge of a road or an edge of a lane in a road, a speed of the vehicle, a position and/or speed of another vehicle, and/or the like).

The autonomous driving system may analyze data from the one or more sensors and control the operation of the autonomous vehicle based on the analysis. For example, an autonomous vehicle may include an autonomous driving system that collects data from camera sensors. The autonomous vehicle may analyze the collected data and determine that the autonomous vehicle is approaching an intersection controlled by a traffic control signal. The autonomous driving system may collect additional data from the camera sensors to determine a status of the traffic control signal (e.g., to determine whether the traffic control signal is displaying a green light, a red light, or a yellow light).

However, the data provided by the camera sensors may not always be reliable (e.g., due to weather conditions, field-of-view obstructions, and/or the like). In these cases, the autonomous driving system may have difficulty analyzing the image data and/or determining a proper action to take to control the operation of the autonomous vehicle.

Further, the data provided by the camera systems does not provide the information needed by the autonomous driving system directly. Instead, the autonomous driving system must analyze and interpret the data.

Additionally, the autonomous driving system must account for sudden and/or unexpected events and/or actions taken by drivers of other vehicles. Because the data analyzed by the autonomous driving system is limited to data collected by the sensors in and/or on the autonomous vehicle, it may be difficult for the autonomous vehicle to determine an appropriate action to be taken in response to a sudden and/or unexpected event in a timely manner.

For example, a vehicle in front of an autonomous vehicle may swerve at the last minute to avoid hitting an object in the road. Due to the presence of the vehicle in front of the autonomous vehicle, the autonomous driving system may not be able to detect the presence of the object by analyzing data from the camera sensors until after the vehicle has swerved to avoid hitting the object. The autonomous driving system may not have a sufficient amount of time to analyze the data collected by the camera sensors to determine the presence of the object, determine an action to be performed to avoid hitting the object, and to perform the determined action prior to the autonomous vehicle hitting the object.

Some implementations described herein provide a central planning platform that determines an objective of an autonomous vehicle (e.g., travel to a particular location). The central planning platform may analyze sensor data obtained from external sensors located throughout a city, street or zone, and/or a plurality of vehicles to determine data useful for controlling operation of one or more autonomous vehicles based on the objective of the various autonomous vehicles. The central planning platform may provide the data to an individual autonomous vehicle in a direct format (e.g., a signal indicating that a status of an upcoming traffic control signal is green). In this way, the autonomous driving system may obtain reliable data that provides information needed by the autonomous driving system of each vehicle being coordinated by the central planning system directly.

Further, because the central planning platform obtains data from external sensors and/or from a plurality of vehicles, the autonomous driving system is not limited to data collected by sensors located in and/or on the autonomous vehicle. In this way, the autonomous driving system may be notified of and/or predict a future action of another vehicle thereby reducing the risk of an occurrence of a sudden and/or unexpected event. A reduction in the risk of the occurrence of a sudden and/or unexpected invent may increase the safety of the passengers within the autonomous vehicle and may prevent financial-resource consuming collisions.

Additionally, some implementations described herein may utilize multi-access edge computing (MEC) environment. In a MEC environment, computing is enabled by a network architecture that provides computing capabilities to a connected device (e.g., an external sensor, an autonomous vehicle, and/or the like) via computing platforms at or near an edge of a network (e.g., a wireless communication network).

Accordingly, because a MEC environment may provide computing at or near the edge of the network, increased performance may be achieved over networks in which computing is performed topologically and/or physically further from a connected device. For example, the MEC environment may offer the performance increase due to less traffic and/or congestion between the connected device and the computing node(s), less latency (due to closer proximity to the connected device), increased flexibility (due to a greater amount of computing node(s)), and/or the like.

The increased performance achieved by the MEC environment may enable the central planning system to receive and/or process larger amounts of data obtained from external sensors and autonomous vehicles and/or increase a speed at which high-level control commands are provided to autonomous vehicles connected to the MEC environment. In this way, MEC environment may allow for larger autonomous zones and/or a larger quantity of connected devices (e.g., autonomous vehicles, external sensors, and/or the like) relative to networks in which computing is performed topologically and/or physically further from a connected device.

FIGS. 1A-1J are diagrams of an overview of an example implementation 100 described herein. For example, as shown in FIGS. 1A-1J, example implementation 100 includes a central planning platform 101, a plurality of sensors 103, a vehicle 109, and a vehicle 111. The vehicle 109 and the vehicle 111 each include an autonomous driving system 113. The number and arrangement of devices shown in FIGS. 1A-1J are provided as an example. In practice, there may be additional devices, fewer devices, different devices, or differently arranged devices than those shown in FIGS. 1A-1J.

The central planning platform 101 may be configured to provide high-level control commands to autonomous vehicles operating within an autonomous driving zone. For example, the central planning platform 101 may aggregate sensor data from the sensors 103, determine an objective (e.g., travel to location A, park, and/or the like) for each autonomous vehicle within the autonomous driving zone, and perform vehicle routing and optimum path planning for each autonomous vehicle within the autonomous driving zone to allow each autonomous vehicle to satisfy the objective of the autonomous vehicle.

In some implementations, the central planning platform 101 may be located within, or near, the autonomous driving zone. For example, the central planning platform 101 may be located in close enough proximity to the autonomous driving zone that the central planning platform 101 may communicate wirelessly (e.g., over a 5G network) with sensors 103, vehicle 109 (e.g., a device, such as autonomous driving system 113, in vehicle 109 and/or the like), and/or vehicle 111 (e.g., a device, such as autonomous driving system 113, in vehicle 111 and/or the like). In this way, the central planning platform 101 may send and receive data to and from the other devices in, or near, the autonomous driving zone, via a low latency, high bandwidth localized network.

In some implementations, as shown in FIG. 1A, and by reference number 102, the central planning platform 101, may receive sensor data from the sensors 103. The sensors 103 may include a camera sensor, a ground pressure sensor, a radar sensor, a lidar sensor, and/or any other type of sensor capable of detecting and/or determining a position of an object (e.g., an autonomous vehicle, a non-autonomous vehicle, a person, an animal, and/or the like) within an autonomous driving zone.

In some implementations, the sensors 103 may be located within, adjacent to, or near, the autonomous driving zone. As shown in FIG. 1A, the sensors 103 may be located within the autonomous driving zone and each sensor may be positioned to monitor one or more portions of the autonomous driving zone. The sensors 103 may obtain data associated with the autonomous driving zone and may transmit the obtained data to the central planning platform 101.

In some implementations, the sensors 103 may obtain image data of the autonomous driving zone. For example, one or more of the sensors 103 may include an imaging device (e.g., a camera, an infrared camera, a thermal imaging camera, and/or the like) and may utilize the imaging device to periodically obtain image data of the autonomous driving zone. The one or more sensors 103 may transmit the obtained image data to the central planning platform 101.

In some implementations, the sensors 103 may provide location information associated with the sensors 103 and/or an object located within the autonomous driving zone (e.g., a set of GPS coordinates, a latitude and a longitude, a timestamp, and/or the like) to the central planning platform 101. For example, one or more of the sensors 103 may include a GPS device and may utilize the GPS device to obtain GPS coordinates associated with the one or more sensors 103. The one or more sensors 103 may transmit the GPS coordinates to the central planning platform 101.

In some implementations, as shown in FIG. 1A, and by reference number 104, the central planning platform 101 may generate a map of the autonomous driving zone based on the sensor data. For example, as shown in FIG. 1A, a parking lot may be designated as an autonomous driving zone in which an autonomous vehicle may operate in an autonomous mode. The central planning platform 101 may generate a map of the parking lot.

In some implementations, the central planning platform 101 may generate the map based on data obtained from one or more external sensors. For example, the central planning platform 101 may receive sensor data from the sensors 103 and may generate the map based on the sensor data.

Alternatively, and/or additionally, the central planning platform 101 may generate the map based on data obtained from one or more internal sensors associated with an autonomous vehicle. For example, the vehicle 109 and/or the vehicle 111 may include one or more internal sensors (e.g., an imaging device, a radar, a lidar, and/or the like). The vehicle 109 and/or the vehicle 111 may obtain sensor data from the one or more internal sensors and may transmit the sensor data to the central planning platform 101. The central planning platform 101 may receive the sensor data from the vehicle 109 and/or the vehicle 111. The central planning platform 101 may generate the map based on the sensor data received from the vehicle 109 and/or the vehicle 111.

In some implementations, the central planning platform 101 may generate the map based on a satellite image. For example, the sensor data may include location information associated with the autonomous driving zone (e.g., a set of GPS coordinates, a latitude and a longitude, a timestamp, and/or the like). The central planning platform 101 may obtain a satellite image of an area that includes the autonomous driving zone based on the location information. The central planning platform 101 may generate the map of the autonomous driving zone based on the satellite image.

In some implementations, the central planning platform 101 may generate the map based on a boundary of the autonomous driving zone. For example, the sensor data may include location information (e.g., a set of GPS coordinates, a latitude and a longitude, and/or the like) associated with a boundary of the autonomous driving zone. The central planning platform 101 may analyze the location information to determine the boundary of the autonomous driving zone and may generate the map based on the boundary.

In some implementations, the sensor data may include location information associated with a location of the sensors 103. The central planning platform 101 may determine a location of each of the sensors 103 based on the location information. The central planning platform 101 may determine the boundary of the autonomous driving zone based on the location of each of the sensors 103.

For example, the central planning platform 101 may plot the location of each of the sensors 103 on the satellite image. The central planning platform 101 may determine an area of the satellite image that includes the location of each of the sensors 103. The central planning platform 101 may determine the boundary of the autonomous driving zone based on a perimeter of the area of the satellite image that includes each of the sensors 103.

Alternatively, and/or additionally, the sensor data may include location information associated with a location of one or more markers placed along a boundary of the autonomous driving zone. The central planning platform 101 may analyze the sensor data to determine the location of the one or more markers and may determine the boundary of the autonomous driving zone based on the analysis.

In some implementations, the central planning platform 101 may determine the boundary of the autonomous driving zone based on user input. For example, a user may input location information associated with a boundary of the autonomous driving zone via a user interface associated with the central planning platform 101. The central planning platform 101 may determine the boundary of the autonomous driving zone based on the location information.

In some implementations, the central planning platform 101 may generate the map based on a man-made structure (e.g., a building, a parking spot, a road, a sidewalk, a traffic control signal, a telephone pole, and/or the like) included in the autonomous driving zone. For example, as shown in FIG. 1A, the autonomous driving zone may include a plurality of parking spots. The sensor data may include one or more images of the plurality of parking spots. The central planning platform 101 may determine a size (e.g., a length and a width) and a location of the plurality of parking spots based on the image data. The central planning platform 101 may generate the map based on the size and the location of the plurality of parking spots. For example, the central planning platform 101 may indicate the location of the plurality of parking spots on the satellite image.

In some implementations, a user may input location information for a man-made structure. For example, a user may enter information identifying a type (e.g., a building, a parking spot, a road, a sidewalk, a traffic control signal, a telephone pole, and/or the like) and location information for each man-made structure included in the autonomous driving zone via a user interface associated with the central planning platform 101.

In some implementations, the central planning platform 101 may generate the map based on a natural structure (e.g., a body of water, a mountain, a depression in the earth, and/or the like) included in the autonomous driving zone. For example, the autonomous driving zone may include a body of water, such as, for example, a lake, a pond, and/or the like. The sensor data may include one or more images of the body of water. The central planning platform 101 may determine a size (e.g., a length, a width, and/or a depth) and a location of the body of water based on the image data. The central planning platform 101 may generate the map based on the size and the location of the body of water. For example, the central planning platform 101 may indicate the location of the body of water on the satellite image.

In some implementations, the central planning platform 101 may generate the map based on a set of initial traffic control constraints and/or driving restrictions. The set of initial constraints and/or driving restrictions may include a maximum speed, a minimum speed, a driving direction, whether driving is permitted in a particular area, a status of a traffic signal, and/or another constraint and/or driving restriction.

In some implementations, the set of initial traffic control constraints and/or driving restrictions may be the least constraining and/or restrictive set of traffic control constraints and/or driving restrictions imposed on the autonomous driving zone relative to other traffic control constraints and/or driving restrictions imposed on the autonomous driving zone at a later time. For example, the central planning platform 101 may determine a maximum speed for the autonomous driving zone based on sensor data received from the plurality of sensors. Subsequently, the central planning platform 101 may receive additional sensor data from the sensors 103 and may modify an initial traffic control constraint and/or driving restriction based thereon. Although the central planning platform 101 may modify an initial traffic control constraint and/or driving restriction (e.g., the maximum speed) to be more restrictive (e.g., lower than the maximum speed) based on additional sensor data from the sensors 103 and/or from one or more autonomous vehicles, the central planning platform 101 may not modify the initial traffic control constraint and/or driving restriction to be less constraining or restrictive (e.g., greater than the maximum speed).

In some implementations, the central planning platform 101 may determine an initial set of constraints and/or driving restrictions for a plurality of areas within the autonomous driving zone. For example, the central planning platform 101 may receive sensor data from the sensors 103. The central planning platform 101 may analyze the sensor data and determine a plurality of areas within the autonomous driving zone. Each area, of the plurality of areas, may correspond to one or more portions of a road, one or more portions of a lane of a road, an area adjacent to one or more portions of a road, a parking spot, and/or another area included in the autonomous driving zone.

In some implementations, the central planning platform 101 may determine an initial constraint and/or driving restriction for each area of the plurality of areas within the autonomous driving zone. For example, the central planning platform 101 may analyze the sensor data and determine a speed limit associated with a particular area. The central planning platform may determine a maximum speed corresponding to the speed limit as an initial constraint for the particular area.

Additionally, and/or alternatively, the central planning platform 101 may analyze the sensor data and determine that a particular area corresponds to a body of water. The central planning platform 101 may determine a driving restriction for the particular area restricting vehicles from traveling through the particular area based on the particular area corresponding to the body of water.

In some implementations, the central planning platform 101 may generate the map based on a moveable object (e.g., a vehicle, a person, an animal, and/or the like) located in the autonomous driving zone. For example, as shown in FIG. 1A, a plurality of vehicles may be parked in respective parking spots located within the autonomous driving zone. The sensor data may include one or more images and/or location information associated with the plurality of vehicles. The central planning platform 101 may determine a location and movement information (e.g., a direction of travel, a speed, and/or the like) of each vehicle based on the one or more images and/or the location information. The central planning platform 101 may generate the map based on the location and the movement information determined for the plurality of vehicles. For example, the central planning platform 101 may indicate the location and the movement information determined for the plurality of vehicles on the satellite image.

Figure 1B:
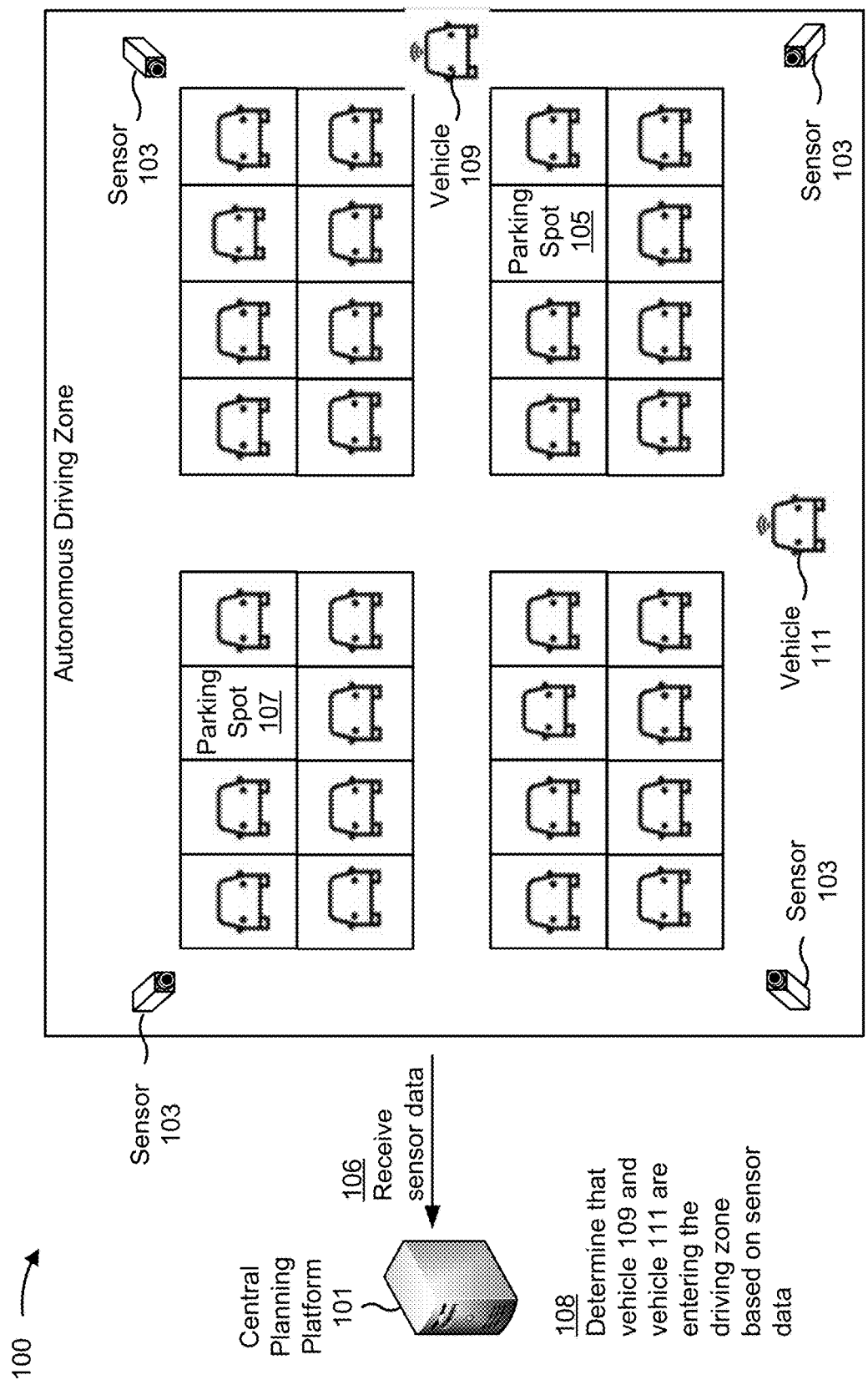

In some implementations, as shown in FIG. 1B, and by reference number 106, after generating the map, the central planning platform 101 may receive sensor data from the sensors 103, vehicle 109, and/or vehicle 111. For example, one or more of the sensors 103 may detect a movement of an object (e.g., the vehicle 109, the vehicle 111, a pedestrian, and/or the like). The one or more sensors 103 may obtain sensor data associated with the object based on detecting the movement of the object. The one or more sensors 103 may transmit the obtained sensor data to the central planning platform 101.

In some implementations, as shown in FIG. 1B, and by reference number 108, the central planning platform 101 may determine that the vehicle 109 and/or the vehicle 111 are entering the autonomous driving zone based on the sensor data. For example, the sensor data may include location information and movement information associated with the vehicle 109 and/or the vehicle 109. The location information may indicate a location of the vehicle 109 and/or the vehicle 111. The movement information may include information identifying a speed and/or direction of travel of the vehicle 109 and/or the vehicle 111. The central planning platform 101 may determine that the vehicle 109 and/or the vehicle 111 is entering the autonomous driving zone based on the location of the vehicle 109 and/or the vehicle 111, the speed of the vehicle 109 and/or the vehicle 111, and/or the direction of travel of the vehicle 109 and/or the vehicle 111.

Figure 1C:
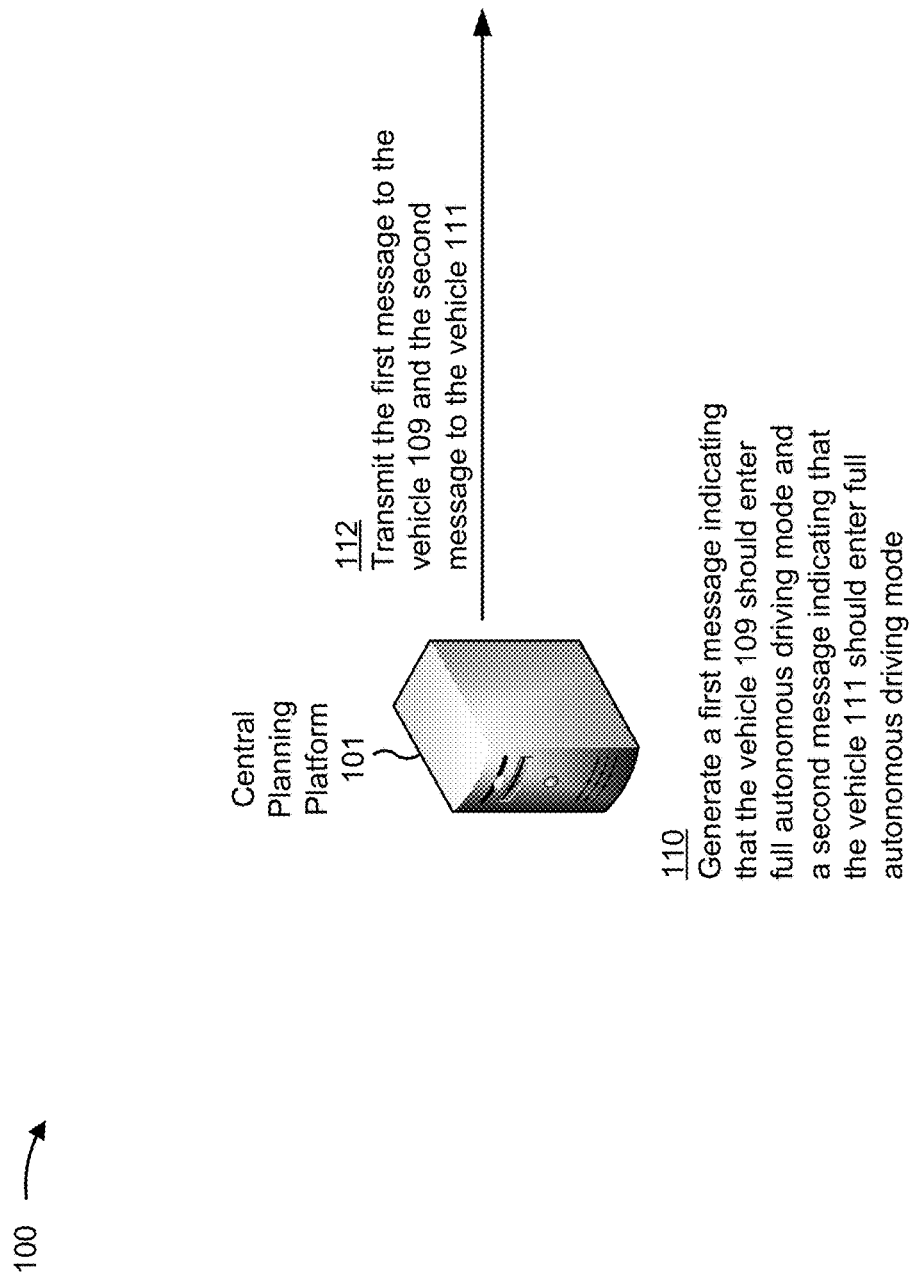

In some implementations, the central planning platform 101 may instruct the vehicle 109 and/or the vehicle 111 to begin operating in a full autonomous driving mode based on determining that the vehicle 109 and/or the vehicle 111 is entering the autonomous driving zone. For example, as shown in FIG. 1C, and by reference number 110, the central planning platform 101 may generate a first message indicating that the vehicle 109 is entering the autonomous driving zone and/or is to begin operating in a full autonomous driving mode and may generate a second message indicating that the vehicle 111 is entering the autonomous driving zone and/or is to begin operating in a full autonomous driving mode based on determining that the vehicle 109 and the vehicle 111 are entering the autonomous driving zone. As shown in FIG. 1C, and by reference number 112, the central planning platform 101 may transmit the first message to the vehicle 109 and may transmit the second message to the vehicle 111.

In some implementations, the vehicle 109 and/or the vehicle 111 may begin operating in the full autonomous driving mode based on entering the autonomous driving zone. For example, as shown in FIG. 1D, and by reference number 114, the vehicle 109 may receive the first message from the central planning platform 101. The vehicle 109 may analyze the message and may determine that the vehicle 109 is entering the autonomous driving zone and/or is to begin operating in a full autonomous driving mode. As shown in FIG. 1D, and by reference number 116, the vehicle 109 may begin operating the full autonomous driving mode based on analyzing the message.

In some implementations, the vehicle 111 may receive the message from the central planning platform 101 and may begin operating in the full autonomous driving mode in a manner similar to that described above with respect to the vehicle 109.

In some implementations, the central planning platform 101 may determine that the vehicle 109 and/or the vehicle 111 is operating in the full autonomous driving mode. For example, the vehicle 109 may generate a confirmation message that includes information indicating that the vehicle 109 is operating in the full autonomous driving mode. As shown in FIG. 1D, and by reference number 118, the vehicle 109 may transmit the confirmation message to the central planning platform 101.

Figure 1E:
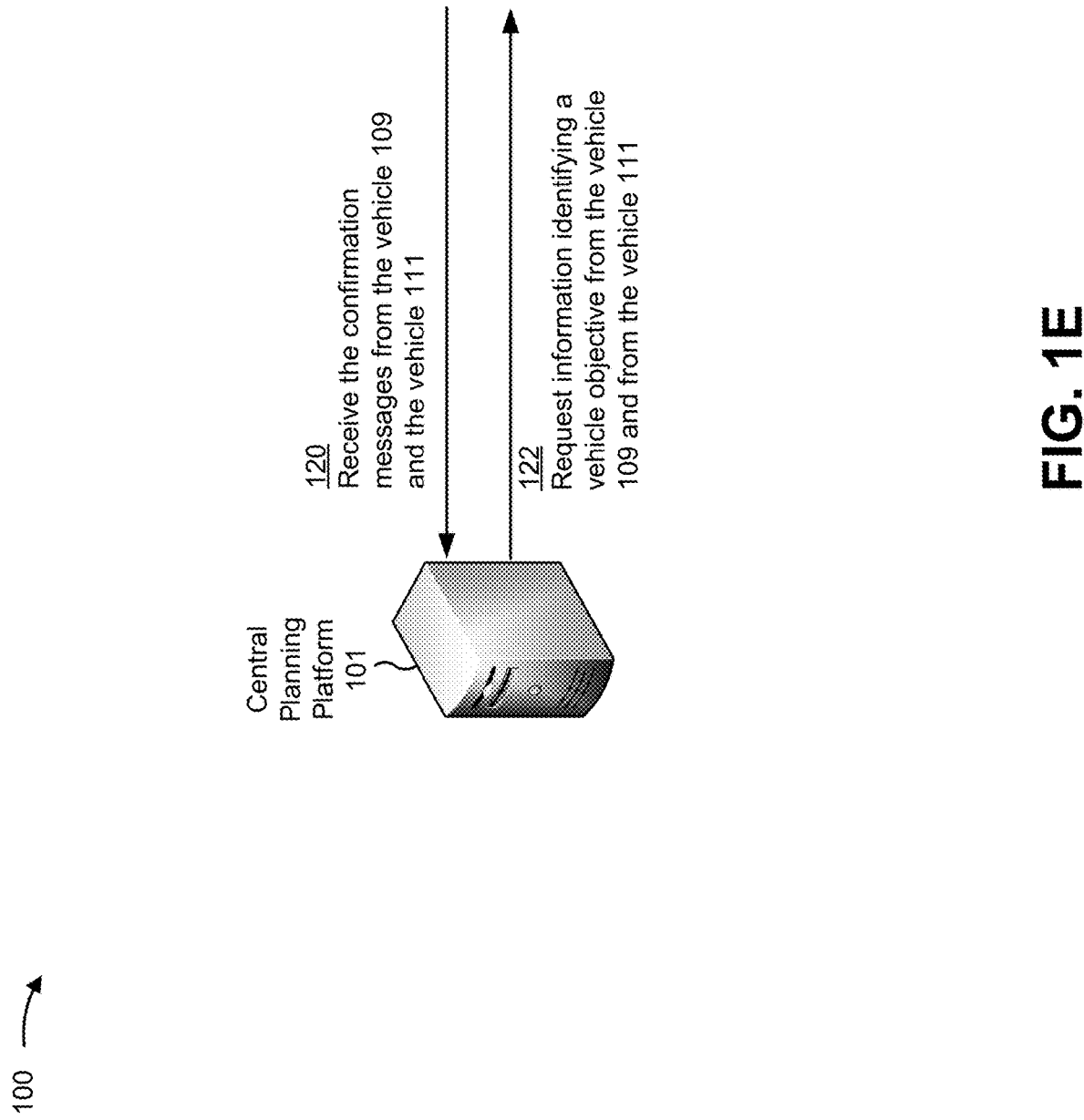

As shown in FIG. 1E, and by reference number 120, the central planning platform 101 may receive the confirmation message from the vehicle 109. The central planning platform 101 may determine that the vehicle 109 is operating in the full autonomous driving mode based on the confirmation message.

In some implementations, the vehicle 111 may transmit a confirmation message indicating that the vehicle 111 is operating in the full autonomous driving mode to the central planning platform 101 in a manner similar to that described above with respect to the vehicle 109. As shown in FIG. 1E, and by reference number 120, the central planning platform 101 may receive the confirmation message from the vehicle 111. The central planning platform 101 may determine that the vehicle 111 is operating in the full autonomous driving mode based on the message.

In some implementations, the central planning platform 101 may determine an objective associated with each vehicle (e.g., park, drive to a location, drop a passenger off at a location and then park, and/or the like) entering the autonomous driving zone. For example, as shown in FIG. 1E, and by reference number 122, the central planning platform 101 may request information identifying an objective associated with the vehicle 109 from the vehicle 109 and may request information identifying an objective associated with the vehicle 111 from the vehicle 111.

Figure 1F:
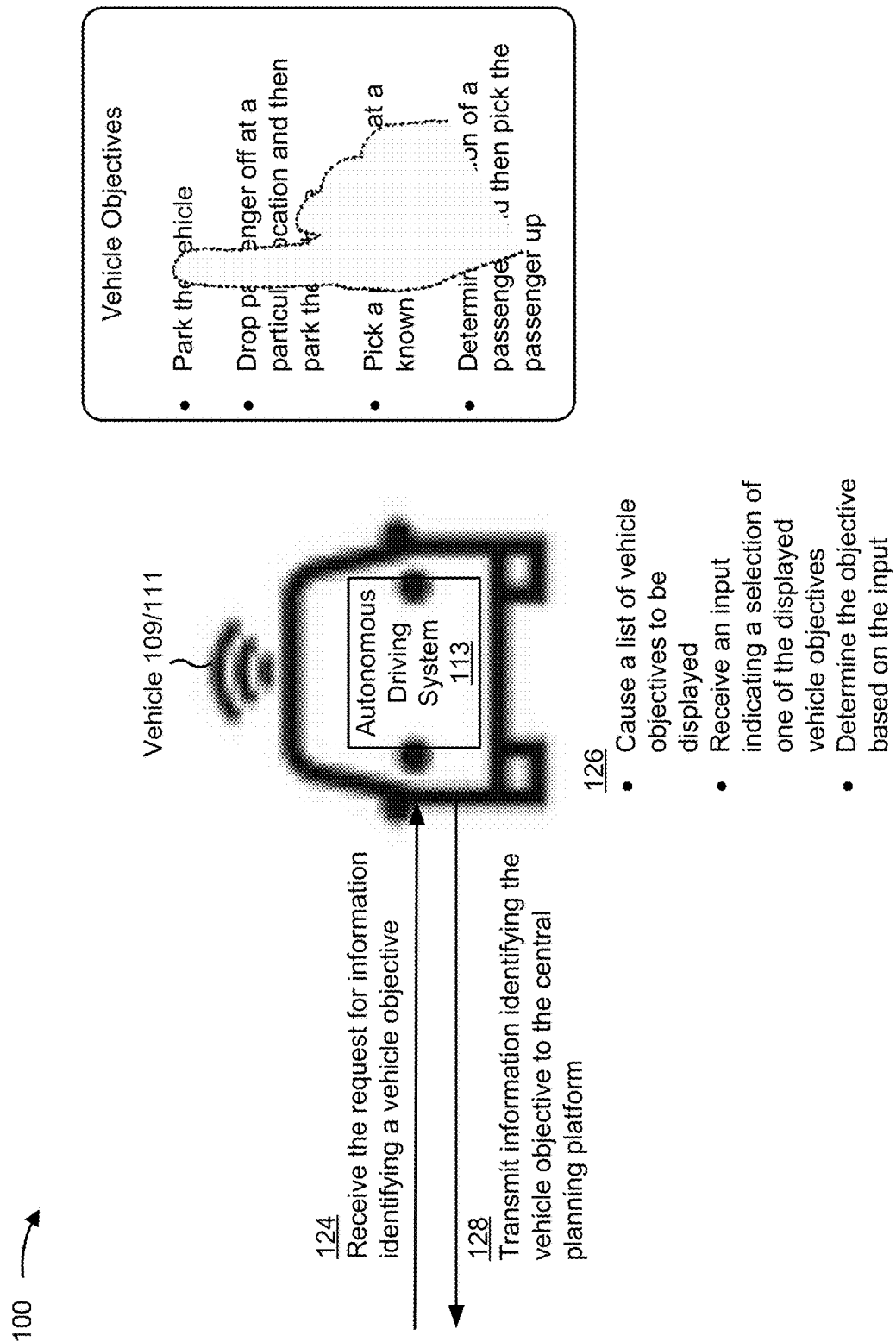

As shown in FIG. 1F, and by reference number 124, the vehicle 109 and the vehicle 111 may receive the request for the information identifying the objective from the central planning platform 101. For example, the vehicle 109 and/or the vehicle 111 may include an autonomous driving system 113. The autonomous driving system 113 may receive the request from the central planning platform 101.

In some implementations, the vehicle 109 and/or the vehicle 111 may obtain information identifying the objective based on a user input. For example, as shown in FIG. 1F, and by reference number 126, the autonomous driving system 113 of the vehicle 109 and/or the autonomous driving system 113 of the vehicle 111 may cause a list of vehicle objectives to be displayed via a user interface associated with the autonomous driving system 113.

In some implementations, the list of vehicle objectives may be determined based on the request received from the central planning platform 101. For example, the request may include information identifying a plurality of objectives associated with the autonomous driving area. The autonomous driving system 113 may determine the list of objectives based on one or more of the plurality of objectives identified in the request.

In some implementations, the request may include information associated with the autonomous driving zone and the autonomous driving system 113 may determine the list of vehicle objectives based on the information associated with the autonomous driving zone. For example, the request may include information identifying a category (e.g., a parking lot, a construction site, a road, and/or the like) associated with the autonomous driving zone.

In some implementations, the autonomous driving system 113 may determine the list of vehicle objectives based on the category associated with the autonomous driving zone. For example, the autonomous driving system 113 may access a data structure, such as a database, stored in a memory associated with the autonomous driving system 113. The data structure may identifying one or more categories of autonomous driving zones. Each category of autonomous driving zone, of the one or more categories of autonomous driving zones, may be associated with a set of one or more vehicle objectives stored in the data structure.

As shown in FIG. 1F, the autonomous driving system 113 may cause the set of one or more vehicle objectives associated with the category of autonomous driving zone identified in the request to be displayed via the user interface. A user (e.g., a passenger of the vehicle 109 and/or a passenger of the vehicle 111) may input a selection of a vehicle objective from the list of the vehicle objectives via the user interface.

As shown in FIG. 1F, and by reference number 126, the autonomous driving system 113 may receive the input and may determine the vehicle objective based on the input. As shown in FIG. 1F, and by reference number 128, the autonomous driving system 113 may transmit information identifying the vehicle objective to the central planning platform 101.

As shown in FIG. 1G, and by reference number 130, the central planning platform 101 may receive the information identifying the vehicle objective from the vehicle 109 and the vehicle 111. The central planning platform 101 may determine a vehicle objective associated with the vehicle 109 and a vehicle objective associated with the vehicle 111 based on the received information.

In some implementations, the central planning platform 101 may perform vehicle routing and optimal path planning based on the vehicle objective associated with the vehicle 109 and the vehicle objective associated with the vehicle 111. For example, the central planning platform 101 may determine first routing information for the vehicle 109 based on the vehicle objective associated with the vehicle 109. The central planning platform 101 may determine second routing information for the vehicle 111 based on the vehicle objective associated with the vehicle 111. The first and second routing information may allow the vehicle 109 and the vehicle 111 to satisfy the vehicle objective associated with the vehicle 109 and the vehicle objective associated with the vehicle 111, respectively, while optimizing (e.g., minimizing) a total distance traveled by the vehicle 109 and/or the vehicle 111, a travel time for the vehicle 109 and/or the vehicle 111, and/or the like.

In some implementations, the first routing information and/or the second routing information may include a sequence of way points. Each way point may be a coordinate pair (e.g., $waypoint_i=(x_i, y_i)$) in the map of the autonomous driving zone.

In some implementations, the central planning platform 101 may perform vehicle routing and optimal path planning based on a Bellman equation. For example, the central planning platform 101 may merge sensor data from the sensors 103 into the map of the autonomous driving zone. The map may be a continuous, approximated by a combination of functions, and/or a discrete map. The central planning platform 101 may then apply a time-discounted Bellman equation to the map to determine the first and second routing information.

In some implementations, the central planning platform 101 may utilize a policy search to determine the first and/or second routing information. A policy (e.g., $\pi(s,a)$) may describe an action that may be taken by the vehicle 109 and/or the vehicle 111. The policy is a function that returns a probability of taking an action (a) in a state (s). For a given state, it may be true that $\Sigma_a \pi(s, a)=1$.

To learn the optimal policy (e.g., the optimal route) for vehicle 109 and/or vehicle 111, the central planning platform 101 may utilize a value function, such as a state value function (V(s)) and/or an action value function (Q(s,a)). The state value function may describe the value of a state when following a policy. The value of a state may be the expected return (R) when starting from a state and acting according to a policy. In some implementations, the state value function may be represented as $V^\pi = a_\pi[R_t|s_t=s]$. The action value function may describe the value of taking an action in a state when following a certain policy. The action value function may be the expected return (R) given the state (s) and the action (a) for a policy ($\pi$). In some implementations, the action value function may be represented as $Q^\pi(s,a)=E_\pi[R_t|s_t=s, a_t=a]$. In some implementations, the central planning platform 101 may utilize a Bellman equation and/or a discounted Bellman equation to determine a policy (e.g., the routing information) utilizing the state value function and/or the action value function.

In some implementations, the central planning platform 101 may update the map of the autonomous driving zone. The central planning platform 101 may perform the vehicle routing and the optimal path planning based on the updated map.

In some implementations, the central planning platform may update the map based on sensor data obtained by the sensors 103, the vehicle 109, and/or the vehicle 111. For example, as shown in FIG. 1G, and by reference number 132, the central planning platform 101 may request sensor data from the sensors 103, the vehicle 109, and/or the vehicle 111.

Figure 1H:
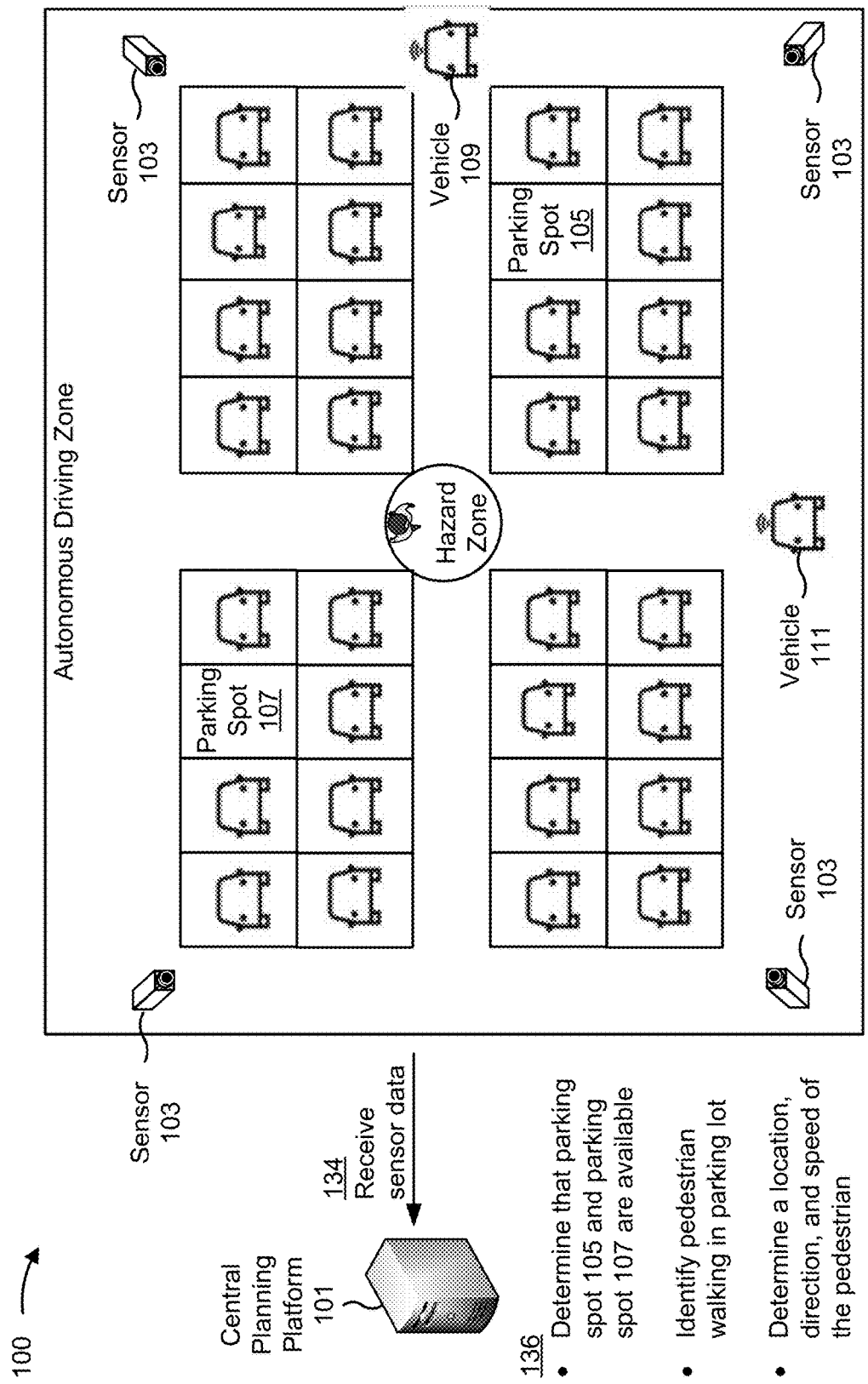

As shown in FIG. 1H, and by reference number 134, the central planning platform 101 may receive sensor data from the sensors 103, the vehicle 109, and/or the vehicle 111 based on the request. The central planning platform 101 may perform fusion of the sensor data received from the sensors 103, the sensor data received from the vehicle 109, and/or the sensor data received from the vehicle 111 and update the map of the autonomous driving zone based on the fused sensor data. In some implementations, the central planning platform 101 may update the map by modifying the set of initial constraints and/or driving restrictions based on the sensor data, in a manner similar to that discussed above.

For example, central planning platform 101 may determine that an objective of the vehicle 109 is to park in an available parking spot based on the vehicle objective information received from the vehicle 109. The central planning platform 101 may determine that an objective of the vehicle 111 is also to park in an available parking spot based on the vehicle objective information received from the vehicle 111. The central planning platform 101 may update the map of the autonomous driving zone to indicate available parking spots.

In some implementations, as shown in FIG. 1H, and by reference number 136, the central planning platform 101 may determine that parking spot 105 and parking spot 107 are available based on the sensor data received from the sensors 103, the sensor data received from the vehicle 109, and/or the sensor data received from the vehicle 111. The central planning platform 101 may update the map to indicate that the parking spot 105 and the parking spot 107 are available.

In some implementations, the central planning platform 101 may update the map to indicate a hazard zone. For example, the central planning platform 101 may analyze the sensor data received from the sensors 103, the sensor data received from the vehicle 109, and/or the sensor data received from the vehicle 111 to identify an object within the autonomous driving zone (e.g., a person, an animal, a vehicle, and/or the like), a location of the object, a speed of the object, and/or a direction of travel of the object.

In some implementations, the central planning platform 101 may determine a projected path of the object based on the location of the object, the speed of the object, and/or the direction of travel of the object. For example, based on the location of the object, the speed of the object, and/or the direction of travel of the object, the central planning platform 101 may determine a probability distribution of object locations for the object over a time period (e.g., 1 second, 30 seconds, 1 minute, 5 minutes, and/or the like).

In some implementations, the central planning platform 101 may determine a hazard zone associated with the object based on the projected path of the object. For example, the central planning platform 101 may determine a hazard zone associated with the object based on the probability distribution of object locations for the object over the period of time.

In some implementations, the central planning platform 101 may determine a set of points (e.g., a set of coordinate pairs) surrounding a current location of the object. The central planning platform 101 may determine a probability associated with the object moving from the current location of the object to each point included in the set of points based on the speed of the object and/or the direction of travel of the object. For each point in the set of points, the central planning platform 101 may determine a probability of the object moving from that point to one or more points surrounding that point. This computation may be performed using particle filtering, Bayes based probability propagation, diffusion or wave partial differential equation, and/or another method for determining a probability of the object moving from a point to one or more points surrounding that point. The central planning platform 101 may continue the process in an iterative manner to determine a probability distribution of object locations for the object. The central planning platform 101 may determine the hazard zone associated with the object based on the determined probabilities. For example, the central planning platform 101 may determine the hazard zone to include points for which a probability that the object will travel to that point is greater than a threshold probability.

In some implementations, the central planning platform 101 may update the map based on identifying the hazard zone. For example, the central planning platform 101 may update the map to include hazard information. In some implementations, the hazard information may include information identifying a hazard and/or object associated with the hazard zone (e.g., a person, an animal, a vehicle, and/or the like within the hazard zone), information identifying the projected path of the object, information identifying an area included in the hazard zone, and/or the like.

For example, the central planning platform 101 may analyze the sensor data received from the sensors 103, the sensor data received from the vehicle 109, and/or the sensor data received from the vehicle 111. As shown in FIG. 1H, and by reference number 136, the central planning platform 101 may identify a pedestrian walking in the parking lot and may determine a location, a speed, and a direction of travel of the pedestrian based on analyzing the sensor data received from the sensors 103, the sensor data received from the vehicle 109, and/or the sensor data received from the vehicle 111. As also shown in FIG. 1H, and by reference number 136, the central planning platform 101 may determine a hazard zone based on the location, the speed, and the direction of travel of the pedestrian. The central planning platform 101 may update the map to include information identifying the hazard zone.

In some implementations, the central planning platform 101 may determine a traffic control restriction (e.g., a location of a stop sign, a location of a traffic control signal, a state (e.g., red, green, yellow) of a traffic control signal, and/or the like) and/or a driving restriction (e.g., a maximum speed, a minimum speed, and/or the like) based on a fusion of the sensor data received from the sensors 103, the sensor data received from the vehicle 109, and/or the sensor data received from the vehicle 111. The central planning platform 101 may update the map based on the traffic control restriction and/or the driving restriction.

For example, the central planning platform 101 may determine a maximum speed of travel for a vehicle traveling within a hazard zone. The central planning platform 101 may determine the maximum speed of travel based on a speed of an object moving within the hazard zone, a type of object (e.g., an animal, a person, and/or the like) moving within the hazard zone, a size (e.g. a width) of a road included in the hazard zone, a number of vehicles traveling within the hazard zone, and/or the like. The central planning platform 101 may update the map to include information identifying the maximum speed of travel for a vehicle traveling within the hazard zone.

In some implementations, the central planning platform 101 may utilize machine learning to determine the traffic control restriction and/or the driving restriction. For example, the central planning platform 101 may include a machine learning system for generating, training and/or utilizing a machine learning model for determining the traffic control restriction and/or the driving restriction.

In some implementations, a machine learning model may be trained using a set of observations. The set of observations may be obtained and/or input from historical data, such as data gathered from the sensors 103, the vehicle 109, and/or the vehicle 111.

A feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on sensor data received from the sensors 103, the vehicle 109, and/or the vehicle 111. For example, the sensor data may include structured data and the central planning platform 101 may input the structured data into the machine learning system.

The machine learning system may identify a feature set (e.g., one or more features and/or corresponding feature values) from the structured data, such as by extracting data from a particular column of a table, extracting data from a particular field of a form, extracting data from a particular field of a message, extracting data received in a structured data format, and/or the like. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of a speed of an object moving within the hazard zone, a second feature of a type of object (e.g., an animal, a person, and/or the like) moving within the hazard zone, a third feature of a size (e.g. a width) of a road included in the hazard zone, a fourth feature of a number of vehicles traveling within the hazard zone, and/or the like. For a first observation, the first feature may have a value of a 5 mph, the second feature may have a value of a person, the third feature may have a value of 2 lanes, and so on. These features and feature values are provided as examples, and may differ in other examples.

In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

The set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

The machine learning system may partition the set of observations into a training set that includes a first subset of observations, of the set of observations, and a test set that includes a second subset of observations of the set of observations. The training set may be used to train (e.g., fit, tune, and/or the like) the machine learning model, while the test set may be used to evaluate a machine learning model that is trained using the training set. For example, for supervised learning, the test set may be used for initial model training using the first subset of observations, and the test set may be used to test whether the trained model accurately predicts target variables in the second subset of observations. In some implementations, the machine learning system may partition the set of observations into the training set and the test set by including a first portion or a first percentage of the set of observations in the training set (e.g., 75%, 80%, or 85%, among other examples) and including a second portion or a second percentage of the set of observations in the test set (e.g., 25%, 20%, or 15%, among other examples). In some implementations, the machine learning system may randomly select observations to be included in the training set and/or the test set.

The machine learning system may train a machine learning model using the training set. This training may include executing, by the machine learning system, a machine learning algorithm to determine a set of model parameters based on the training set. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set). For example, for a regression algorithm, a model parameter may include a regression coefficient (e.g., a weight). For a decision tree algorithm, a model parameter may include a decision tree split location, as an example.

The machine learning system may use one or more hyperparameter sets to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set. The machine learning system may tune each machine learning algorithm using one or more hyperparameter sets (e.g., based on operator input that identifies hyperparameter sets to be used, based on randomly generating hyperparameter values, and/or the like). The machine learning system may train a particular machine learning model using a specific machine learning algorithm and a corresponding hyperparameter set. In some implementations, the machine learning system may train multiple machine learning models to generate a set of model parameters for each machine learning model, where each machine learning model corresponds to a different combination of a machine learning algorithm and a hyperparameter set for that machine learning algorithm.

In some implementations, the machine learning system may perform cross-validation when training a machine learning model. Cross validation can be used to obtain a reliable estimate of machine learning model performance using only the training set, and without using the test set, such as by splitting the training set into a number of groups (e.g., based on operator input that identifies the number of groups, based on randomly selecting a number of groups, and/or the like) and using those groups to estimate model performance. For example, using k-fold cross-validation, observations in the training set may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set associated with a particular machine learning algorithm. The machine learning system may compare the overall cross-validation scores for different hyperparameter sets associated with the particular machine learning algorithm, and may select the hyperparameter set with the best (e.g., highest accuracy, lowest error, closest to a desired threshold, and/or the like) overall cross-validation score for training the machine learning model. The machine learning system may then train the machine learning model using the selected hyperparameter set, without cross-validation (e.g., using all of data in the training set without any hold-out groups), to generate a single machine learning model for a particular machine learning algorithm. The machine learning system may then test this machine learning model using the test set to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model to be used to analyze new observations, as described below.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set (e.g., without cross-validation), and may test each machine learning model using the test set to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model.

Additionally, or alternatively, the machine learning model may employ a different machine learning algorithm, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

The trained machine learning model may be applied to a new observation. The new observation may be input to a machine learning system that stores a trained machine learning model.

For example, the machine learning system may receive a new observation (or a set of new observations), and may input the new observation to the machine learning model. The new observation may include a first feature of a speed of an object moving within the hazard zone, a second feature of a type of object (e.g., an animal, a person, and/or the like) moving within the hazard zone, a third feature of a size (e.g. a width) of a road included in the hazard zone, a fourth feature of a number of vehicles traveling within the hazard zone, and/or the like. The machine learning system may apply the trained machine learning model to the new observation to generate an output (e.g., a result). For example, the trained machine learning model may predict a value of for the target variable of a maximum speed within the hazard zone for the new observation.

In this way, the machine learning system may apply a rigorous and automated process to determining traffic control constraints and/or driving restrictions. The machine learning system enables recognition and/or identification of tens, hundreds, thousands, or millions of features and/or feature values for tens, hundreds, thousands, or millions of observations, thereby increasing an accuracy and consistency of determining traffic control constraints and/or driving restrictions relative to requiring computing resources to be allocated for tens, hundreds, or thousands of operators to manually determining traffic control constraints and/or driving restrictions using the features or feature values.

Figure 1I:
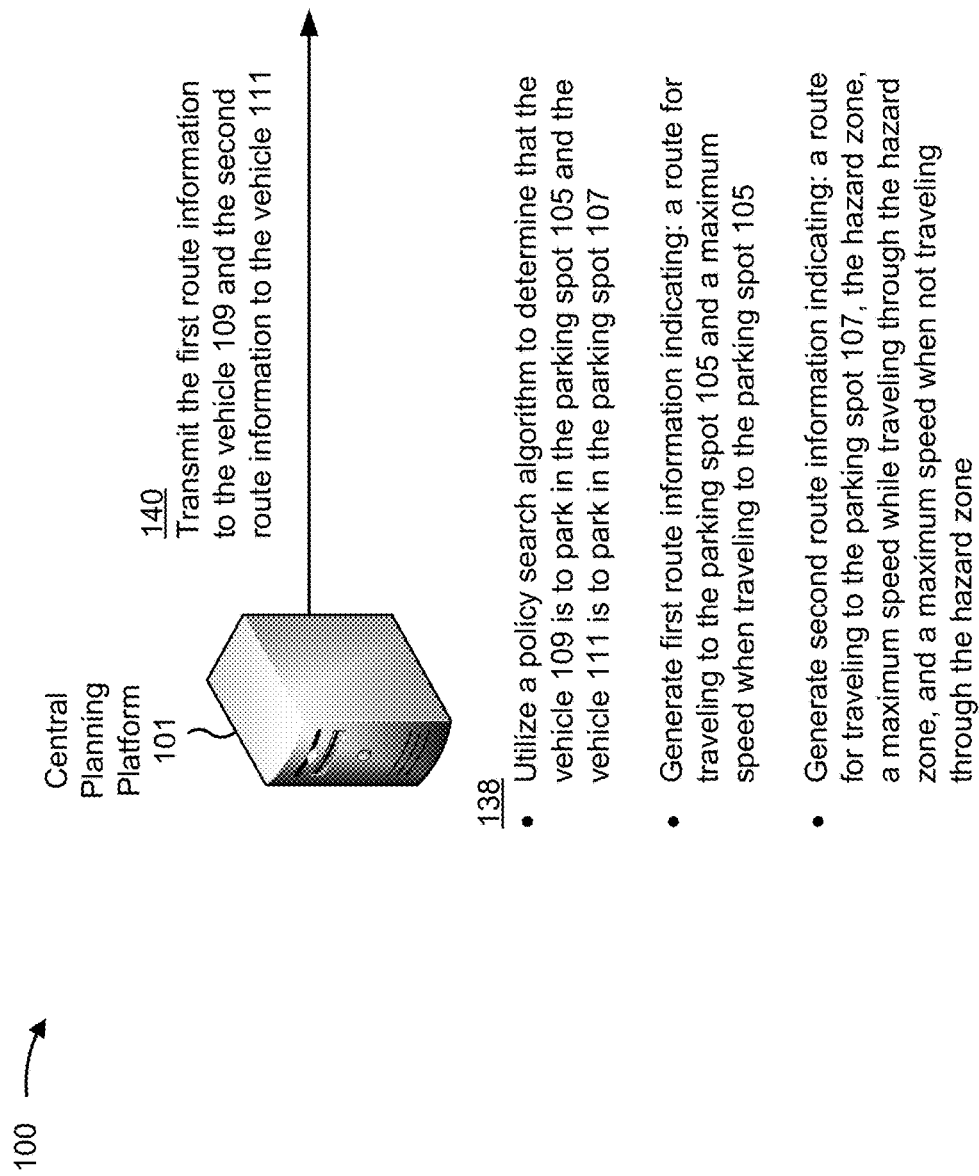

The central planning platform 101 may perform vehicle routing and optimal path planning for the vehicle 109 and the vehicle 111 based on the updated map. For example, as shown in FIG. 1I, and by reference number 138, the central planning platform 101 may utilize a policy search algorithm to determine that the vehicle 109 is to travel to, and park in, the parking spot 107 and that the vehicle 111 is to travel to, and park in, the parking spot 105.

In some implementations, the central planning platform 101 may utilize the policy search algorithm to perform a policy search to determine a set of routes that satisfy the vehicle objective associated with the vehicle 109 and the vehicle objective associated with the vehicle 111 while minimizing a total cost associated with the vehicle 109 satisfying the objective associated with the vehicle 109 and the vehicle 111 satisfying the objective associated with the vehicle 111.

In some implementations, the total cost associated with the vehicle 109 satisfying the objective associated with the vehicle 109 and the vehicle 111 satisfying the objective associated with the vehicle 111 may include a cost associated with the vehicle 109 traveling to the parking spot 105, a cost associated with the vehicle 109 traveling to the parking spot 107, a cost associated with the vehicle 111 traveling to the parking spot 105, a cost associated with the vehicle 111 traveling to the parking spot 107, a cost associated with traveling through the hazard zone, a cost associated with the traffic control restriction, and/or a cost associated with the driving restriction.

In some implementations, the central planning platform 101 may perform the policy search based on a set of policies. For example, the central planning platform 101 may determine a first set of policies associated with the vehicle 109 satisfying the vehicle objective associated with the vehicle 109 and a second set of policies associated with the vehicle 111 satisfying the vehicle objective associated with the vehicle 111.

In some implementations, the first set of policies may include a first policy and a second policy. The first policy may be associated with the vehicle 109 satisfying the vehicle objective associated with the vehicle 109 by traveling to, and parking in, the parking spot 105. The second policy may be associated with the vehicle 109 satisfying the vehicle objective associated with the vehicle 109 by traveling to, and parking in, the parking spot 107.

In some implementations, the second set of policies may include a third policy and a fourth policy. The third policy may be associated with the vehicle 111 satisfying the vehicle objective associated with the vehicle 111 by traveling to, and parking in, the parking spot 105. The fourth policy may be associated with the vehicle 111 satisfying the vehicle objective associated with the vehicle 111 by traveling to, and parking in, the parking spot 107.

In some implementations, the central planning platform 101 may determine a value and/or a cost associated with each policy included in the first set of policies (e.g., the first policy and the second policy) and may determine a value and/or a cost associated with each policy included in the second set of policies (e.g., the third policy and the fourth policy). In some implementations, the central planning platform 101 may use a machine learning model to determine the value and/or the cost associated with each policy included in the first set of policies and the value and/or the cost associated with each policy included in the second set of policies.

For example, the central planning platform 101 may train the machine learning model based on one or more parameters associated with the autonomous driving zone, such as a quantity of parking spots within the autonomous driving zone, a quantity of available parking spots within the autonomous driving zone, a quantity of unavailable parking spots within the autonomous driving zone, a distance from an entrance of the autonomous driving zone to each parking spot within the autonomous driving zone, a distance from an entrance of the autonomous driving zone to each available parking spot within the autonomous driving zone, an amount of time associated with traveling from an entrance of the autonomous driving zone to each parking spot within the autonomous driving zone, an average speed of a vehicle traveling within the autonomous driving zone, an objective associated with each vehicle located within the autonomous driving zone, a hazard area associated with the autonomous driving zone, a restricted area (e.g., an area where vehicular traffic is prohibited) within the autonomous driving zone, a type of each vehicle (e.g., autonomous, non-autonomous, semi-autonomous, car, truck, van, and/or the like) within the autonomous driving zone, and/or the like.

In some implementations, the central planning platform 101 may train the machine learning model, according to the one or more parameters, using historical data associated with the vehicle objective associated with the vehicle 109 and/or the vehicle objective associated with the vehicle 111. Using the historical data and the one or more parameters as inputs to the machine learning model, the central planning platform 101 may determine first route information for the vehicle 109 and may determine second route information for the vehicle 109 to minimize a cost (e.g., a distance traveled) and while satisfying the vehicle objective associated with the vehicle 109 and the vehicle objective associated with the vehicle 111.

In some implementations, the central planning platform 101 may determine that the vehicle 109 is to travel to, and park in, the parking spot 107 based on a distance. For example, the central planning platform 101 may determine that a distance from a current location of the vehicle 109 to the parking spot 105 is less than a distance from the current location of the vehicle 109 to the parking spot 107. The central planning platform 101 may determine that the vehicle 109 is to travel to, and park in, the parking spot 105 based on the distance from the current location of the vehicle 109 to the parking spot 105 being less than the distance from the current location of the vehicle 109 to the parking spot 107.

In some implementations, the central planning platform 101 may determine that the vehicle 109 is to travel to, and park in, the parking spot 107 based on a travel time (e.g., an amount of time for traveling from point A to point B). For example, the central planning platform 101 may determine that a travel time associated with the vehicle 109 traveling to the parking spot 105 is less than a traveling time associated with the vehicle 109 traveling to the parking spot 107. The central planning platform 101 may determine that the vehicle 109 is to travel to, and park in, the parking spot 105 based on the travel time associated with the vehicle 109 traveling to the parking spot 105 being less than the traveling time associated with the vehicle 109 traveling to the parking spot 107.

In some implementations, the central planning platform 101 may determine that the vehicle 111 is to travel to, and park in, the parking spot 107 based on determining that the vehicle 109 is to travel to, and park in, the parking spot 105. For example, the central planning platform 101 may determine that a distance from a current location of the vehicle 109 to the parking spot 105 is less than a distance from a current location of the vehicle 111 to the parking spot 105. The central planning platform 101 may determine that the vehicle 109 will arrive at the parking spot 105 prior to the vehicle 111 based on the distance from a current location of the vehicle 109 to the parking spot 105 being less than the distance from a current location of the vehicle 111 to the parking spot 105.

Alternatively, and/or additionally, the central planning platform may determine that an amount of time associated with the vehicle 109 traveling from a current location of the vehicle 109 to the parking spot 105 is less than amount of time associated with the vehicle 111 traveling from the current location of the vehicle 111 to the parking spot 105. For example, the central planning platform 101 may determine that the vehicle 111 will travel through the hazard zone when traveling to the parking spot 105. The central planning platform 101 may determine a maximum speed associated with traveling through the hazard zone based on the hazard information included in the updated map. The central planning platform 101 may determine that the vehicle 109 will arrive at the parking spot 105 prior to the vehicle 111 based on the vehicle 111 traveling through the hazard zone and the maximum speed associated with traveling through the hazard zone.

The central planning platform 101 may determine that the parking spot 105 is unavailable with respect to the vehicle 111 based on the vehicle 109 arriving at the parking spot 105 prior to the vehicle 111. The central planning platform 101 may determine that the vehicle 111 is to travel to, and park in, the parking spot 107 based on the parking spot 105 being unavailable with respect to the vehicle 111.

Utilizing only data obtained from internal sensors associated with the autonomous driving system 113 and/or without knowing the vehicle objective associated with the vehicle 109, the autonomous driving system 113 of the vehicle 111 may determine that the parking spot 105 is available and/or that a distance from a current location of the vehicle 111 to the parking spot 105 is less than a distance from the current location of the vehicle 111 to the parking spot 107 and may cause the vehicle 111 to travel to the parking spot 105 based thereon.

However, because the distance from the current location of the vehicle 109 to the parking spot 105 is less than the distance from the current location of the vehicle 111 to the parking spot 105 and/or because the vehicle 111 will travel through the hazard zone, the vehicle 109 may arrive at the parking spot 105 before the vehicle 111 and the parking spot 105 will be unavailable with respect to the vehicle 111. The autonomous driving system 113 of the vehicle 111 may then cause the vehicle to travel the parking spot 107 based on the parking spot 105 no longer being available thereby increasing a cost associated with the traveling of the vehicle 111 to an available parking spot.

Because the central planning platform 101 is able to determine the objective of the vehicle 109 and the objective of the vehicle 111, the central planning platform 101 can instruct the vehicle 111 to travel to the parking spot 107. In this way, costs associated with the traveling of the vehicle 109 to an available parking spot can be reduced.

In some implementations, as shown in FIG. 1I, and by reference number 138, the central planning platform 101 may generate first route information for the vehicle 109 based on determining that the vehicle 109 is to travel to, and park in, the parking spot 105. For example, the central planning platform 101 may generate first route information that includes information indicating a first route for traveling from a current location of the vehicle 109 to the parking spot 105.

In some implementations, the first route information may include information identifying the first route, information indicating a maximum speed when traveling to the parking spot 105, and/or other information associated with the vehicle 109 traveling to, and/or parking in, the parking spot 105.

In some implementations, as shown in FIG. 1I, and by reference number 138, the central planning platform 101 may generate second route information for the vehicle 111 based on determining that the vehicle 111 is to travel to, and park in, the parking spot 107. For example, the central planning platform 101 may generate second route information that identifies a second route for traveling from a current location of the vehicle 111 to the parking spot 107.

In some implementations, the second route information may include information identifying the second route, one or more portions of the hazard information, information indicating a maximum speed of the vehicle 111 when traveling through the hazard zone, information indicating a maximum speed when traveling outside of the hazard zone and to the parking spot 107, and/or other information associated with the vehicle 111 traveling to, and/or parking in, the parking spot 107.

In some implementations, the hazard information may include information indicating a probability of a collision between the vehicle 111 and the object. For example, the central planning platform 101 may determine the projected path of the object based on the hazard information included in the map. The central planning platform may determine a probability of a collision between the vehicle 111 and the object based on the first route information and the projected path of the object.

As shown in FIG. 1I, and by reference number 140, the central planning platform 101 may transmit the first route information to the vehicle 109 and may transmit the second route information to the vehicle 111.

Figure 1J:
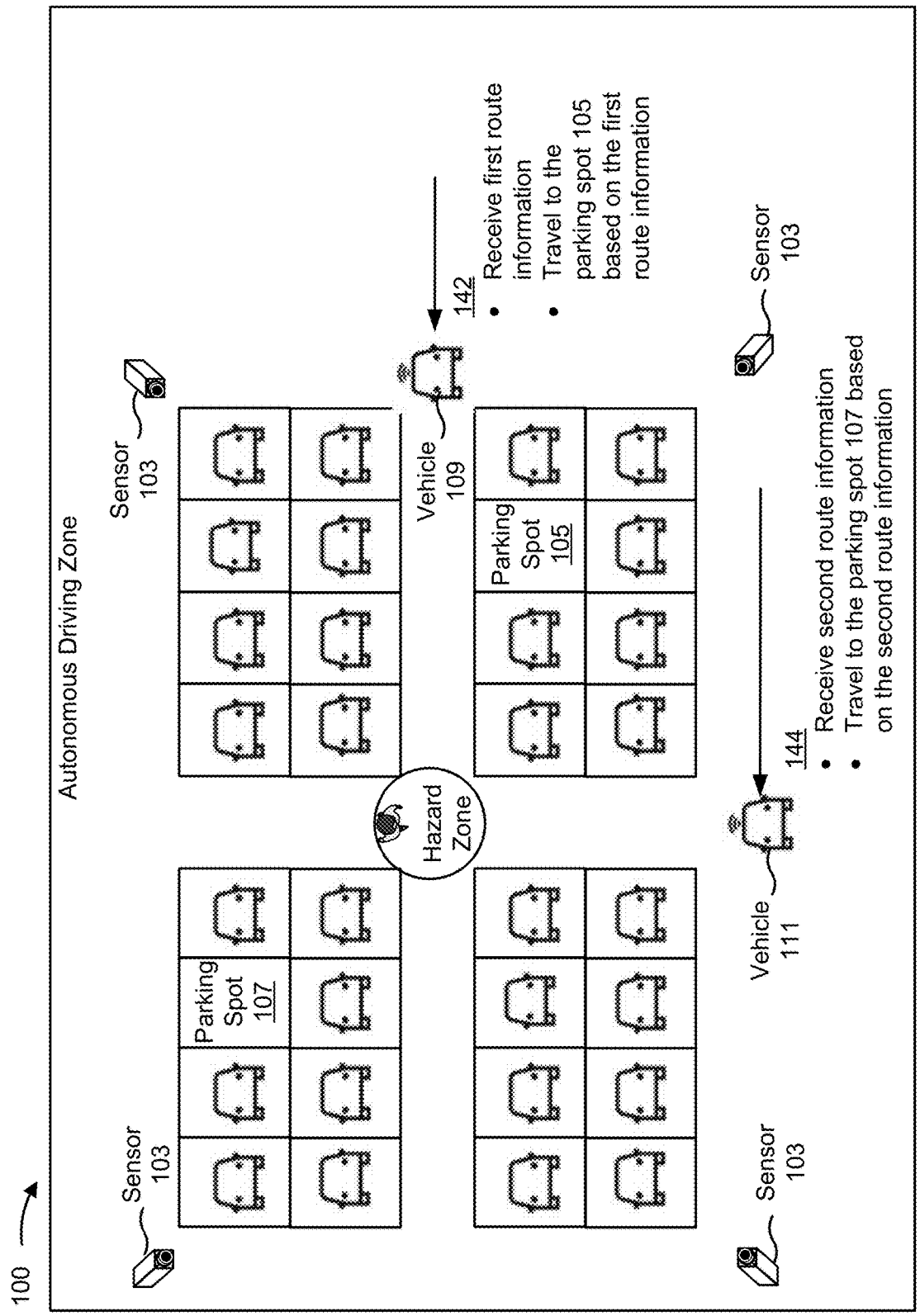

As shown in FIG. 1J, and by reference number 142, the autonomous driving system 113 of the vehicle 109 may receive the first route information and may control an operation of the vehicle 109 based on the first route information. As shown in FIG. 1J, and by reference number 144, the autonomous driving system 113 of the vehicle 111 may receive the second route information and may control an operation of the vehicle 111 based on the second route information.

In some implementations, the central planning platform 101 may modify the first route information and may transmit the modified first route information to the vehicle 109. For example, the central planning platform 101 may modify the first route information based on determining that the vehicle 111 is traveling a third route that is different than the second route indicated by the second route information.

In some implementations, the central planning platform 101 may monitor an area associated with a portion of the second route. For example, the central planning platform 101 may request sensor data from the sensors 103, the autonomous driving system 113 of the vehicle 111 (e.g., an internal sensor associated with the vehicle 111), and/or the autonomous driving system 113 of the vehicle 109 (e.g., an internal sensor associated with the vehicle 111). The central planning platform 101 may determine a current location of the vehicle 111, a speed of the vehicle 111, a direction of travel of the vehicle 111, and/or the like based on the sensor data.

In some implementations, the central planning platform 101 may determine that the vehicle 111 is traveling the third route and that the third route intersects the second route based on the current location of the vehicle 111, the speed of the vehicle 111, and/or the direction of travel of the vehicle 111. The central planning platform 101 may determine modified first routing information for the vehicle 109 based on determining that the third route intersects the first route. The modified first routing information may identify a modified first route that does not intersect the third route and that satisfies the vehicle objective associated with the vehicle 109. The central planning platform 101 may transmit the modified first routing information to the vehicle 109. The vehicle 109 may receive the modified first routing information and may cause the vehicle 109 to travel along the modified first route.

In some implementations, the central planning platform 101 may monitor an area associated with the second route to detect a presence of a hazard (e.g., an object such as a person, an animal, and/or the like). For example, the central planning platform 101 may request sensor data from the sensors 103, the autonomous driving system 113 of the vehicle 111 (e.g., an internal sensor associated with the vehicle 111), and/or the autonomous driving system 113 of the vehicle 109 (e.g., an internal sensor associated with the vehicle 111). The central planning platform 101 may monitor an area associated with the second route to detect a presence of a hazard or an unexpected event (e.g., a vehicle leaving a parking spot) based on the sensor data.

In some implementations, the central planning platform 101 may determine a current location of the vehicle 111 along the second route based on the sensor data. The central planning platform 101 may identify an area surrounding a portion of the second route that the vehicle 111 is traveling towards based on the current location of the vehicle 111. The central planning platform 101 may monitor the area surrounding the portion of the second route that the vehicle 111 is traveling towards to detect a presence of a hazard or an unexpected event prior to the vehicle 111 traveling through the area.

In some implementations, the vehicle 109 and/or the vehicle 111 may stop operating in the full autonomous mode based on determining that a communication link for transmitting data to and/or receiving data from the central planning platform 101 is not available. For example, the autonomous driving system 113 associated with the vehicle 109 may determine that a communication link between the autonomous driving system 113 and the central planning platform 101 is not available. The autonomous driving system 113 may cause the vehicle 109 to stop operating in the full autonomous driving mode based on the communication link not being available.

In some implementations, the vehicle 109 and/or the vehicle 111 may stop operating in the full autonomous mode based on receiving a signal from the central planning platform 101 is not available. For example, the central planning platform 101 may determine that a characteristic of a communication link between the central planning platform 101 and the vehicle 109 (e.g., a quality of service (QoS) associated with the communication link, a bandwidth associated with the communication link, and/or the like) may not satisfy a threshold value associated with the characteristic (e.g., a threshold QoS, a threshold bandwidth, and/or the like). The central planning platform 101 may transmit a signal to the vehicle 109 to cause the vehicle 109 to stop operating in the full autonomous mode based on the characteristic of the communication link failing to satisfy the threshold value. The autonomous driving system 113 of the vehicle 109 may receive the signal and may cause the vehicle 109 to stop operating in the full autonomous driving mode based on the signal.

As indicated above, FIGS. 1A-1J are provided merely as an example. Other examples are possible and may differ from what was described with regard to FIGS. 1A-1J.

FIGS. 2A-2J are diagrams of an overview of an example implementation 200 described herein. For example, as shown in FIGS. 2A-2J, example implementation 200 includes a central planning platform 201, sensor 203-1, sensor 203-2, traffic control signal 205-1, traffic control signal 205-2, and a vehicle 207 that includes an autonomous driving system 209. The number and arrangement of devices shown in FIGS. 2A-2J are provided as an example. In practice, there may be additional devices, fewer devices, different devices, or differently arranged devices than those shown in FIGS. 2A-2J.

The central planning platform 201 may be configured to perform high-level control commands to autonomous vehicles operating within an autonomous driving zone. For example, the central planning platform 201 may aggregate data from the sensor 203-1, the sensor 203-2, the traffic control signal 205-1, the traffic control signal 205-2, and/or the vehicle 207, determine an objective (e.g., travel to location A, park, and/or the like) for each autonomous vehicle within the autonomous driving area, and perform vehicle routing and optimum path planning for each autonomous vehicle within the autonomous driving area to allow each autonomous vehicle to satisfy the objective of the autonomous vehicle.

In some implementations, the central planning platform 201 may be located within, or near, the autonomous driving zone. For example, the central planning platform 201 may be located in close enough proximity to the autonomous driving zone that the central planning platform 201 may communicate wirelessly (e.g., over a 5G network) with the sensor 203-1, the sensor 203-2, the traffic control signal 205-1, the traffic control signal 205-2, and/or the vehicle 207 (e.g., a device, such as autonomous driving system 209, in vehicle 207 and/or the like). In this way, the central planning platform 201 may send and receive data to and from the other devices in, or near, the autonomous driving zone, via a low latency, high bandwidth localized network.

In some implementations, the sensor 203-1 and/or the sensor 203-2 may include a camera sensor, a ground pressure sensor, a radar sensor, a lidar sensor, and/or any other type of sensor capable of detecting and/or determining a position of an object (e.g., an autonomous vehicle, a non-autonomous vehicle, a person, an animal, and/or the like) within an autonomous driving zone.

In some implementations, the traffic control signal 205-1 and/or the traffic control signal 205-2 may include a device for controlling a flow of traffic through an intersection. The traffic control signal 205-1 and/or the traffic control signal 205-2 may be located at an intersection and may each be positioned to provide signals to vehicles approaching the intersection. For example, the traffic control signal 205-1 may be positioned to provide signals to vehicles approaching the intersection from the north and from the south of the intersection (as shown in FIG. 2A), and the traffic control signal 205-2 may be positioned to provide signals to vehicles approaching the intersection from the east and from the west of the intersection (as shown in FIG. 2A).

Figure 2A:
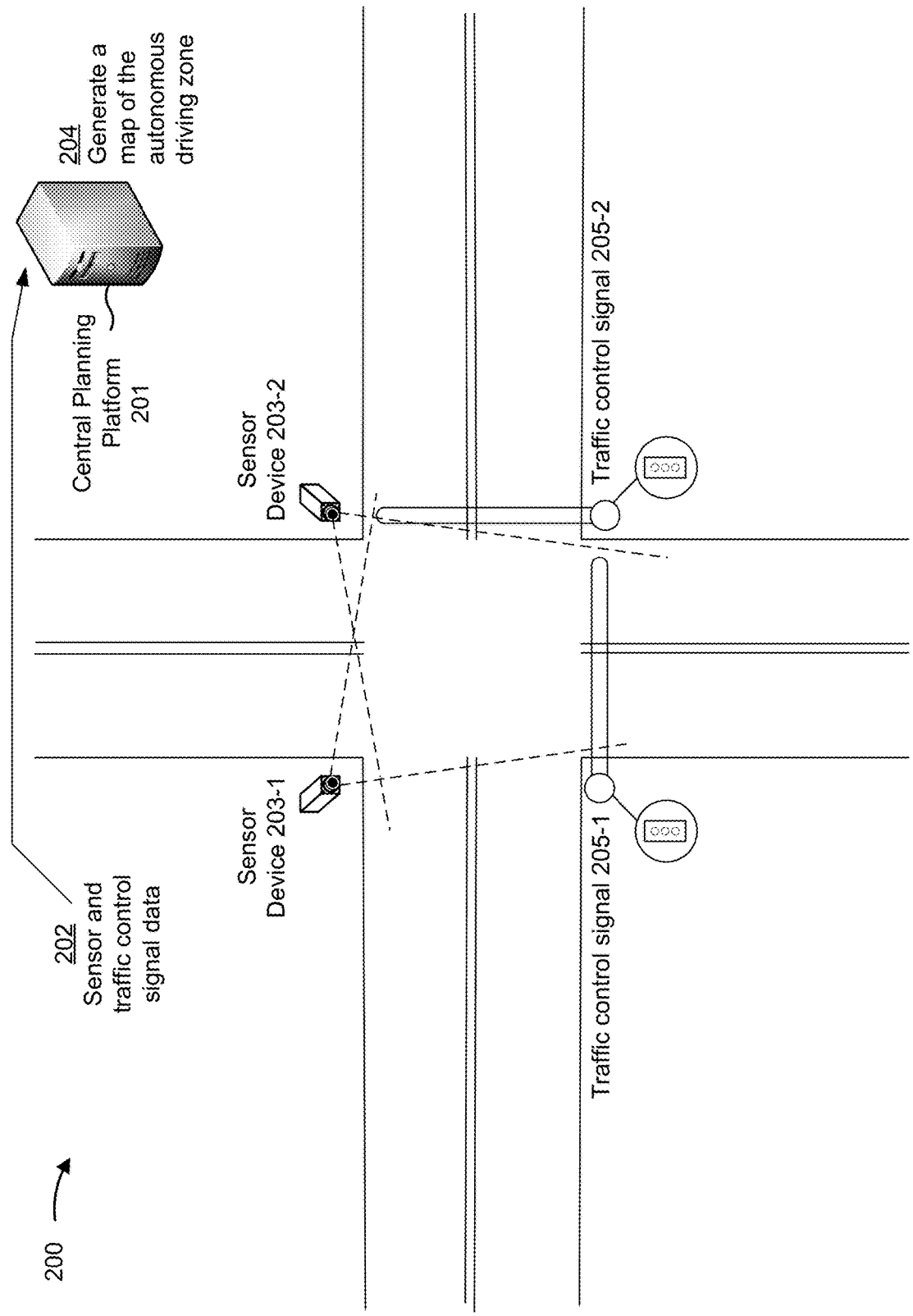
FIGS. 2A-2J are diagrams of an overview of an example implementation described herein.

In some implementations, as shown in FIG. 2A, and by reference number 202, the central planning platform 201 may receive sensor data from the sensor 203-1 and/or the sensor 203-2 and may receive traffic control signal data from the traffic control signal 205-1 and/or the traffic control signal 205-2. In some implementations, the sensor data may include image data of the autonomous driving zone. For example, the sensor 203-1 and/or the sensor 203-2 may include an imaging device (e.g., a camera, an infrared camera, a thermal imaging camera, and/or the like) and may utilize the imaging device to periodically obtain image data of the autonomous driving zone. The sensor 203-1 and/or the sensor 203-2 may transmit the obtained image data to the central planning platform 201.

In some implementations, the sensor 203-1 and/or the sensor 203-2 may obtain location information (e.g., a set of GPS coordinates, a latitude and a longitude, and/or the like) associated with the sensor 203-1 and/or the sensor 203-2 and/or an object located within the autonomous driving zone. For example, sensor 203-1 and/or the sensor 203-2 may include a GPS device and may utilize the GPS device to obtain GPS coordinates associated with the sensor 203-1 and/or the sensor 203-2. The sensor 203-1 and/or the sensor 203-2 may transmit the GPS coordinates to the central planning platform 201.

In some implementations, the traffic control signal data may include data indicating a current state of the traffic control signal 205-1 and/or the traffic control signal 205-2. The traffic control signal 205-1 and/or the traffic control signal 205-2 may transmit the traffic control signal data to the central planning platform 201 based on a change of the state of the traffic control signal 205-1 and/or the traffic control signal 205-2, based on receiving a request for traffic control signal data from the central planning platform 201, and/or based on an occurrence of another type of event.

In some implementations, the current state of the traffic control signal 205-1 and/or the traffic control signal 205-2 may correspond to a signal currently being provided by the traffic control signal 205-1 and/or the traffic control signal 205-2 to vehicles approaching the intersection. For example, the traffic control signal 205-1 and/or the traffic control signal 205-2 may each cause one of a plurality of colored lights (e.g., a red light, a yellow light, and/or a green light) to be selectively emitted from the traffic control signal 205-1 and/or the traffic control signal 205-2 to control a flow of traffic through the intersection. The traffic control signal data may indicate a current value of various parameters associated with the current state of the traffic control signal 205-1 and/or the traffic control signal 205-2.

In some implementations, as shown in FIG. 2A, and by reference number 204, the central planning platform 201 may generate a map of the autonomous driving zone based on the sensor data. For example, as shown in FIG. 2A, a traffic intersection may be designated as an autonomous driving zone in which an autonomous vehicle may operate in an autonomous mode. The central planning platform 201 may generate a map of the intersection.

In some implementations, the central planning platform 201 may generate the map based on data obtained from one or more external sensors. For example, the central planning platform 201 may receive sensor data from the sensor 203-1 and/or the sensor 203-2 and may generate the map based on the sensor data in a manner similar to that described above with respect to FIG. 1A.

Alternatively, and/or additionally, the central planning platform 201 may generate the map based on data obtained from one or more internal sensors associated with an autonomous vehicle. For example, the vehicle 207 may include one or more internal sensors (e.g., an imaging device, a radar, a lidar, and/or the like). The vehicle 207 may obtain sensor data from the one or more internal sensors and may transmit the sensor data to the central planning platform 201. The central planning platform 201 may receive the sensor data from the vehicle 207. The central planning platform 201 may generate the map based on the sensor data received from the vehicle 207.

In some implementations, the central planning platform 201 may generate the map based on a satellite image. For example, the central planning platform 201 may generate the map based on a satellite image in a manner similar to that described above with respect to FIG. 1A.

In some implementations, the central planning platform 201 may generate the map based on a boundary of the autonomous driving zone. For example, the central planning platform 201 may generate the map based on a boundary of the autonomous driving zone in a manner similar to that described above with respect to FIG. 1A.

In some implementations, the central planning platform 201 may generate the map based on a man-made structure (e.g., a building, a parking spot, a road, a sidewalk, a traffic control signal, a telephone pole, and/or the like) included in the autonomous driving zone. For example, as shown in FIG. 2A, the autonomous driving zone may include a plurality of roads forming an intersection. The sensor data may include one or more images of the plurality of roads. The central planning platform 201 may determine a size (e.g., a length and a width), a location, a number of lanes, and/or the like of the plurality of roads based on the image data. The central planning platform 201 may generate the map based on the size, the location, the number of lanes, and/or the like of the plurality of roads. For example, the central planning platform 201 may include information indicating the size, the location, the number of lanes, and/or the like of the plurality of roads on the map.

In some implementations, a user may input location information for a man-made structure. For example, a user may enter information identifying a type (e.g., a building, a parking spot, a road, a sidewalk, a traffic control signal, a telephone pole, and/or the like) and location information for each man-made structure included in the autonomous driving zone via a user interface associated with the central planning platform 201.

In some implementations, the central planning platform 201 may generate the map based on a natural structure (e.g., a body of water, a mountain, a depression in the earth, and/or the like) included in the autonomous driving zone. For example, the autonomous driving zone may include a land mass, such as, for example, a hill, a mountain, and/or the like. The sensor data may include one or more images of the land mass. The central planning platform 201 may determine a size (e.g., a length, a width, and/or a height) and a location of the land mass based on the image data. The central planning platform 201 may generate the map based on the size and the location of the land mass. For example, the central planning platform 201 may indicate the location of the land mass on the satellite image.

In some implementations, the central planning platform 201 may generate the map based on a moveable object (e.g., a vehicle, a person, an animal, and/or the like) located in the autonomous driving zone. For example, as shown in FIG. 2A, the vehicle 207 may be within the autonomous driving zone. The sensor data may include one or more images and/or location information associated with the vehicle 207. The central planning platform 201 may determine a location and/or movement information (e.g., a direction of travel, a speed, and/or the like) based on the one or more images and/or the location information. The central planning platform 201 may generate the map based on the location and the movement information determined for the vehicle 207. For example, the central planning platform 201 may indicate the location and the movement image determined for the vehicle 207 on the satellite image.

Figure 2B:
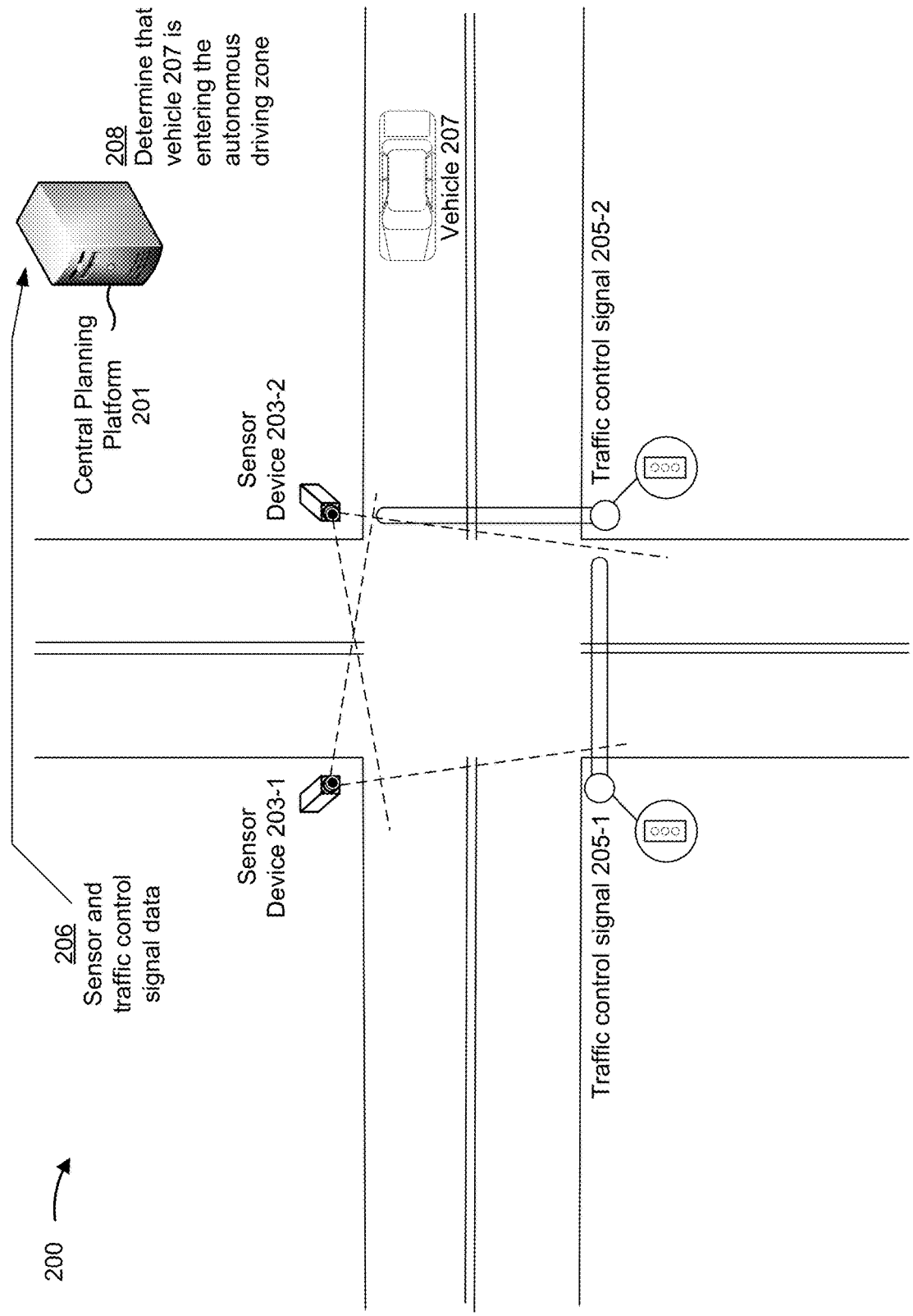

In some implementations, as shown in FIG. 2B, and by reference number 206, after generating the map, the central planning platform 201 may receive sensor data from the sensor 203-1, the sensor 203-2, the traffic control signal 205-1, the traffic control signal 205-2, and/or the vehicle 207. For example, the sensor 203-1 and/or the sensor 203-2 may detect a movement of an object (e.g., the vehicle 207, a pedestrian, and/or the like). The sensor 203-1 and/or the sensor 203-2 may obtain sensor data associated with the object based on detecting the movement of the object. The sensor 203-1 and/or the sensor 203-2 may transmit the obtained sensor data to the central planning platform 201.

In some implementations, as shown in FIG. 2B, and by reference number 208, the central planning platform 201 may determine that the vehicle 207 is entering the autonomous driving zone based on the sensor data. For example, the sensor data may include location information and movement information associated with the vehicle 207 and the central planning platform 201 may determine that the vehicle 207 is entering the autonomous driving zone in a manner similar to that described above with respect to FIG. 1B.

Figure 2C:
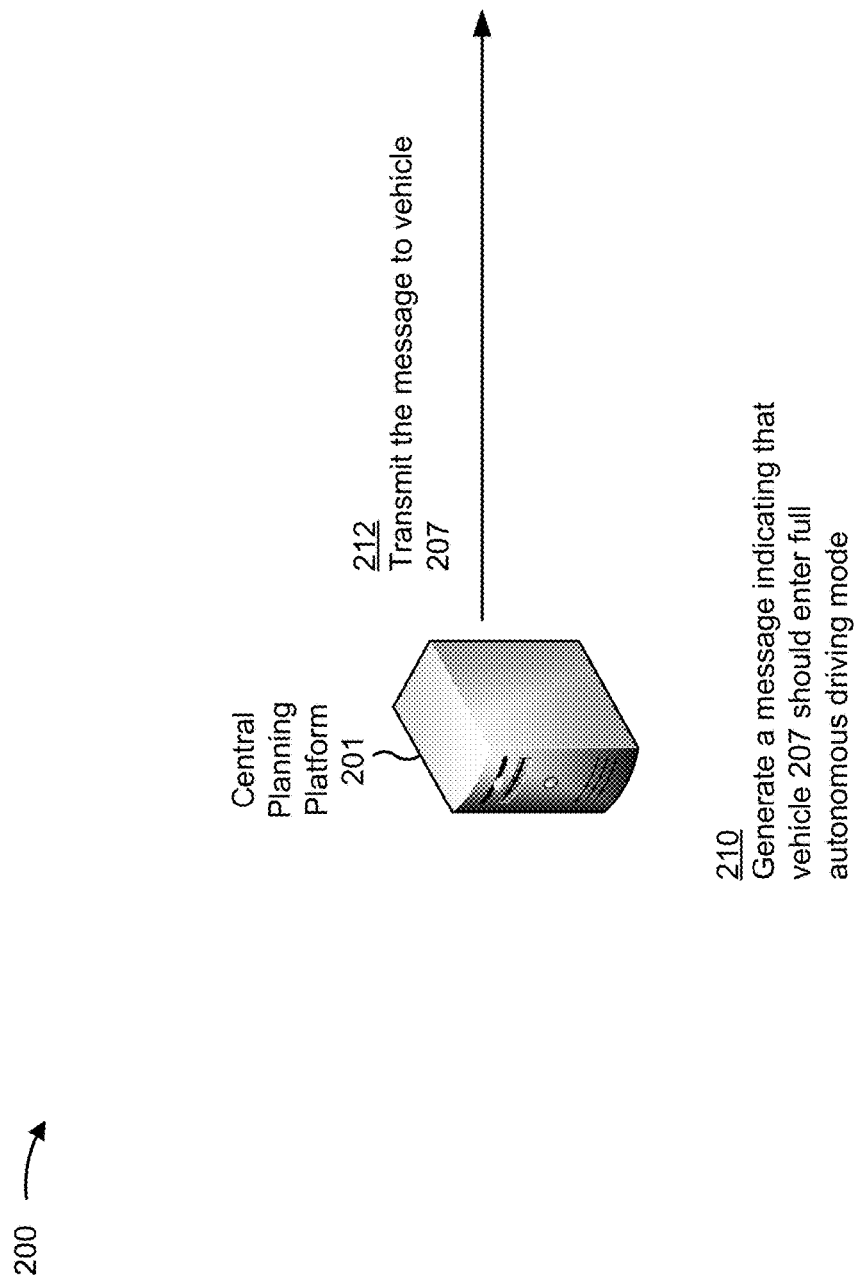

In some implementations, the central planning platform 201 may instruct the vehicle 207 to begin operating in a full autonomous driving mode based on determining that the vehicle 207 is entering the autonomous driving zone. For example, as shown in FIG. 2C, and by reference numbers 210 and 212, the central planning platform 201 may generate a message indicating that the vehicle 207 is to begin operating in a full autonomous driving mode and may transmit the message to the vehicle 207. In some implementations, the central planning platform 201 may generate the message indicating that the vehicle 207 is to begin operating in the full autonomous driving mode and may transmit the message to the vehicle 207 in a manner similar to that described above with respect to FIG. 1C.

Figure 2D:
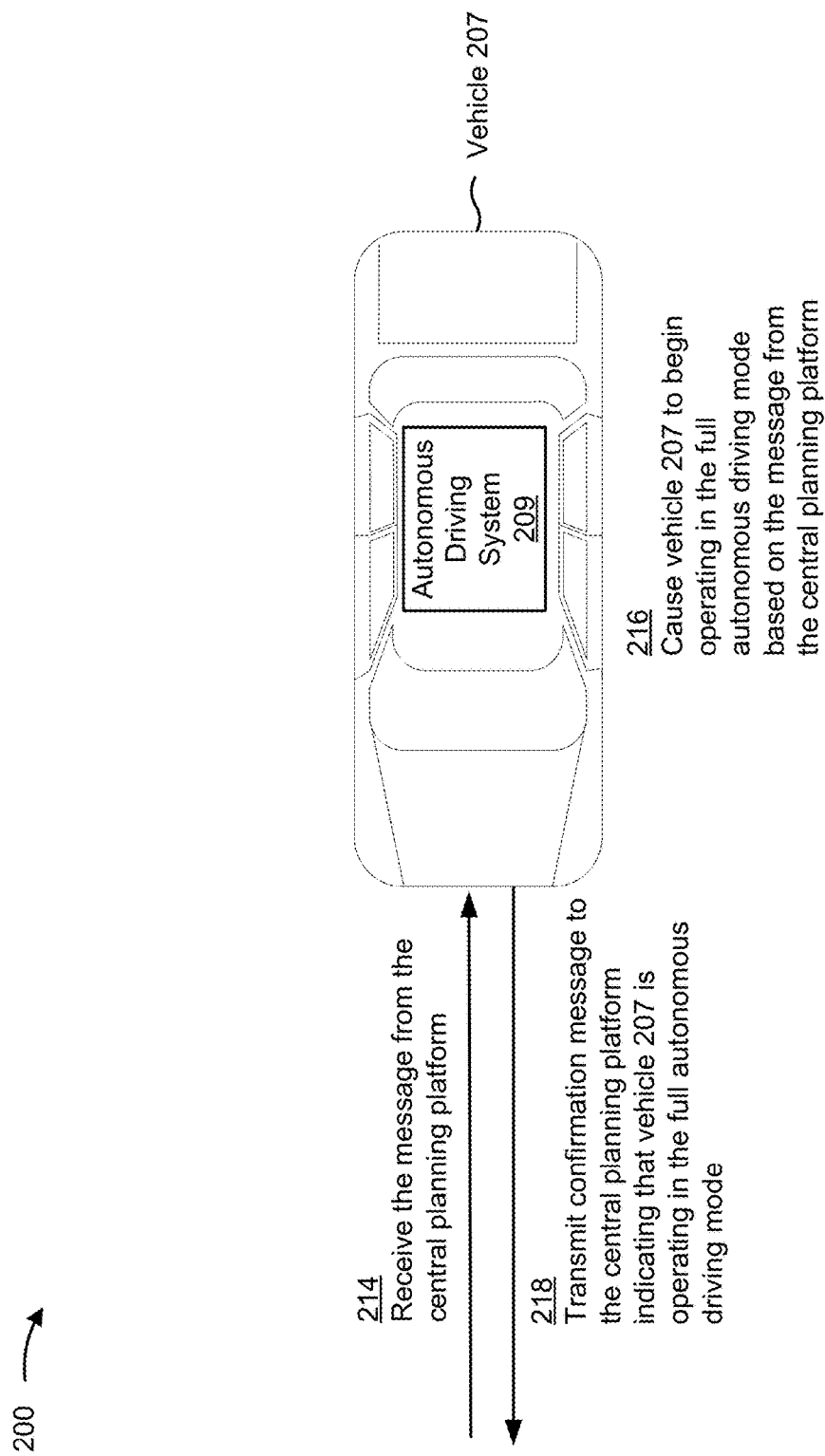

In some implementations, the vehicle 207 may begin operating in a full autonomous mode based on entering the autonomous driving zone. For example, as shown in FIG. 2D, and by reference numbers 214 and 216, the vehicle 207 (e.g., a device, such as an autonomous driving system 209 associated with the vehicle 207 and/or the like) may receive the message from the central planning platform 201 and may cause the vehicle to begin operating in a full autonomous driving mode based on the message. In some implementations, the vehicle 207 may receive the message and cause the vehicle to begin operating in the autonomous driving mode in a manner similar to that described above with respect to FIG. 1D.

In some implementations, the central planning platform 201 may determine that the vehicle 207 is operating in the full autonomous mode. For example, the vehicle 207 may generate a confirmation message based on the vehicle 207 entering the full autonomous driving mode. As shown in FIG. 2D, and by reference number 218, the vehicle 207 may transmit the confirmation message to the central planning platform 201.

Figure 2E:
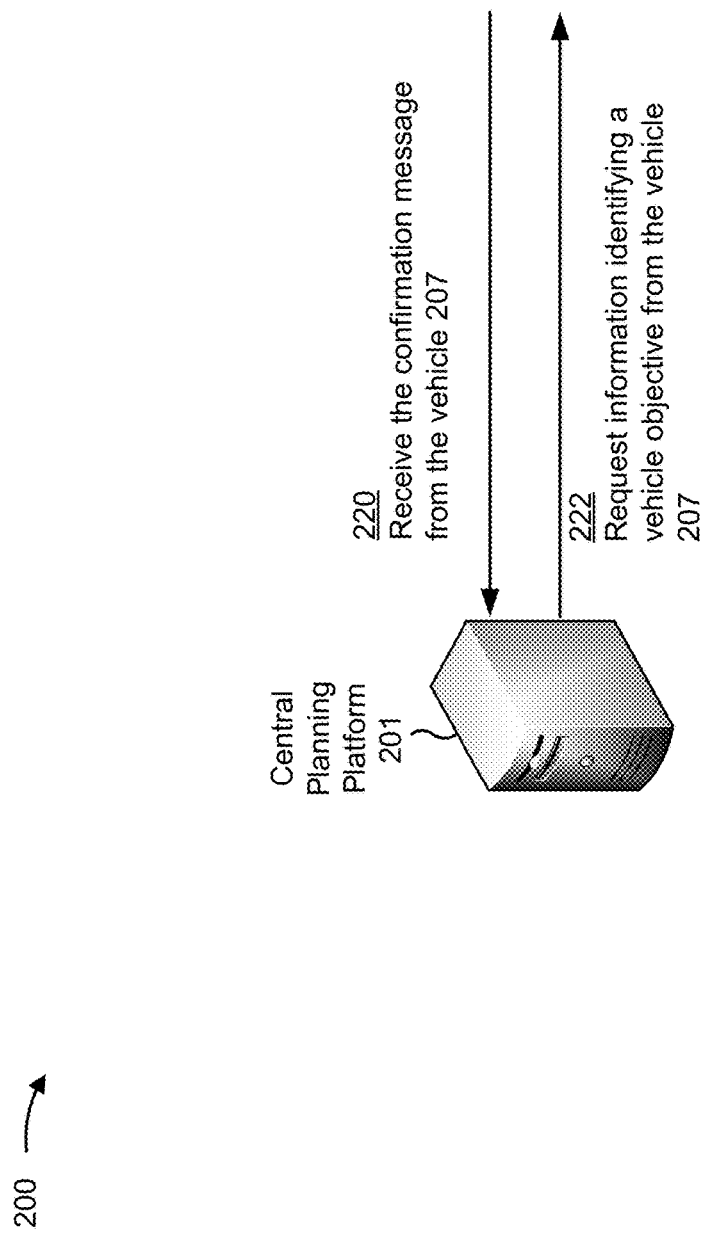

As shown in FIG. 2E, and by reference number 220, the central planning platform 201 may receive the confirmation message from the vehicle 207. The central planning platform 201 may determine that the vehicle 207 is operating in the full autonomous mode based on the confirmation message.

In some implementations, the central planning platform 201 may determine an objective associated with each vehicle (e.g., park, drive to a location, drop a passenger off at a location and then park, and/or the like) entering the autonomous driving zone. For example, as shown in FIG. 2E, and by reference number 222, the central planning platform 201 may request information identifying a vehicle objective from the vehicle 207.

Figure 2F:
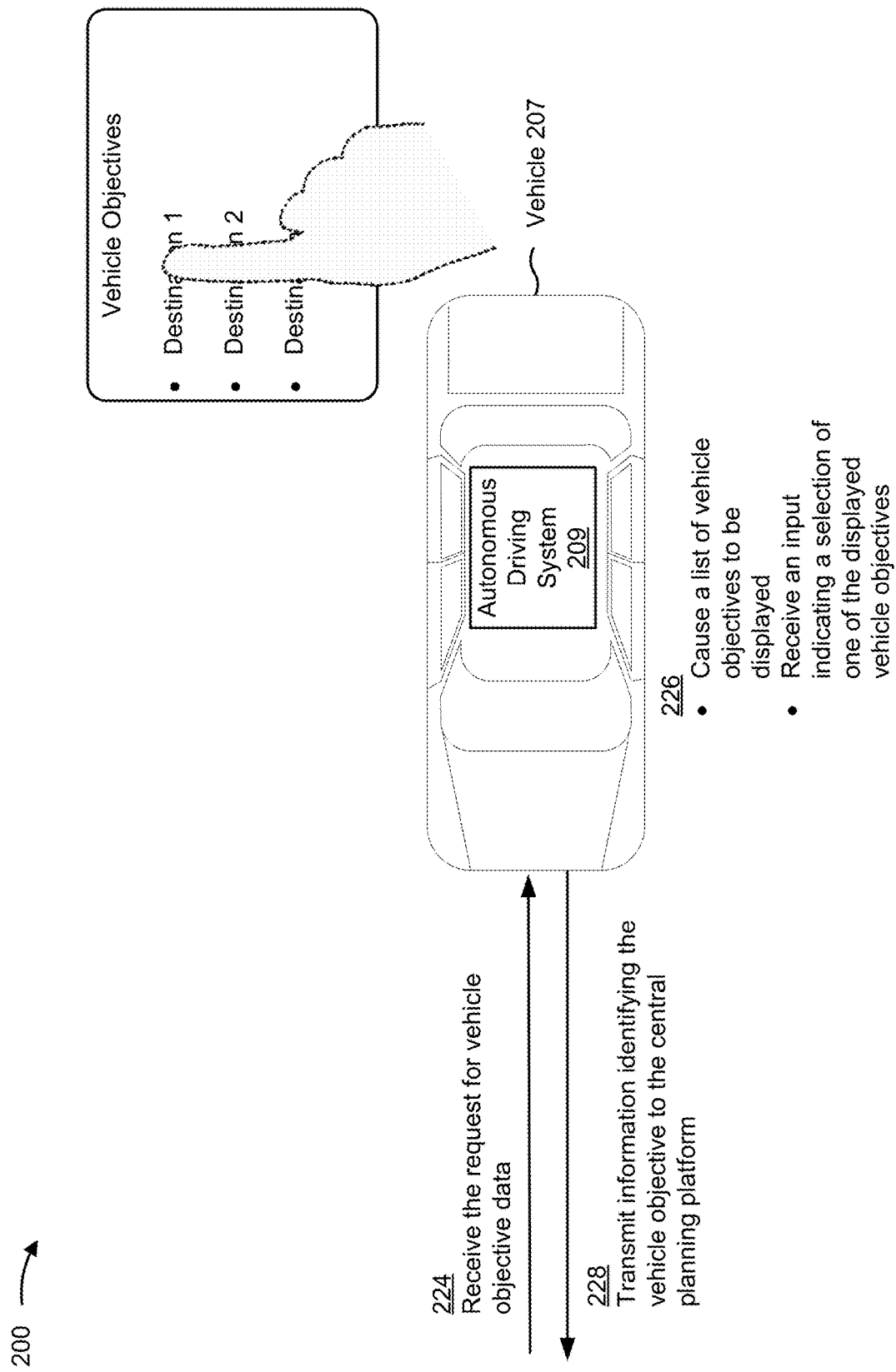

As shown in FIG. 2F, and by reference number 224, the vehicle 207 may receive the request from the central planning platform 201. In some implementations, as shown in FIG. 2F, and by reference numbers 226 and 228, the vehicle 207 may determine a vehicle objective and may provide information identifying the vehicle objective to the central planning platform 201 based on the request. For example, the autonomous driving system 209 may obtain information identifying the vehicle objective and may provide information identifying the vehicle objective to the central planning platform 201 in a manner similar to that described above with respect to FIG. 1F.

Figure 2G:
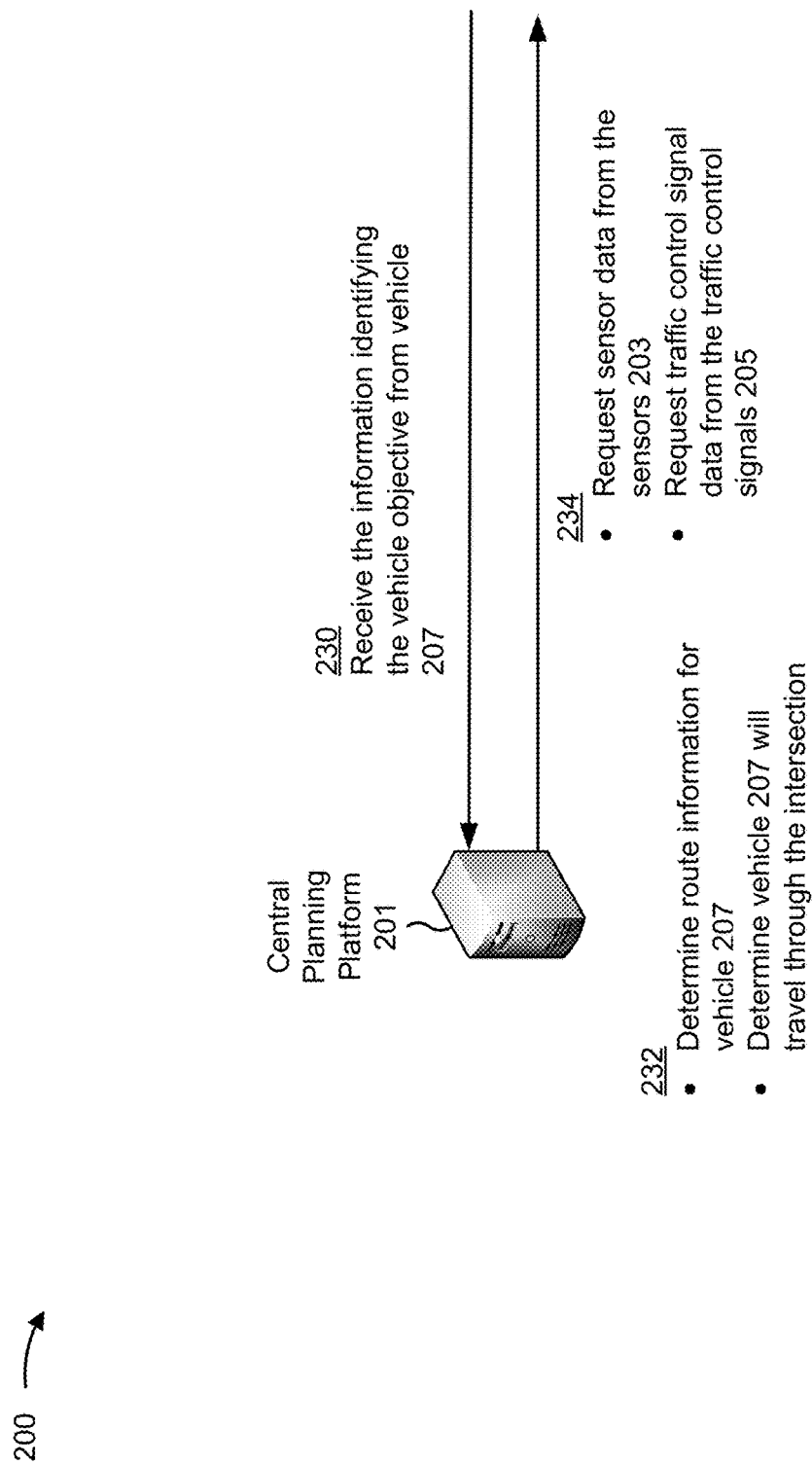

As shown in FIG. 2G, and by reference number 230, the central planning platform 201 may receive the information identifying the vehicle objective from the vehicle 207. The central planning platform 201 may determine the vehicle objective based on the received information.

In some implementations, the central planning platform 201 may perform vehicle routing and optimal path planning based on the vehicle objective associated with the vehicle 207. For example, as shown in FIG. 2G, and by reference number 232, the central planning platform 201 may determine routing information for the vehicle 207. The routing information may allow the vehicle 207 to satisfy the vehicle objective associated with the vehicle 207 while optimizing (e.g., minimizing) a total distance traveled by the vehicle 207, a travel time for the vehicle 207, and/or the like.

In some implementations, the central planning platform 201 may determine the routing information based on the vehicle objective. For example, the vehicle objective may be to reach a particular destination. The route information may include information indicating a path for the vehicle 207 to travel to reach the particular destination.

In some implementations, the path may include a sequence of way points. Each way point may be a coordinate pair (e.g., waypoint$_i$=($x_i$, $y_i$) in the map of the autonomous driving zone.

In some implementations, the central planning platform 201 may perform vehicle routing and optimal path planning based on a Bellman equation. For example, the central planning platform 201 may merge sensor data from the sensors 103 into the map of the autonomous driving zone. The map may be a continuous, approximated by a combination of functions, and/or a discrete map. The central planning platform 201 may then apply a time-discounted Bellman equation to the map to determine the first and second routing information.

In some implementations, the central planning platform 201 may utilize a policy search to determine the routing information. A policy (e.g., $\pi(s,a)$) may describe an action that may be taken by the vehicle 207. The policy is a function that returns a probability of taking an action (a) in a state (s). For a given state, it may be true that $\Sigma_a \pi(s, a)=1$.

To learn the optimal policy (e.g., the optimal route), the central planning platform 201 may utilize a value function, such as a state value function (V(s)) and/or an action value function (Q(s,a)). The state value function may describe the value of a state when following a policy. The value of a state may be the expected return (R) when starting from a state and acting according to a policy. In some implementations, the state value function may be represented as $V^\pi = a_\pi [R_t | s_t = s]$. The action value function may describe the value of taking an action in a state when following a certain policy. The action value function may be the expected return (R) given the state (s) and the action (a) for a policy ($\pi$). In some implementations, the action value function may be represented as $Q^\pi(s,a) = E_\pi [R_t | s_t = s, a_t = a]$. In some implementations, the central planning platform 201 may utilize a Bellman equation and/or a discounted Bellman equation to determine a policy (e.g., the routing information) utilizing the state value function and/or the action value function.

As shown in FIG. 2G, and by reference number 232, the central planning platform 201 may determine that the vehicle 207 will travel through the intersection based on the route information. In some implementations, the central planning platform 201 may update the map of the autonomous driving zone based on determining that the vehicle 207 will travel through the intersection. The central planning platform 201 may update the map to indicate current status of the traffic control signal 205-1 and/or the traffic control signal 205-2.

In some implementations, the central planning platform 201 may determine the status of the traffic control signal 205-1 and/or the traffic control signal 205-2 based on sensor data obtained from the sensor 203-1 and/or the sensor 203-2 and/or based on traffic control signal data received from the traffic control signal 205-1 and/or the traffic control signal 205-2.

For example, as shown in FIG. 2G, and by reference number 234, the central planning platform 201 may request sensor data associated with the status of the traffic control signal 205-1 and/or the traffic control signal 205-2 from the sensor 203-1 and/or the sensor 203-2. For example, the sensor data may include an image of the traffic control signal 205-1 and/or the traffic control signal 205-2. The central planning platform 201 may determine a status of the traffic control signal 205-1 and/or the traffic control signal 205-2 based on the image data.

Alternatively, and/or additionally, the central planning platform 201 may request information associated with a current status of the traffic control signal 205-1 and/or the traffic control signal 205-2 from the traffic control signal 205-1 and/or the traffic control signal 205-2. For example, the traffic control signal data may include information indicating a current status of the traffic control signal 205-1 and/or the traffic control signal 205-2, information indicating a time at which the current status of the traffic control signal 205-1 and/or the traffic control signal 205-2 began, information indicating a next status of the traffic control signal 205-1 and/or the traffic control signal 205-2, and/or the like.

Figure 2H:
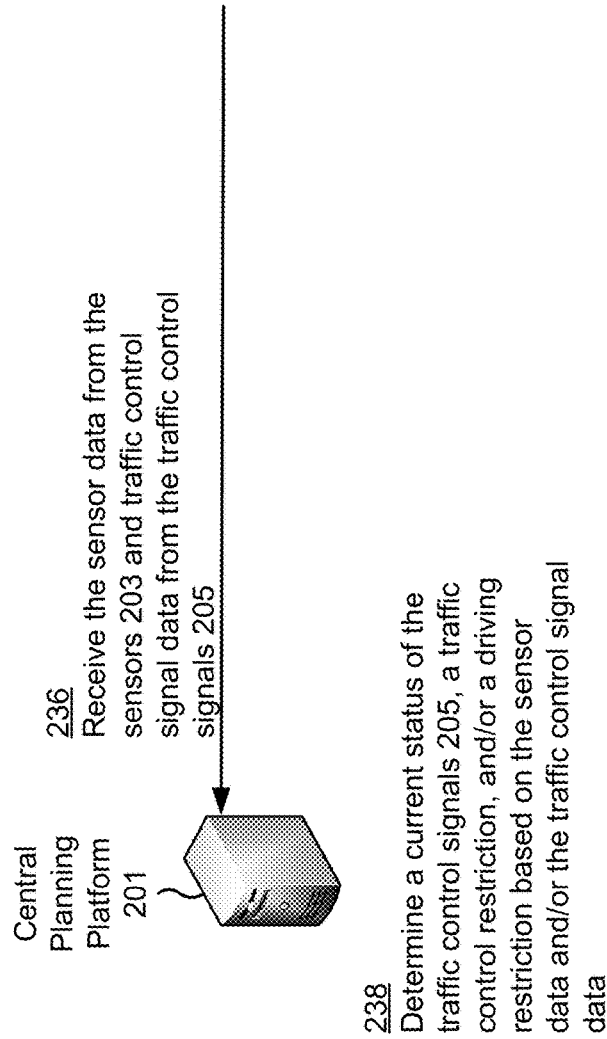

As shown in FIG. 2H, and by reference number 236, the central planning platform 201 may receive the sensor data from the sensor 203-1 and/or the sensor 203-2 and may receive the traffic control signal data from the traffic control signal 205-1 and/or the traffic control signal 205-2. As shown in FIG. 2H, and by reference number 238, the central planning platform 201 may determine a current status of the traffic control signal 205-1 and/or the traffic control signal 205-2 based on the sensor data and/or the traffic control signal data. For example, the traffic control signal data may include information indicating a current state or status of the traffic control signal 205-1 and/or the traffic control signal 205-2. The central planning platform 201 may parse the traffic control signal data to determine the current state or status of the traffic control signal 205-1 and/or the traffic control signal 205-2.

Alternatively, and/or additionally, the sensor data may include an image of the traffic control signal 205-1 and/or the traffic control signal 205-2. The central planning platform 201 may analyze the image and may determine the current state or status of the traffic control signal 205-1 and/or the traffic control signal 205-2 based on the analysis.

In some implementations, the central planning platform 201 may determine a traffic control restriction based on the sensor data and/or the traffic control signal data. For example, the central planning platform 201 may determine a traffic control restriction indicating a current status of the traffic control signal 205-2, that the vehicle 207 is to not travel through the intersection based on the current status of the traffic control signal 205-2, that the central planning platform 201 will transmit a message to the vehicle 207 when the status of the traffic control signal 205-2 changes from the current status to a next status, and/or that the vehicle 207 may travel through the intersection when the status of the traffic control signal changes from the current status to the next status. The central planning platform 201 may update the map based on the traffic control restriction.

In some implementations, the central planning platform 201 may determine a driving restriction based on the sensor data and/or the traffic control signal data. For example, the central planning platform 201 may determine a quantity of hazard areas, pedestrians, animals, vehicles, and/or the like located within the autonomous driving zone based on the sensor data. The central planning platform 201 may determine a driving restriction indicating a maximum speed of the vehicle 207 while traveling through the autonomous driving zone based on the quantity of hazard areas, pedestrians, animals, vehicles, and/or the like located within the autonomous driving zone. The central planning platform 201 may update the map to include information identifying the driving restriction.

In some implementations, the central planning platform 201 may perform vehicle routing and optimal path planning for the vehicle 207 by computing a policy search for the vehicle 207 based on the updated map in a manner similar to that described above.

Figure 2I:
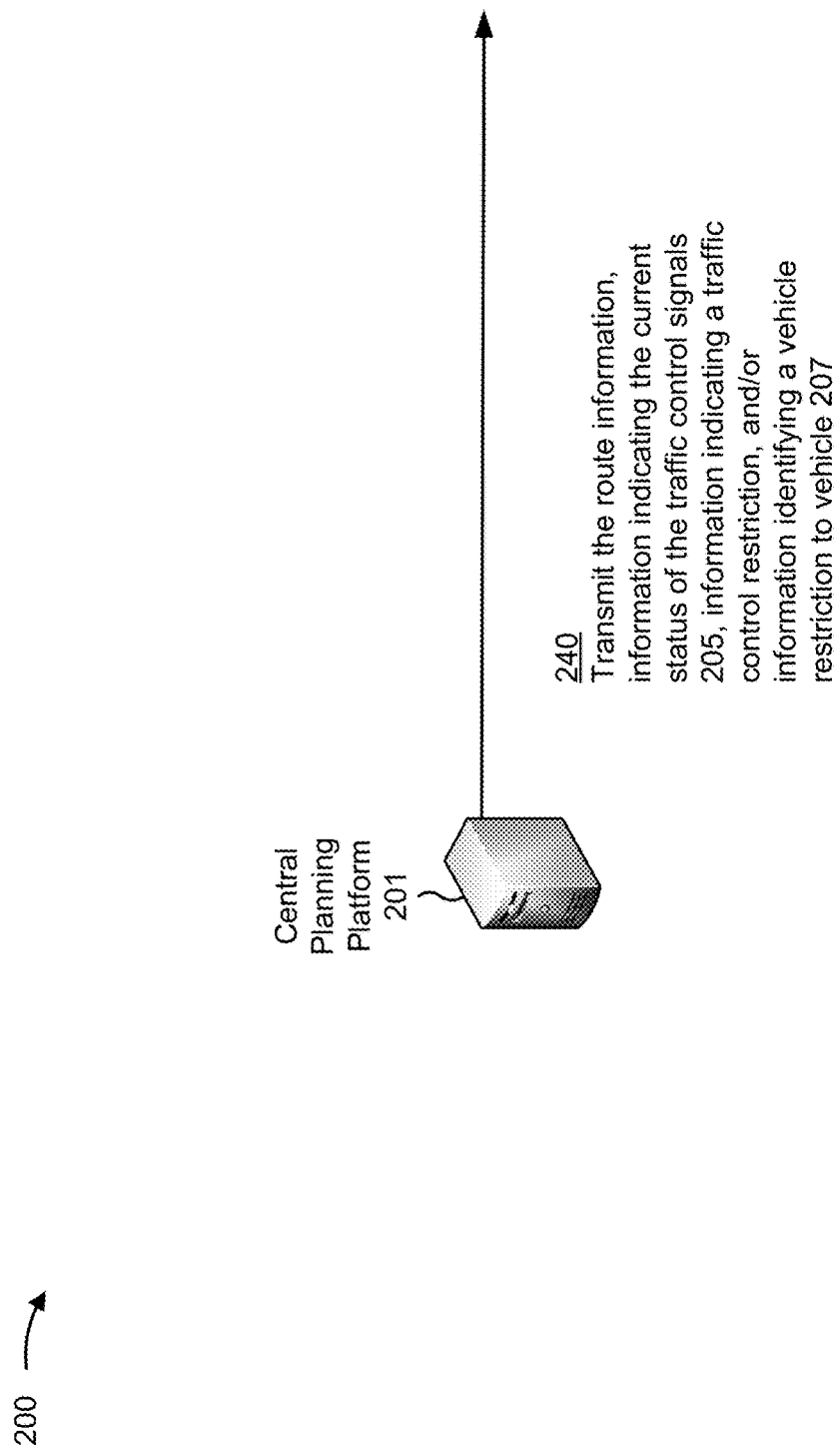
Figure 2J:
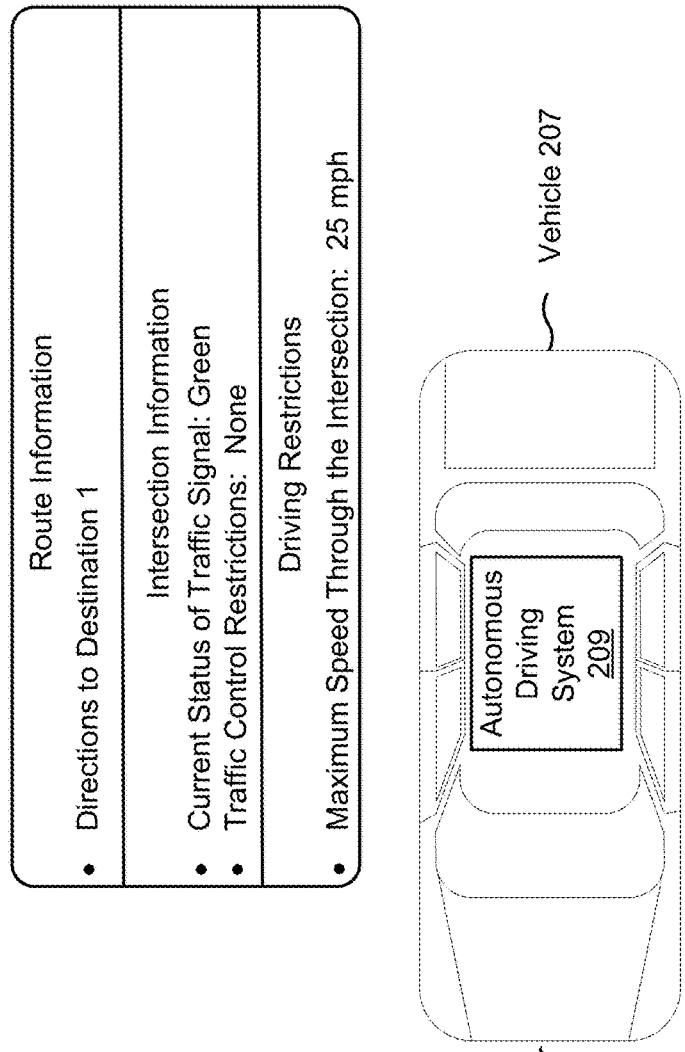

In some implementations, as shown in FIG. 2I, and by reference number 240, the central planning platform 201 may transmit the route information, information indicating the traffic control restriction, and/or information indicating the driving restriction to the vehicle 207. As shown in FIG. 2J, and by reference number 242, the autonomous driving system 209 of the vehicle 207 may receive the route information, information indicating the traffic control restriction, and/or information indicating the driving restriction from the central planning platform 201. The autonomous driving system 209 may control an operation of the vehicle based on the received information.

In some implementations, the autonomous driving system 209 receives the route information, information indicating the traffic control restriction, and/or information indicating the driving restriction in a direct format. In this way, the autonomous driving system may obtain reliable data that provides information needed by the autonomous driving to control an operation of the vehicle 207 directly (e.g., without analyzing data obtained by an internal sensor associated with the autonomous driving system 209).

In some implementations, the autonomous driving system 209 may provide one or more portions of the received information to a user (e.g., a passenger of the vehicle 207). For example, as shown in FIG. 2J, the autonomous driving system 209 may cause the received information to be displayed to the user via a user interface associated with the autonomous driving system 209.

As indicated above, FIGS. 2A-2J are provided merely as an example. Other examples are possible and may differ from what was described with regard to FIGS. 2A-2J.

FIGS. 3A-3J are diagrams of an overview of an example implementation 100 described herein. For example, as shown in FIGS. 3A-3J, example implementation 300 includes a central planning platform 301, sensor 303, sensor 305, traffic control signal 307-1, traffic control signal 307-2, restricted area 309, and a vehicle 311 that includes an autonomous driving system 313. The number and arrangement of devices shown in FIGS. 3A-3J are provided as an example. In practice, there may be additional devices, fewer devices, different devices, or differently arranged devices than those shown in FIGS. 3A-3J.

The central planning platform 301 may be configured to perform high-level control commands to autonomous vehicles operating within an autonomous driving zone. For example, the central planning platform 301 may aggregate data from the sensor 303, the sensor 305, the traffic control signal 307-1, the traffic control signal 307-2, and/or the vehicle 311, determine an objective (e.g., travel to location A, park, and/or the like) for each autonomous vehicle within the autonomous driving zone, and perform vehicle routing and optimum path planning for each autonomous vehicle within the autonomous driving zone to allow each autonomous vehicle to satisfy the objective of the autonomous vehicle.

In some implementations, the central planning platform 301 may be located within, or near, the autonomous driving zone. For example, the central planning platform 301 may be located in close enough proximity to the autonomous driving zone that the central planning platform 301 may communicate wirelessly (e.g., over a 5G network) with the sensor 303, the sensor 305, the traffic control signal 307-1, the traffic control signal 307-2, and/or the vehicle 311 (e.g., a device, such as autonomous driving system 313, in vehicle 311 and/or the like). In this way, the central planning platform 301 may send and receive data to and from the other devices in, or near, the autonomous driving zone, via a low latency, high bandwidth localized network.

In some implementations, the sensor 303 and/or the sensor 305 may include a camera sensor, an audio sensor, a ground pressure sensor, a radar sensor, a lidar sensor, and/or another type of sensor capable of detecting and/or determining a position of an object (e.g., an autonomous vehicle, a non-autonomous vehicle, a person, an animal, and/or the like) within an autonomous driving zone.

In some implementations, the traffic control signal 307-1 and/or the traffic control signal 307-2 may include a device for controlling a flow of traffic through an intersection. The traffic control signal 307-1 and/or the traffic control signal 307-2 may be located at an intersection and may each be positioned to provide signals to vehicles approaching the intersection. For example, the traffic control signal 307-1 may be positioned to provide signals to vehicles approaching the intersection from the east and from the west of the intersection (as shown in FIG. 3A), and the traffic control signal 307-2 may be positioned to provide signals to vehicles approaching the intersection from the north and from the south of the intersection (as shown in FIG. 3A).

Figure 3A:
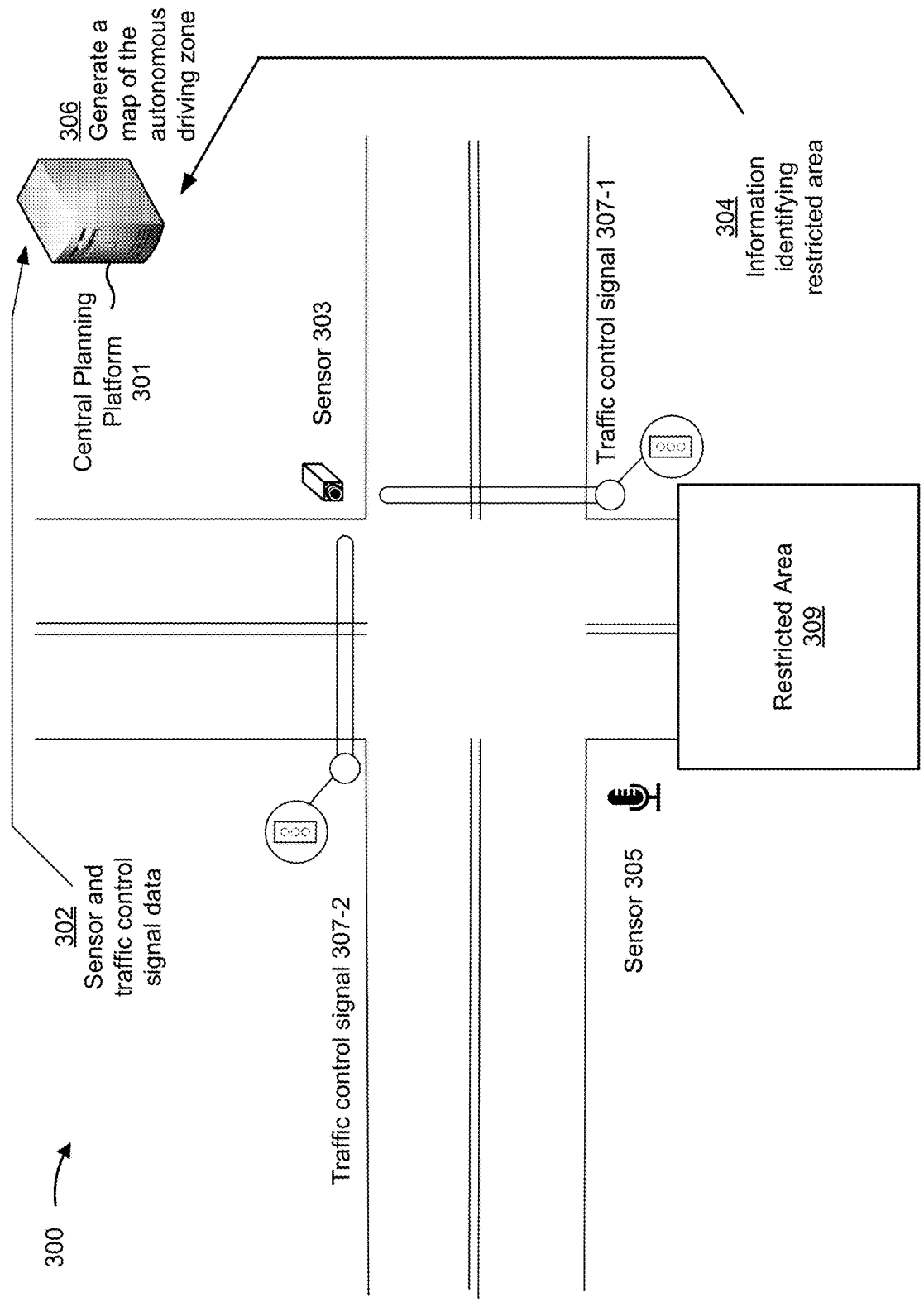

In some implementations, as shown in FIG. 3A, and by reference number 302, the central planning platform 301 may receive sensor data from the sensor 303 and/or the sensor 305 and may receive traffic control signal data from the traffic control signal 307-1 and/or the traffic control signal 307-2. In some implementations, the sensor data may include image data and/or audio data of the autonomous driving zone. For example, the sensor 303 may include an imaging device (e.g., a camera, an infrared camera, a thermal imaging camera, and/or the like) and may utilize the imaging device to periodically obtain image data of the autonomous driving zone. The sensor 303 may transmit the obtained image data to the central planning platform 301.

As shown in FIG. 3A, the sensor 305 may include an audio sensor, such as, for example, a microphone, and may utilize the audio sensor to periodically obtain audio data of the autonomous driving zone. The sensor 305 may transmit the obtained audio data to the central planning platform 301.

In some implementations, the sensor 303 and/or the sensor 305 may provide location information (e.g., a set of GPS coordinates, a latitude and a longitude, and/or the like) associated with the sensor 303 and/or the sensor 305 and/or an object located within the autonomous driving zone to the central planning platform 301. For example, sensor 303 and/or the sensor 305 may include a GPS device and may utilize the GPS device to obtain GPS coordinates associated with the sensor 303 and/or the sensor 305. The sensor 303 and/or the sensor 303 may transmit the GPS coordinates to the central planning platform 301.

In some implementations, the traffic control signal data may include data indicating a current state of the traffic control signal 307-1 and/or the traffic control signal 307-2. The traffic control signal 307-1 and/or the traffic control signal 307-2 may transmit the traffic control signal data to the central planning platform 301 based on a change of the state of the traffic control signal 307-1 and/or the traffic control signal 307-2, based on receiving a request for traffic control signal data from the central planning platform 301, and/or based on an occurrence of another type of event.

In some implementations, the current state of the traffic control signal 307-1 and/or the traffic control signal 307-2 may correspond to a signal currently being provided by the traffic control signal 307-1 and/or the traffic control signal 307-2 to vehicles approaching the intersection. For example, the traffic control signal 307-1 and/or the traffic control signal 307-2 may each cause one of a plurality of colored lights (e.g., a red light, a yellow light, and/or a green light) to be selectively emitted from the traffic control signal 307-1 and/or the traffic control signal 307-2 to control a flow of traffic through the intersection. The traffic control signal data may indicate the colored light currently being emitted by the traffic control signal 307-1 and/or the traffic control signal 307-2, a time at which the traffic control signal 307-1 and/or the traffic control signal 307-2 began emitting the currently colored light, information indicating a next colored light to be emitted by the traffic control signal 307-1 and/or the traffic control signal 307-2, and/or a time at which the traffic control signal 307-1 and/or the traffic control signal 307-2 stop emitting the current colored light and/or begin emitting the next colored light.

In some implementations, as shown in FIG. 3A, and by reference number 304, the central planning platform 301 may obtain information identifying a restricted area within the autonomous driving zone. The restricted area may be an area in which a vehicle (e.g., the vehicle 311) is prohibited from entering and/or traveling within.

In some implementations, the central planning platform 301 may obtain the information identifying the restricted area by analyzing the sensor data received from the sensor 303 and/or the sensor 305. For example, the sensor data may include an image of the restricted area. The central planning platform 301 may analyze the image to obtain the information identifying the restricted area.

In some implementations, the information identifying the restricted area may be input by a user. For example, a user may input information identifying a location of a restricted area within the autonomous driving zone via a user interface associated with the central planning platform 301.

In some implementations, as shown in FIG. 3A, and by reference number 306, the central planning platform 301 may generate a map of the autonomous driving zone based on the sensor data and/or the information identifying the restricted area. For example, as shown in FIG. 3A, an area around a traffic intersection may be designated as an autonomous driving zone in which an autonomous vehicle may operate in an autonomous mode. The central planning platform 301 may generate a map of the area around the intersection.

In some implementations, the central planning platform 301 may generate the map based on data obtained from one or more external sensors. For example, the central planning platform 301 may receive sensor data from the sensor 303 and/or the sensor 305 and may generate the map based on the sensor data.

Alternatively, and/or additionally, the central planning platform 301 may generate the map based on data obtained from one or more internal sensors associated with an autonomous vehicle. For example, the vehicle 311 may include one or more internal sensors (e.g., an imaging device, a radar, a lidar, and/or the like). The vehicle 311 may obtain sensor data from the one or more internal sensors and may transmit the sensor data to the central planning platform 301. The central planning platform 301 may receive the sensor data from the vehicle 311 and may generate the map based on the sensor data received from the vehicle 311.

In some implementations, the central planning platform 301 may generate the map based on a satellite image. For example, the central planning platform 201 may generate the map based on a satellite image in a manner similar to that described above with respect to FIG. 1A.

In some implementations, the central planning platform 301 may generate the map based on a boundary of the autonomous driving zone. For example, the central planning platform 201 may generate the map based on a boundary of the autonomous driving zone in a manner similar to that described above with respect to FIG. 1A.

In some implementations, the central planning platform 301 may generate the map based on a man-made structure (e.g., a building, a parking spot, a road, a sidewalk, a traffic control signal, a telephone pole, and/or the like) included in the autonomous driving zone. For example, as shown in FIG. 3A, the autonomous driving zone may include a plurality of roads forming an intersection. The sensor data may include one or more images of the plurality of roads. The central planning platform 301 may determine a size (e.g., a length and a width), a location, a number of lanes, and/or the like of the plurality of roads based on the image data. The central planning platform 301 may generate the map based on the size, the location, the number of lanes, and/or the like of the plurality of roads. For example, the central planning platform 301 may include information indicating the size, the location, the number of lanes, and/or the like of the plurality of roads on the map.

In some implementations, a user may input location information for a man-made structure. For example, a user may enter information identifying a type (e.g., a building, a parking spot, a road, a sidewalk, a traffic control signal, a telephone pole, and/or the like) and location information for each man-made structure included in the autonomous driving zone via a user interface associated with the central planning platform 301.

In some implementations, the central planning platform 301 may generate the map based on a natural structure (e.g., a body of water, a mountain, a depression in the earth, and/or the like) included in the autonomous driving zone. For example, the central planning platform 301 may generate the map based on a natural structure in a manner similar to that described above with respect to 2A.

In some implementations, the central planning platform 301 may generate the map based on a moveable object (e.g., a vehicle, a person, an animal, and/or the like) located in the autonomous driving zone. For example, the central planning platform 301 may generate the map based on the moveable object in a manner similar to that described above with respect to FIG. 2A.

In some implementations, the central planning platform 301 may generate the map based on a set of initial traffic control constraints and/or driving restrictions. For example, the central planning platform 301 may generate the map based on a set of initial traffic control constraints and/or driving restrictions in a manner similar to that described above with respect to FIG. 1A.

Figure 3B:
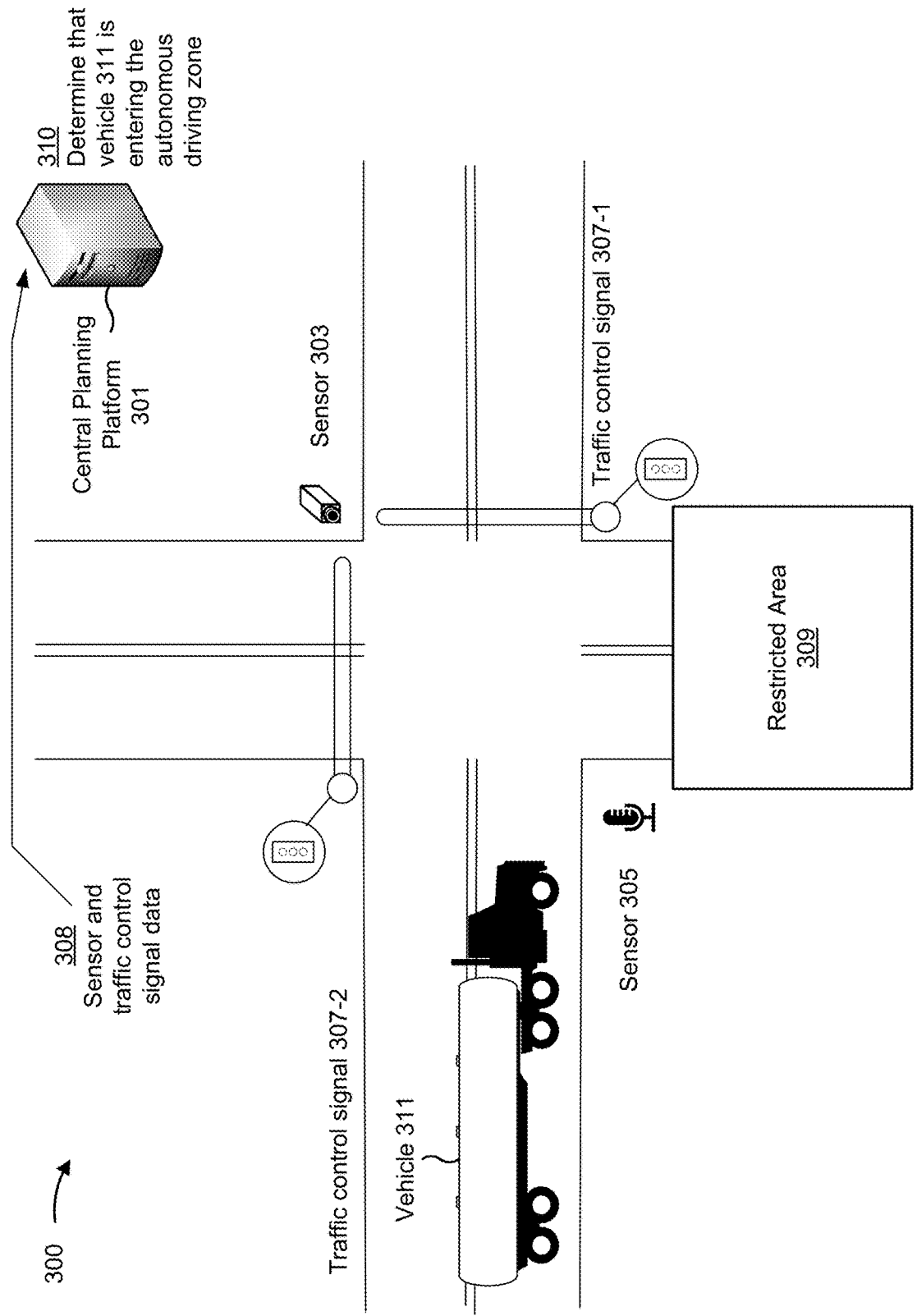

In some implementations, as shown in FIG. 3B, and by reference number 308, after generating the map, the central planning platform 301 may receive sensor data from the sensor 303, the sensor 305, the traffic control signal 307-1, the traffic control signal 307-2, and/or the vehicle 311. For example, the sensor 303 and/or the sensor 305 may detect a movement of an object (e.g., the vehicle 311, a pedestrian, and/or the like). The sensor 303 and/or the sensor 305 may obtain sensor data associated with the object based on detecting the movement of the object. The sensor 303 and/or the sensor 305 may transmit the obtained sensor data to the central planning platform 301.

In some implementations, as shown in FIG. 3B, and by reference number 310, the central planning platform 301 may determine that the vehicle 311 is entering the autonomous driving zone based on the sensor data. For example, the sensor data may include location information and movement information associated with the vehicle 311 and the central planning platform 301 may determine that the vehicle 311 is entering the autonomous driving zone in a manner similar to that described above with respect to FIG. 1B.

Figure 3C:
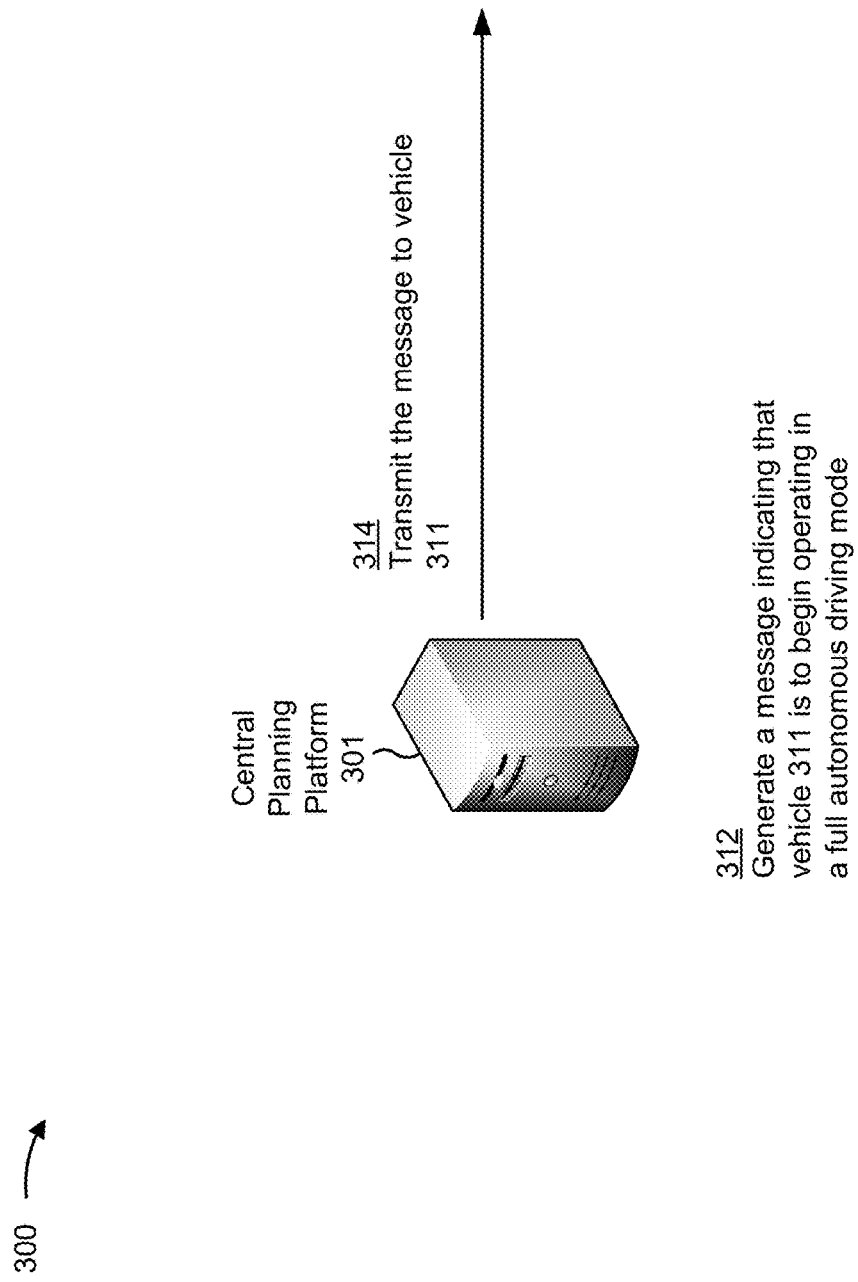

In some implementations, the central planning platform 301 may instruct the vehicle 311 to begin operating in a full autonomous driving mode based on determining that the vehicle 311 is entering the autonomous driving zone. For example, as shown in FIG. 3C, and by reference numbers 312 and 314, the central planning platform 301 may generate a message indicating that the vehicle 311 is to begin operating in a full autonomous driving mode and may transmit the message to the vehicle 311. In some implementations, the central planning platform 301 may generate the message indicating that the vehicle 311 is to begin operating in the full autonomous driving mode and may transmit the message to the vehicle 311 in a manner similar to that described above with respect to FIG. 1C.

Figure 3D:
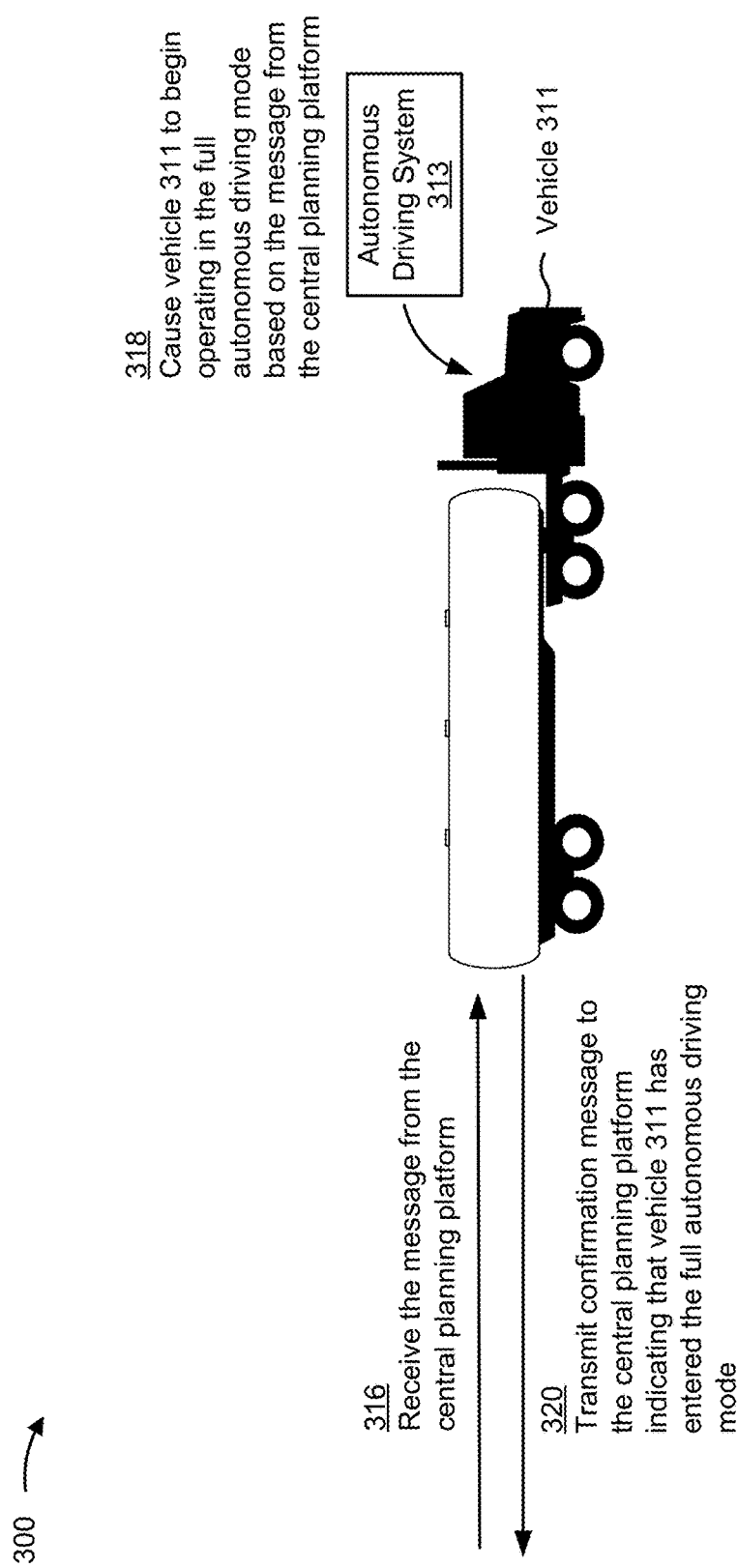

In some implementations, the vehicle 311 may begin operating in a full autonomous mode based on entering the autonomous driving zone. For example, as shown in FIG. 3D, and by reference numbers 316 and 318, the vehicle 311 (e.g., a device, such as an autonomous driving system 313 associated with the vehicle 311 and/or the like) may receive the message from the central planning platform 301 and may cause the vehicle to begin operating in a full autonomous driving mode based on the message. In some implementations, the vehicle 311 may receive the message and cause the vehicle to begin operating in the autonomous driving mode in a manner similar to that described above with respect to FIG. 1D.

In some implementations, the central planning platform 301 may determine that the vehicle 311 is operating in the full autonomous mode. For example, the vehicle 311 may generate a confirmation message based on the vehicle 311 entering the full autonomous driving mode. As shown in FIG. 3D, and by reference number 320, the vehicle 311 may transmit the confirmation message to the central planning platform 301.

Figure 3E:
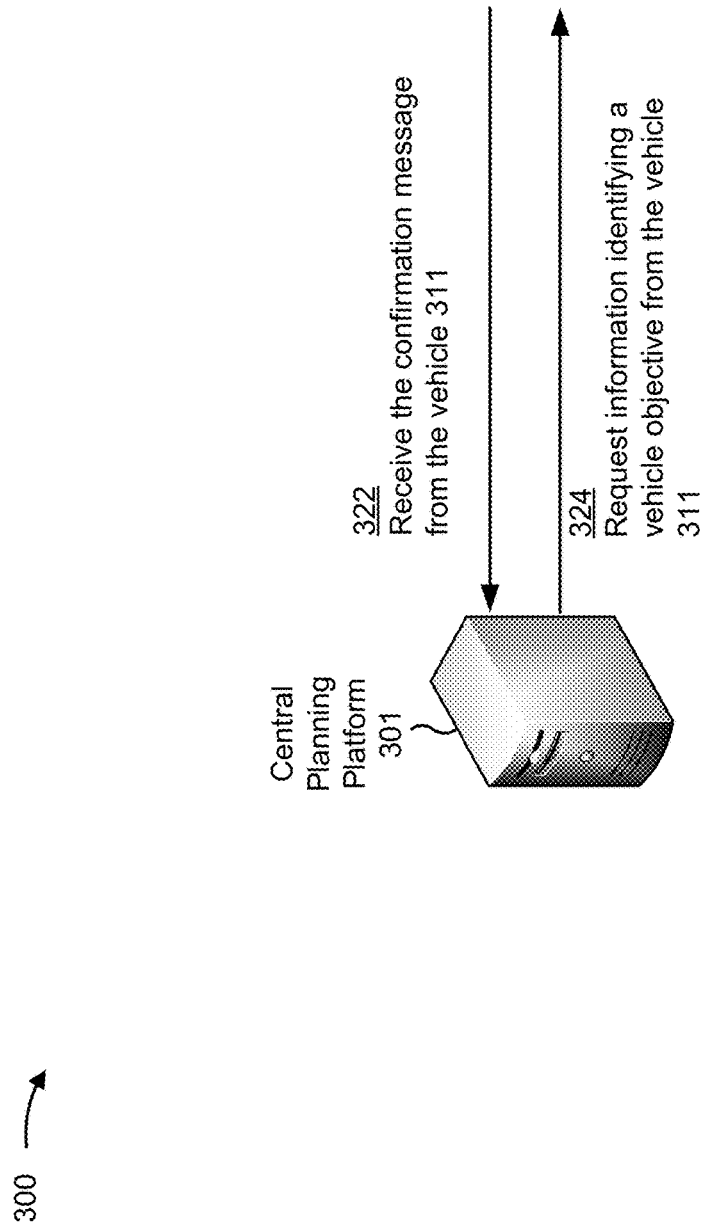

As shown in FIG. 3E, and by reference number 322, the central planning platform 301 may receive the confirmation message from the vehicle 311. The central planning platform 301 may determine that the vehicle 311 is operating in the full autonomous mode based on the confirmation message.

In some implementations, the central planning platform 301 may determine an objective associated with each vehicle (e.g., park, drive to a location, drop a passenger off at a location and then park, and/or the like) entering the autonomous driving zone. For example, as shown in FIG. 3E, and by reference number 324, the central planning platform 301 may request information identifying a vehicle objective from the vehicle 311.

Figure 3F:
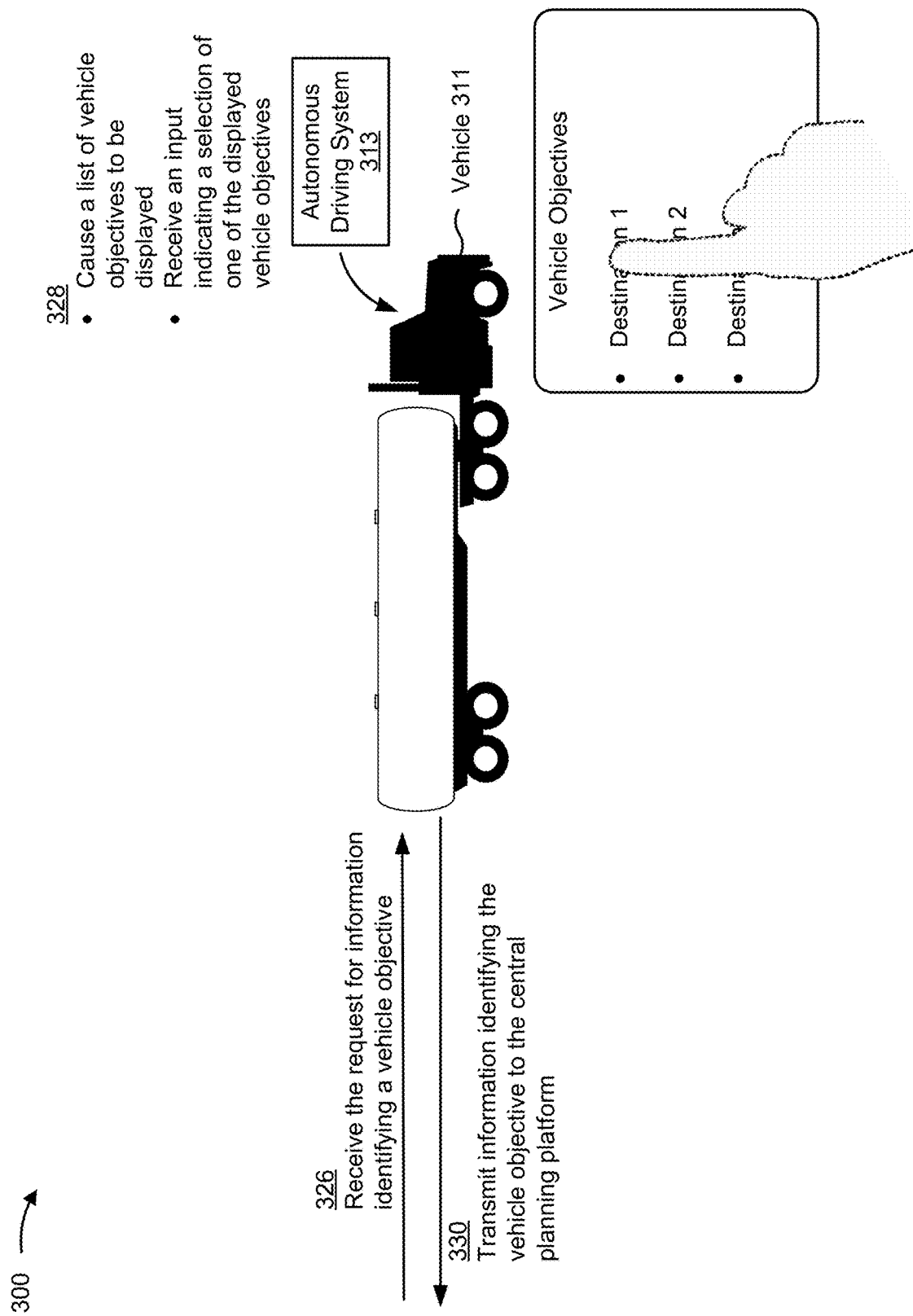

As shown in FIG. 3F, and by reference number 326, the vehicle 311 may receive the request from the central planning platform 301. In some implementations, the vehicle 311 may determine a vehicle objective and may provide information identifying the vehicle objective to the central planning platform 301 based on the request. For example, as shown in FIG. 3F, and by reference numbers 328 and 330, the autonomous driving system 313 may obtain information identifying the vehicle objective and may provide information identifying the vehicle objective to the central planning platform 301 in a manner similar to that described above with respect to FIG. 1F.

Figure 3G:
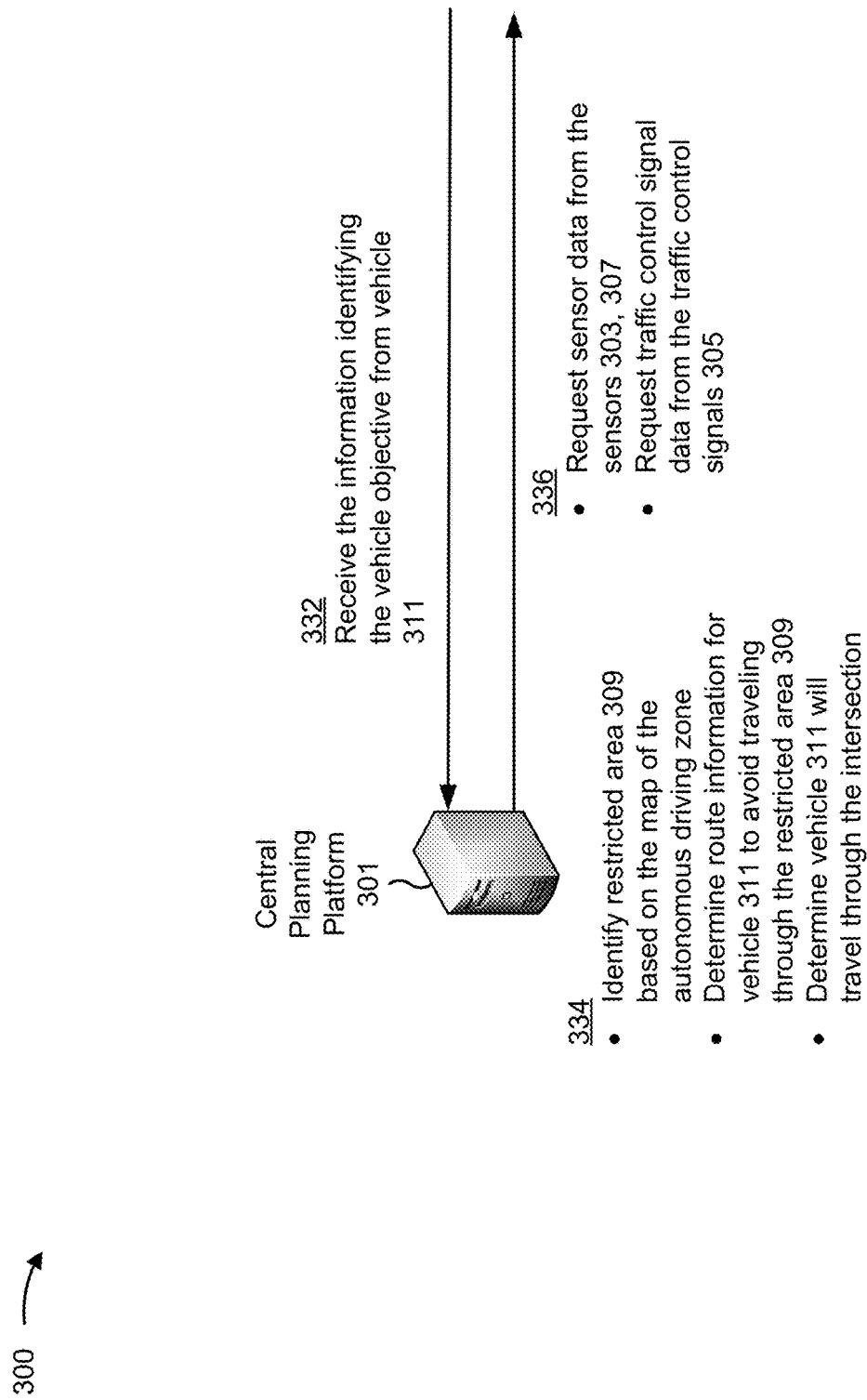

As shown in FIG. 3G, and by reference number 332, the central planning platform 301 may receive the information identifying the vehicle objective from the vehicle 311. The central planning platform 301 may determine the vehicle objective based on the received information.

In some implementations, the central planning platform 301 may perform vehicle routing and optimal path planning based on the vehicle objective associated with the vehicle 311. For example, as shown in FIG. 3G, and by reference number 334, the central planning platform 301 may identify the restricted area 309 based on the map of the autonomous driving zone.

In some implementations, as shown in FIG. 3G, and by reference number 334, the central planning platform 301 may determine routing information for the vehicle 311 based on the restricted area 309. For example, the central planning platform 301 may determine routing information may allow the vehicle 207 to satisfy the vehicle objective associated with the vehicle 207 while avoiding traveling through the restricted area 309 and while optimizing (e.g., minimizing) a total distance traveled by the vehicle 311, a travel time for the vehicle 311, and/or the like. In some implementations, the central planning platform 301 may determine the routing information based on a policy search, in a manner similar to that described above.

In some implementations, the central planning platform 301 may determine the routing information based on the vehicle objective. For example, the vehicle objective may be to reach a particular destination. The route information may include information indicating a path for the vehicle 311 to travel to reach the particular destination.

As shown in FIG. 3G, and by reference number 334, the central planning platform 301 may determine that the vehicle 311 will travel through the intersection based on the route information. In some implementations, the central planning platform 301 may update the map of the autonomous driving zone based on determining that the vehicle 311 will travel through the intersection. The central planning platform 301 may update the map to indicate current status of the traffic control signal 307-1 and/or the traffic control signal 307-2.

In some implementations, the central planning platform 301 may determine the status of the traffic control signal 307-1 and/or the traffic control signal 307-2 based on sensor data obtained from the sensor 303 and/or the sensor 305 and/or based on traffic control signal data received from the traffic control signal 307-1 and/or the traffic control signal 307-2.

For example, as shown in FIG. 3G, and by reference number 336, the central planning platform 301 may request sensor data associated with the status of the traffic control signal 307-1 and/or the traffic control signal 307-2 from the sensor 303 and/or the sensor 305. For example, the sensor data may include an image of the traffic control signal 307-1 and/or the traffic control signal 307-2. The central planning platform 301 may determine a status of the traffic control signal 307-1 and/or the traffic control signal 307-2 based on the image data.

Alternatively, and/or additionally, the central planning platform 301 may request information associated with a current status of the traffic control signal 307-1 and/or the traffic control signal 307-2 from the traffic control signal 307-1 and/or the traffic control signal 307-2. For example, the traffic control signal data may include information indicating a current status of the traffic control signal 307-1 and/or the traffic control signal 307-2, information indicating a time at which the current status of the traffic control signal 307-1 and/or the traffic control signal 307-2 began, information indicating a next status of the traffic control signal 307-1 and/or the traffic control signal 307-2, and/or the like.

Figure 3H:
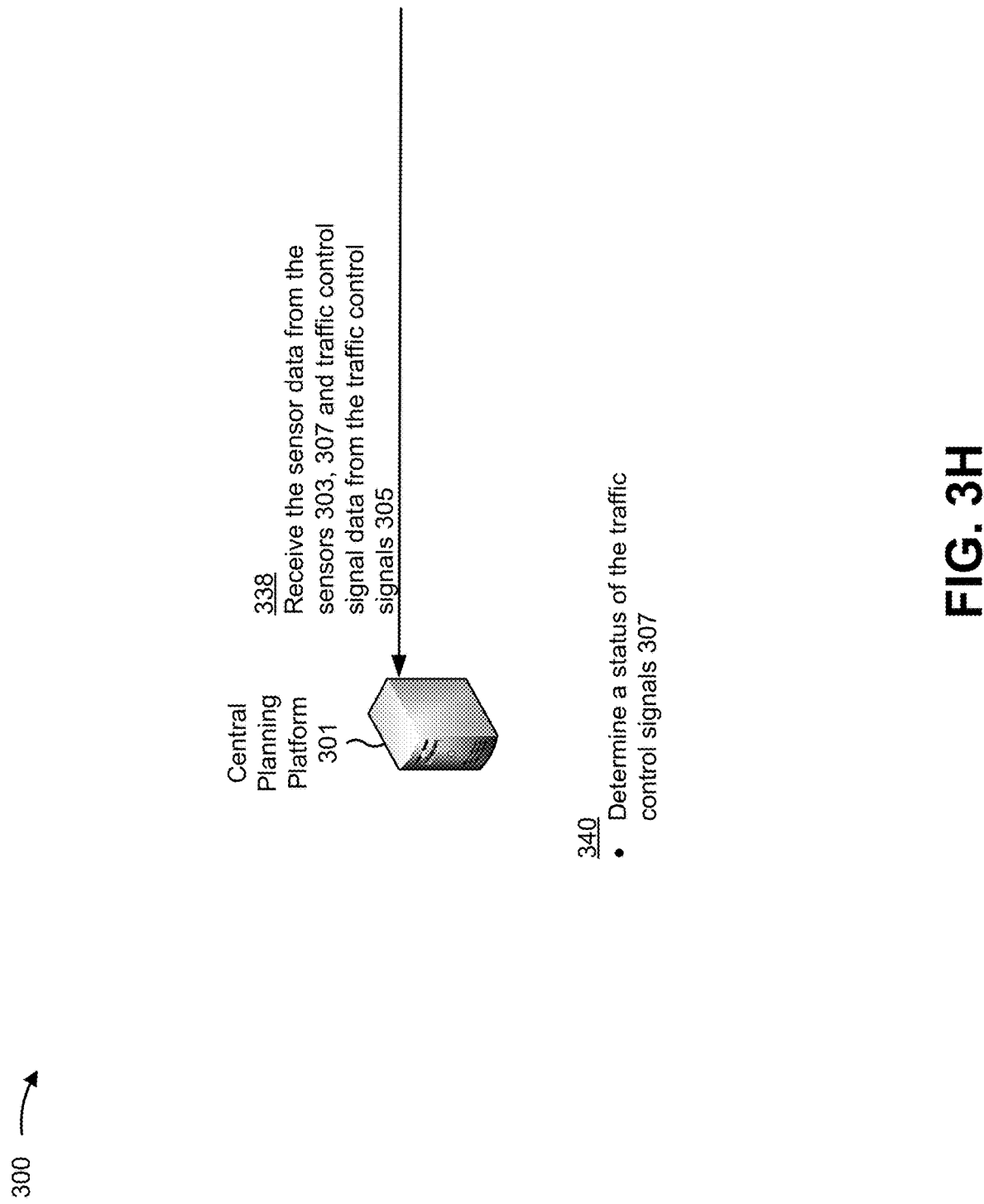

As shown in FIG. 3H, and by reference number 338, the central planning platform 301 may receive the sensor data from the sensor 303 and/or the sensor 305 and may receive the traffic control signal data from the traffic control signal 307-1 and/or the traffic control signal 307-2. As shown in FIG. 3H, and by reference number 340, the central planning platform 301 may determine a current status of the traffic control signal 307-1 and/or the traffic control signal 307-2 based on the sensor data and/or the traffic control signal data.

In some implementations, the central planning platform 301 may determine a traffic control restriction based on the sensor data and/or the traffic control signal data. For example, the central planning platform 301 may determine a traffic control restriction in a manner similar to that described above with respect to FIG. 2H.

In some implementations, the central planning platform 201 may determine a driving restriction based on the sensor data and/or the traffic control signal data. For example, the central planning platform 301 may determine a driving restriction in a manner similar to that described above with respect to FIG. 2H.

In some implementations, the central planning platform 301 may perform vehicle routing and optimal path planning for the vehicle 311 by computing a policy search for the vehicle 311 based on the updated map in a manner similar to that described above.

In some implementations, as shown in FIG. 3I, and by reference number 342, the central planning platform 301 may transmit the route information, information identifying the restricted area 309, information identifying the current status of the traffic control signal 307-1 and/or 307-2, information indicating the traffic control restriction, and/or information indicating the driving restriction to the vehicle 311.

Figure 3J:
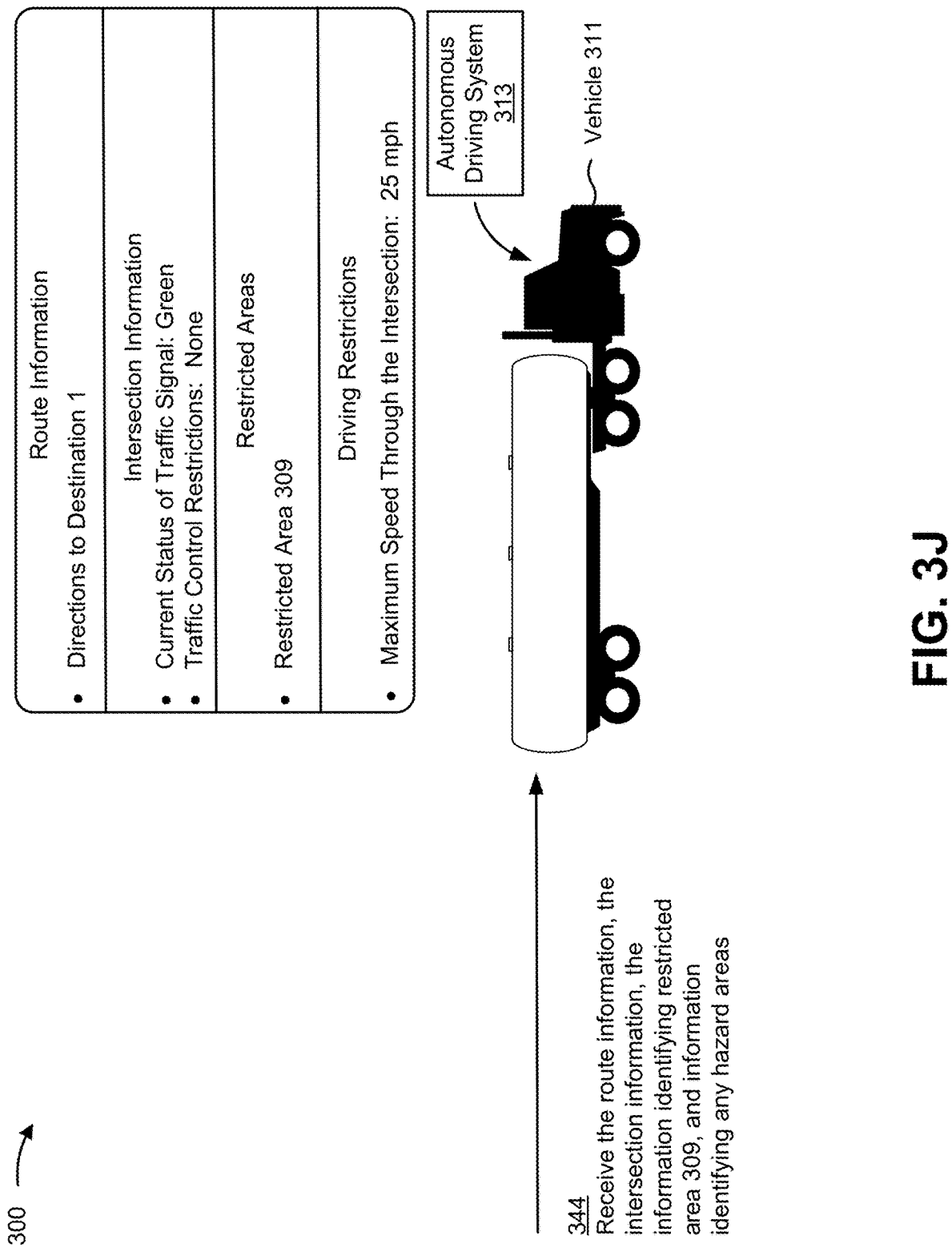

As shown in FIG. 3J, and by reference number 344, the autonomous driving system 313 of the vehicle 311 may receive the route information, information identifying the restricted area 309, information identifying the current status of the traffic control signal 307-1 and/or 307-2, information indicating the traffic control restriction, and/or information indicating the driving restriction from the central planning platform 301. The autonomous driving system 313 may control an operation of the vehicle based on the received information.

In some implementations, the autonomous driving system 313 receives the route information, information identifying the restricted area 309, information identifying the current status of the traffic control signal 307-1 and/or 307-2, information indicating the traffic control restriction, and/or information indicating the driving restriction in a direct format. In this way, the autonomous driving system may obtain reliable data that provides information needed by the autonomous driving to control an operation of the vehicle 311 directly (e.g., without analyzing data obtained by an internal sensor associated with the autonomous driving system 313).

In some implementations, the autonomous driving system 313 may provide one or more portions of the received information to a user (e.g., a passenger of the vehicle 311). For example, as shown in FIG. 3J, the autonomous driving system 313 may cause the received information to be displayed to the user via a user interface associated with the autonomous driving system 313.

As indicated above, FIGS. 3A-3J are provided merely as an example. Other examples are possible and may differ from what was described with regard to FIGS. 3A-3J.

FIG. 4 is a diagram of an example environment 400 in which systems and/or methods, described herein, may be implemented. As shown in FIG. 4, environment 400 may include a central planning platform 410 in a cloud computing environment 420 that includes a set of computing resources 415, a vehicle 425 that includes an autonomous driving system 430 and an internal sensor 435, an external sensor 440, and a network 445. Devices of environment 400 may interconnect via wired connections, wireless connections, or a combination of wired and wireless connections.

Central planning platform 410 includes one or more devices capable of receiving, generating, storing, processing, and/or providing data associated with performing vehicle routing and optimum path planning for each autonomous vehicle within an autonomous driving zone and/or providing high-level control commands to autonomous vehicles operating within an autonomous driving zone. For example, the central planning platform 410 can generate a map of an autonomous driving zone, aggregate sensor data from the internal sensor 435 and/or the external sensor 440, determine an objective (e.g., travel to location A, park, and/or the like) for each autonomous vehicle within the autonomous driving zone, and perform vehicle routing and optimum path planning for each autonomous vehicle within the autonomous driving zone to allow each autonomous vehicle to satisfy the objective of the autonomous vehicle.

In some implementations, as shown in FIG. 4, the central planning platform 410 can be hosted in a cloud computing environment 420. In some implementations, the central planning platform 410 may not be cloud-based (i.e., can be implemented outside of a cloud computing environment) or can be partially cloud-based.

Cloud computing environment 420 includes an environment that delivers computing as a service, whereby shared resources, services, and/or the like may be provided to the central planning platform 410 and/or the autonomous driving system 430. Cloud computing environment 420 may provide computation, software, data access, storage, and/or other services that do not require end-user knowledge of a physical location and configuration of a system and/or a device that delivers the services. Cloud computing environment 420 may utilize a MEC environment that enables computing by a network architecture that provides computing capabilities to a connected device (e.g., an external sensor, an autonomous vehicle, and/or the like) via computing platforms at or near an edge of a network (e.g., a wireless communication network). As shown, cloud computing environment 420 may include the central planning platform 410.

Computing resource 415 includes one or more personal computers, workstation computers, server devices, or another type of computation and/or communication device. In some implementations, computing resource 415 may host the central planning platform 410. The cloud resources may include compute instances executing in computing resource 415, storage devices provided in computing resource 415, data transfer devices provided by computing resource 415, and/or the like. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by the central planning platform 410. Application 415-1 may eliminate a need to install and execute the software applications on the central planning platform 410. For example, application 415-1 may include software associated with the central planning platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system ("OS"). A process virtual machine may execute a single program and may support a single process. In some implementations, virtual machine 415-2 may execute on behalf of a user (e.g., a user of the central planning platform 410), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the "guest operating systems" and may manage the execution of the guest operating systems. Multiple instances of a variety of operating systems may share virtualized hardware resources.

Vehicle 425 includes a car, a truck, a motorcycle, a boat, a train, a plane, a drone, and/or the like. In some implementations, the vehicle 425 can include one or more devices capable of receiving a set of messages and/or instructions from the central planning platform 410. For example, the vehicle 425 can include an on-board system (e.g., the autonomous driving system 430) that is capable of communicating with the central planning platform 410, that is capable of modifying operations of the vehicle 425, and/or the like. In some implementations, the vehicle 425 may be an autonomous vehicle.

Autonomous driving system 430 includes one or more devices capable of receiving, generating, storing, processing, and/or providing data associated with controlling an operation of the vehicle 425. For example, the autonomous driving system 430 can include a computing device located within the vehicle 425. In some implementations, the autonomous driving system 430 can include a communication interface that allows the autonomous driving system 430 to receive information from and/or transmit information to other devices in environment 400. In some implementations, the autonomous driving system 430 can be a physical device implemented within a housing, such as a chassis. In some implementations, the autonomous driving system 430 can be a virtual device implemented by one or more computing devices of a cloud computing environment or a data center.

Internal sensor 435 includes one or more devices located on and/or positioned within the vehicle 425 and capable of obtaining data associated with an operation of the vehicle 425 and providing the obtained data to the autonomous driving system 430 and/or the central planning platform 410. For example, the internal sensor 435 can include a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

External sensor 440 includes one or more devices external to the vehicle 425, positioned within and/or near an autonomous driving zone, and capable of obtaining data associated with the autonomous driving zone and/or an operation of the vehicle 425 and providing the obtained data to the autonomous driving system 430 and/or the central planning platform 410. For example, the external sensor 440 can include a traffic control signal, a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

Network 445 includes one or more wired and/or wireless networks. For example, network 445 can include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
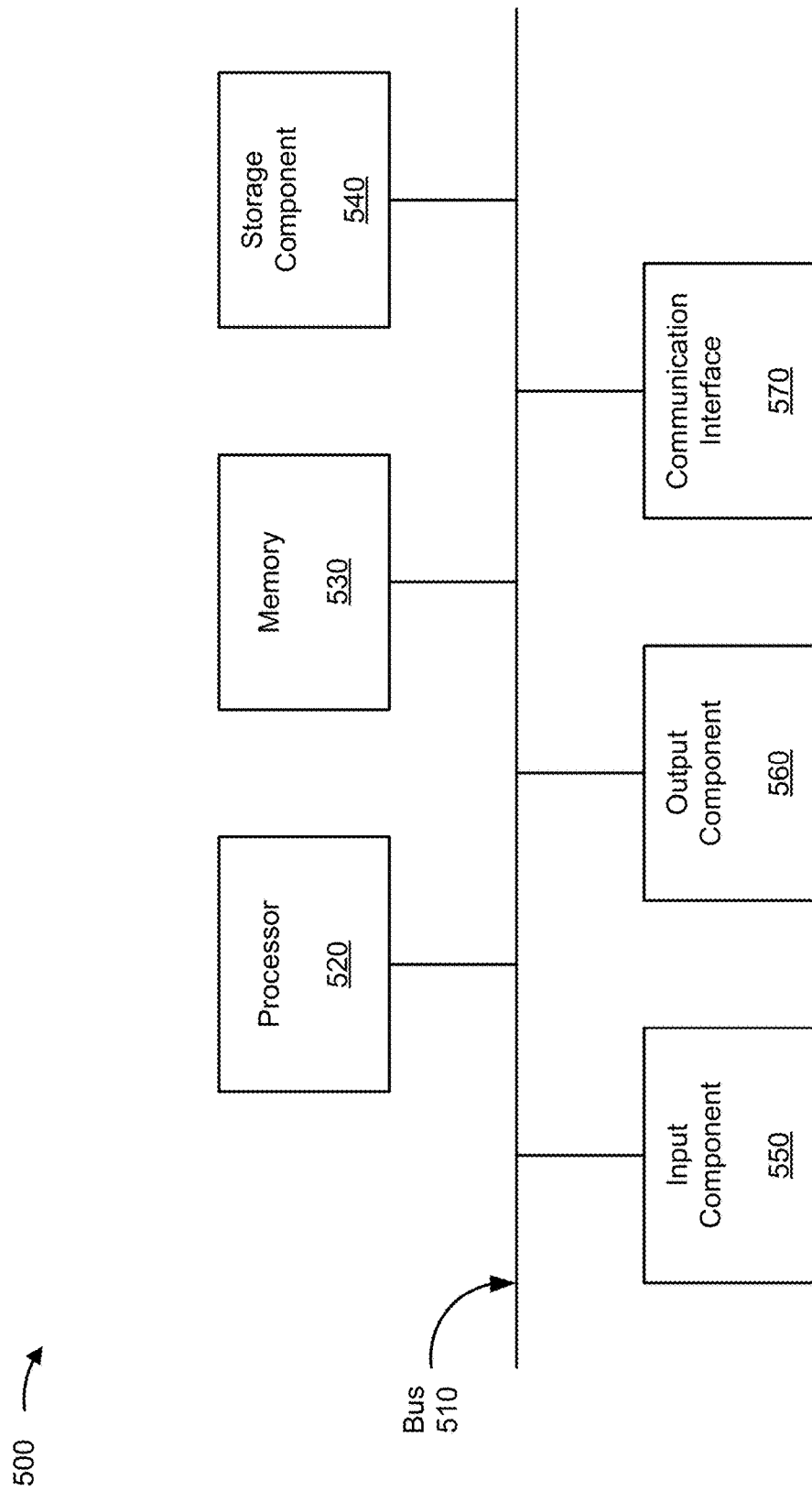
FIG. 5 is a diagram of example components of one or more devices of FIG. 4.

FIG. 5 is a diagram of example components of a device 500. Device 500 may correspond to the central planning platform 410, the autonomous driving system 430, the internal sensor 435, and/or the external sensor 440. In some implementations, the central planning platform 410, the autonomous driving system 430, the internal sensor 435, and/or the external sensor 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
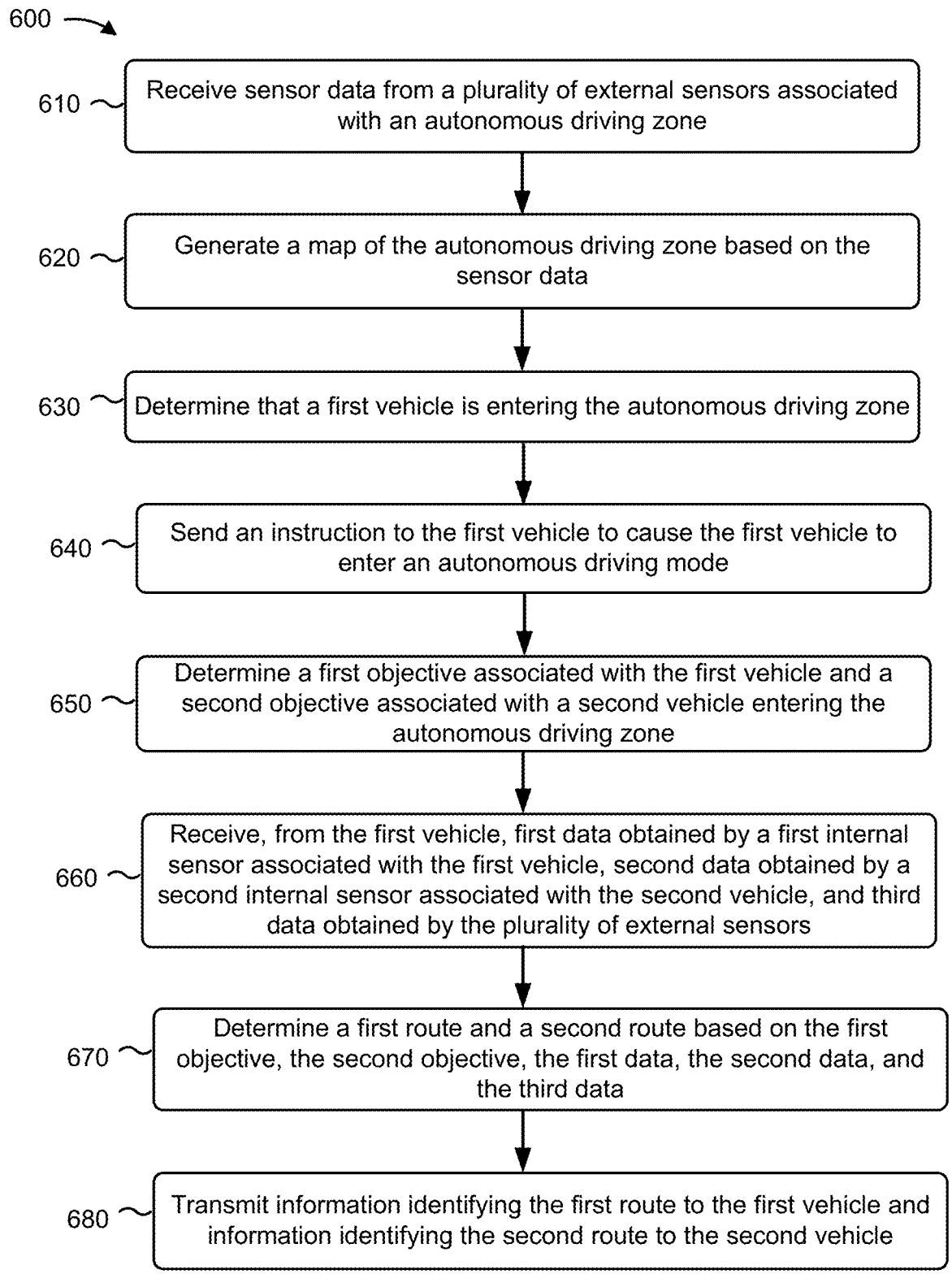
FIG. 6 is a flow chart of an example process for externally assisting an autonomous driving system.

FIG. 6 is a flow chart of an example process 600 for externally assisting an autonomous driving system. In some implementations, one or more process blocks of FIG. 6 may be performed by the central planning platform 410 (e.g., using processor 520, memory 530, storage component 540, input component 550, output component 560, communication interface 570 and/or the like). In some implementations, one or more process blocks of FIG. 6 may be performed by another device or a group of devices separate from or including the central planning platform 410, such as the autonomous driving system 430.

As shown in FIG. 6, process 600 may include receiving sensor data from a plurality of external sensors associated with an autonomous driving zone (block 610). For example, the central planning platform 410 (e.g., using processor 520, memory 530, storage component 540, input component 550, output component 560, communication interface 570, and/or the like) may receive sensor data from a plurality of external sensors associated with an autonomous driving zone, as described above.

In some implementations, the central planning platform 410 may fuse and/or aggregate sensor data received from the plurality of sensors and/or sensor data received from autonomous vehicles located with the autonomous driving zone and may apply the fused and/or aggregated sensor data to a map of the autonomous driving zone.

As further shown in FIG. 6, process 600 may include generating a map of the autonomous driving zone based on the sensor data (block 620). For example, the central planning platform (e.g., using processor 520, memory 530, storage component 540, input component 550, output component 560, communication interface 570, and/or the like) may generate a map of the autonomous driving zone based on the sensor data, as described above.

As further shown in FIG. 6, process 600 may include determining that a first vehicle is entering the autonomous driving zone (block 630). For example, the central planning platform (e.g., using processor 520, memory 530, storage component 540, input component 550, output component 560, communication interface 570, and/or the like) may determine that a first vehicle is entering the autonomous driving zone, as described above.

As further shown in FIG. 6, process 600 may include sending an instruction to the first vehicle to cause the first vehicle to enter an autonomous driving mode (block 640). For example, the central planning platform (e.g., using processor 520, memory 530, storage component 540, input component 550, output component 560, communication interface 570, and/or the like) may send an instruction to the first vehicle to cause the first vehicle to begin operating in an autonomous driving mode, as described above.

As further shown in FIG. 6, process 600 may include determining a first objective associated with the first vehicle and a second objective associated with a second vehicle entering the autonomous driving zone (block 650). For example, the central planning platform (e.g., using processor 520, memory 530, storage component 540, input component 550, output component 560, communication interface 570, and/or the like) may determine a first objective associated with the first vehicle and a second objective associated with a second vehicle entering the autonomous driving zone, as described above.

As further shown in FIG. 6, process 600 may include receiving, from the first vehicle, first data obtained by a first internal sensor associated with the first vehicle, second data obtained by a second internal sensor associated with the second vehicle, and third data obtained by the plurality of external sensors (block 660). For example, the central planning platform (e.g., using processor 520, memory 530, storage component 540, input component 550, output component 560, communication interface 570, and/or the like) may receive, from the first vehicle, first data obtained by a first internal sensor associated with the first vehicle, second data obtained by a second internal sensor associated with the second vehicle, and third data obtained by the plurality of external sensors, as described above.

As further shown in FIG. 6, process 600 may include determining a first route and a second route based on the first objective, the second objective, the first data, the second data, and the third data, wherein the first route allows the first vehicle to satisfy the first objective and the second route allows the second vehicle to satisfy the second objective (block 670). For example, the central planning platform (e.g., using processor 520, memory 530, storage component 540, input component 550, output component 560, communication interface 570, and/or the like) may determine a first route and a second route based on the first objective, the second objective, the first data, the second data, and the third data, as described above. In some implementations, the first route allows the first vehicle to satisfy the first objective and the second route allows the second vehicle to satisfy the second objective.

In some implementations, determining the first route and the second route includes identifying an area in which vehicles are prohibited from entering, and determining the first route and the second route to avoid the area based on vehicles being prohibited from entering the area. For example, when determining the first route and when determining the second route, the central planning platform (e.g., using processor 520, memory 530, storage component 540, input component 550, output component 560, communication interface 570, and/or the like) may identify an area in which vehicles are prohibited from entering and may determine the first route and the second route to avoid the area based on vehicles being prohibited from entering the area.

In some implementations, determining the first route and the second route includes determining a first destination for the first vehicle, the first vehicle traveling to the first destination satisfies the first objective; determining a second destination for the second vehicle, the second vehicle traveling to the second destination satisfies the second objective; determining that the first destination and the second destination are a same destination, and determining a third destination for the second vehicle based on the first destination and the second destination being the same destination, the second vehicle traveling to the third destination satisfies the second objective.

For example, the central planning platform (e.g., using processor 520, memory 530, storage component 540, input component 550, output component 560, communication interface 570, and/or the like) may determine a first destination for the first vehicle that satisfies the first objective. The central planning platform (e.g., using processor 520, memory 530, storage component 540, input component 550, output component 560, communication interface 570, and/or the like) may determine a second destination for the second vehicle that satisfies the second objective. The central planning platform (e.g., using processor 520, memory 530, storage component 540, input component 550, output component 560, communication interface 570, and/or the like) may determine that the first destination and the second destination are a same destination. The central planning platform (e.g., using processor 520, memory 530, storage component 540, input component 550, output component 560, communication interface 570, and/or the like) may determine a third destination for the second vehicle that satisfies the second objective based on the first destination and the second destination being the same destination.

In some implementations, determining the first route and the second route includes determining the first route and determining the second route based on the first route. For example, the central planning platform (e.g., using processor 520, memory 530, storage component 540, input component 550, output component 560, communication interface 570, and/or the like) may determine the second route based on the first route.

In some implementations, process 600 includes determining, by the device, a projected path of an object based on the third data; determining a probability of a collision between the first vehicle and the object based on the projected path; and transmitting information indicating the projected path of the object and the probability of the collision to the first vehicle. For example, the central planning platform (e.g., using processor 520, memory 530, storage component 540, input component 550, output component 560, communication interface 570, and/or the like) may determine a projected path of an object based on data obtained from the external sensor and/or the internal sensor. The central planning platform may determine a probability of a collision between the first vehicle and the object based on the projected path. The central platform may transmit information indicating the projected path of the object and the probability of the collision to the first vehicle.

In some implementations, process 600 includes identifying a person located in an area associated with the first route; and transmitting information identifying a maximum speed for the first vehicle when traveling in the area associated with the first route based on identifying the person. For example, the central planning platform (e.g., using processor 520, memory 530, storage component 540, input component 550, output component 560, communication interface 570, and/or the like) may identify a person located in an area associated with the first route. The central planning platform may transmit information identifying a maximum speed for the first vehicle when traveling in the area associated with the first route based on identifying the person.

As further shown in FIG. 6, process 600 may include transmitting information identifying the first route to the first vehicle and information identifying the second route to the second vehicle (block 680). For example, the central planning platform (e.g., using processor 520, memory 530, storage component 540, input component 550, output component 560, communication interface 570, and/or the like) may transmit information identifying the first route to the first vehicle and information identifying the second route to the second vehicle, as described above.

In some implementations, process 600 includes determining that the second vehicle is traveling along a third route that is different from the second route; determining that the third route intersects the first route; determining a modified first route based on the third route intersecting the first route; and transmitting information identifying the modified first route to the first vehicle. For example, the central planning platform (e.g., using processor 520, memory 530, storage component 540, input component 550, output component 560, communication interface 570, and/or the like) may determine that the second vehicle is traveling along a third route that is different from the second route. The central planning platform 410 may determine that the third route intersects the first route and may determine a modified first route based thereon. The central planning platform may transmit information identifying the modified first route to the first vehicle.

In some implementations, process 600 includes monitoring an area surrounding a portion of the first route. For example, the central planning platform (e.g., using processor 520, memory 530, storage component 540, input component 550, output component 560, communication interface 570, and/or the like) may monitor an area surrounding a portion of the first route. In some implementations, the central planning platform may monitor the area to detect a presence of a hazard prior to the first vehicle traveling along the portion of the first route. In some implementations, the central planning platform may monitor the area based on the first vehicle traveling along another portion of the first route and traveling towards the area.

In some implementations, process 600 includes receiving additional sensor data from the plurality of external sensors and modifying the map of the autonomous driving zone based on the additional sensor data. For example, the central planning platform (e.g., using processor 520, memory 530, storage component 540, input component 550, output component 560, communication interface 570, and/or the like) may receive additional sensor data from a plurality of external sensors. The central planning platform 410 may update the map of the autonomous driving zone based on the additional sensor data.

In some implementations, process 600 includes determining an occurrence of an event and sending an instruction to the first vehicle based on the occurrence of the event. The instruction may cause the vehicle to perform a particular action. For example, the central planning platform (e.g., using processor 520, memory 530, storage component 540, input component 550, output component 560, communication interface 570, and/or the like) may determine the occurrence of an event, such as, for example, another vehicle pulling out of a parking spot. The central planning platform may send an instruction to the first vehicle based on the occurrence of the event. The instruction may cause the first vehicle to perform a particular action such as, for example, stopping the first vehicle and waiting for the other vehicle to pull out of the parking spot and/or to park in the parking spot the other vehicle pulled out of.

In some implementations, process 600 includes determining that a communication link between the first vehicle and the device is not available and causing the first vehicle to stop operating in the full autonomous mode based on the communication link not being available. For example, the autonomous driving system (e.g., using processor 520, memory 530, storage component 540, input component 550, output component 560, communication interface 570, and/or the like) associated with the first vehicle may determine that a communication link between the autonomous driving system and the central planning platform is not available. The autonomous driving system may cause the first vehicle to stop operating in the full autonomous driving mode based on the communication link not being available.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors configured to:
      receive sensor data from an external sensor associated with an autonomous driving zone;
      generate a map of the autonomous driving zone based on the sensor data;
      determine that a vehicle is entering the autonomous driving zone;
      transmit a signal to the vehicle instructing the vehicle to switch to operating in a full autonomous mode based on determining that the vehicle is entering the autonomous driving zone;
      determine an objective for the vehicle to reach a location;
      receive, from the vehicle, first data obtained by one or more first sensors associated with the vehicle and second data obtained by the external sensor;
      determine a route based on the objective, the first data, and the second data, and
         wherein the route allows the vehicle to satisfy the objective, and
         wherein the one or more processors, to determine the route, are configured to:
            determine a first amount of travel time associated with the first data and the objective, and
            determine the route to satisfy the objective, reduce the first amount of travel time, and reduce a second amount of travel time that is associated with another vehicle satisfying another objective for the other vehicle to reach another location; and
      transmit information identifying the route to the vehicle to cause the vehicle to operate in the full autonomous mode to follow the route.

2. The device of claim 1, wherein the one or more processors are further configured to:
   determine a projected path of an object based on the second data;
   determine a probability of a collision between the vehicle and the object based on the projected path; and
   transmit information modifying the route to the vehicle based on the probability of the collision.

3. The device of claim 1, wherein, when determining the route, the one or more processors are configured to:
   determine a first destination for the vehicle,
      wherein the vehicle traveling to the first destination satisfies the objective;
   determine a second destination associated with another vehicle;
   determine that the first destination and the second destination are a same destination; and
   determine a third destination for the vehicle based on the first destination and the second destination being the same destination,
      wherein the vehicle traveling to the third destination satisfies the objective.

4. The device of claim 1, wherein the one or more processors are further configured to:
   monitor an area surrounding a portion of the route to detect a presence of a hazard,
      wherein the area surrounding the portion of the route is to be monitored prior to the vehicle traveling along the portion of the route.

5. The device of claim 4, wherein the one or more processors are further configured to:
   determine that the vehicle is traveling along the portion of the route; and
   monitor an area surrounding another portion of the route based on the vehicle traveling along the portion of the route,
      wherein the area surrounding the other portion of the route is to be monitored prior to the vehicle traveling along the other portion of the route.

6. The device of claim 1, wherein the one or more processors are further configured to:
   receive additional sensor data from the external sensor; and
   modify the map of the autonomous driving zone based on the additional sensor data.

7. The device of claim 1, wherein the one or more processors are further to:
   determine an occurrence of an event; and
   send an instruction to the vehicle based on the occurrence of the event,
      wherein the instruction is to cause the vehicle to perform a particular action.

8. A non-transitory computer-readable medium storing a set of instructions, the set of instructions comprising:
   one or more instructions that, when executed by one or more processors of a device, cause the device to:
      receive sensor data from an external sensor associated with an autonomous driving zone;
      generate a map of the autonomous driving zone based on the sensor data;
      determine that a vehicle is entering the autonomous driving zone;
      transmit a signal to the vehicle instructing the vehicle to switch to operating in a full autonomous mode based on determining that the vehicle is entering the autonomous driving zone;
      determine an objective for the vehicle to reach a location;
      receive, from the vehicle, first data obtained by one or more first sensors associated with the vehicle and second data obtained by the external sensor;

determine a route based on the objective, the first data, and the second data, and
  wherein the route allows the vehicle to satisfy the objective, and
  wherein the one or more instructions, that cause the device to determine the route, cause the device to:
    determine a first amount of travel time associated with the first data and the objective,
    determine the route to satisfy the objective, reduce the first amount of travel time, and reduce a second amount of travel time that is associated with another vehicle satisfying another objective for the other vehicle to reach another location; and
  transmit information identifying the route to the vehicle to cause the vehicle to operate in the full autonomous mode to follow the route.

9. The non-transitory computer-readable medium of claim 8, wherein the one or more instructions further cause the device to:
  determine a projected path of an object based on the second data;
  determine a probability of a collision between the vehicle and the object based on the projected path; and
  transmit information modifying the route to the vehicle based on the probability of the collision.

10. The non-transitory computer-readable medium of claim 8, wherein, the one or more instructions, that cause the one or more processors to determine the route, cause the one or more processors to:
  determine a first destination for the vehicle,
    wherein the vehicle traveling to the first destination satisfies the objective;
  determine a second destination associated with another vehicle;
  determine that the first destination and the second destination are a same destination; and
  determine a third destination for the vehicle based on the first destination and the second destination being the same destination,
    wherein the vehicle traveling to the third destination satisfies the objective.

11. The non-transitory computer-readable medium of claim 8, wherein the one or more instructions further cause the device to:
  monitor an area surrounding a portion of the route to detect a presence of a hazard,
    wherein the area surrounding the portion of the route is to be monitored prior to the vehicle traveling along the portion of the route.

12. The non-transitory computer-readable medium of claim 8, wherein the one or more instructions further cause the device to:
  determine that the vehicle is traveling along a portion of the route; and
  monitor an area surrounding another portion of the route based on the vehicle traveling along the portion of the route,
    wherein the area surrounding the other portion of the route is to be monitored prior to the vehicle traveling along the other portion of the route.

13. The non-transitory computer-readable medium of claim 8, wherein the one or more instructions further cause the device to:
  receive additional sensor data from the external sensor; and
  modify the map of the autonomous driving zone based on the additional sensor data.

14. The non-transitory computer-readable medium of claim 8, wherein the one or more instructions further cause the device to:
  determine an occurrence of an event; and
  send an instruction to the vehicle based on the occurrence of the event,
    wherein the one or more instructions further cause the device to perform a particular action.

15. A method, comprising:
  receiving, by a device, sensor data from an external sensor associated with an autonomous driving zone;
  generating, by the device, a map of the autonomous driving zone based on the sensor data;
  determining, by the device, that a vehicle is entering the autonomous driving zone;
  transmitting, by the device, a signal to the vehicle instructing the vehicle to switch to operating in a full autonomous mode based on determining that the vehicle is entering the autonomous driving zone;
  determining, by the device, an objective for the vehicle to reach a location;
  receiving, by the device and from the vehicle, first data obtained by one or more first sensors associated with the vehicle and second data obtained by the external sensor;
  determining, by the device, a route based on the objective, the first data, and the second data, and
    wherein the route allows the vehicle to satisfy the objective, and
    wherein the determining the route comprises:
      determining a first amount of travel time associated with the first data and the objective, and
      determining the route to satisfy the objective, reduce the first amount of travel time, and reduce a second amount of travel time that is associated with another vehicle satisfying another objective for the other vehicle to reach another location; and
  transmitting, by the device, information identifying the route to the vehicle to cause the vehicle to operate in the full autonomous mode to follow the route.

16. The method of claim 15, further comprising:
  determining a projected path of an object based on the second data;
  determining a probability of a collision between the vehicle and the object based on the projected path; and
  transmitting information modifying the route to the vehicle based on the probability of the collision.

17. The method of claim 15, wherein determining the route comprises:
  determining a first destination for the vehicle,
    wherein the vehicle traveling to the first destination satisfies the objective;
  determining a second destination associated with another vehicle;
  determining that the first destination and the second destination are a same destination; and
  determining a third destination for the vehicle based on the first destination and the second destination being the same destination,
    wherein the vehicle traveling to the third destination satisfies the objective.

18. The method of claim 15, further comprising:
  monitoring an area surrounding a portion of the route to detect a presence of a hazard, wherein the area surrounding the portion of the route is to be monitored prior to the vehicle traveling along the portion of the route.

19. The method of claim 15, further comprising:

determining that the vehicle is traveling along a portion of the route; and monitoring an area surrounding another portion of the route based on the vehicle traveling along the portion of the route, wherein the area surrounding the other portion of the route is to be monitored prior to the vehicle traveling along the other portion of the route.

20. The method of claim 15, further comprising:

receiving additional sensor data from the external sensor; and modifying the map of the autonomous driving zone based on the additional sensor data.

\* \* \* \* \*